(12) United States Patent
Criezis et al.

(10) Patent No.: US 10,834,935 B2
(45) Date of Patent: Nov. 17, 2020

(54) DAIRY MINERAL-FORTIFIED LIQUID DAIRY PRODUCTS AND METHODS OF MAKING

(75) Inventors: Anthony William Criezis, Chicago, IL (US); Bruce Edward Campbell, Glenview, IL (US); Lisa Ann Dierbach, Arlington Heights, IL (US); Jennifer Louise Kimmel, Evanston, IL (US); Timothy David Knight, Sun Prairie, WI (US); Joseph Michael Schuerman, Prospect Heights, IL (US)

(73) Assignee: KONINKLIJKE DOUWE EGBERTS B.V., Utrecht (NL)

( * ) Notice: Subject to any disclaimer, the term of this patent is extended or adjusted under 35 U.S.C. 154(b) by 939 days.

(21) Appl. No.: 13/570,860

(22) Filed: Aug. 9, 2012

(65) Prior Publication Data

US 2013/0196031 A1    Aug. 1, 2013

Related U.S. Application Data

(60) Provisional application No. 61/593,639, filed on Feb. 1, 2012.

(51) Int. Cl.
*A23C 9/142* (2006.01)
*A23C 19/084* (2006.01)
(Continued)

(52) U.S. Cl.
CPC .......... *A23C 9/1422* (2013.01); *A23C 9/1516* (2013.01); *A23C 9/1522* (2013.01);
(Continued)

(58) Field of Classification Search
CPC ... A23C 9/1422; A23C 9/1516; A23C 9/1522; A23C 19/082; A23C 19/084; A23C 13/14
(Continued)

(56) References Cited

U.S. PATENT DOCUMENTS 1,440,011 A    12/1922 Hosman
1,912,073 A *  5/1933 Germann ............... A23C 13/08
                                                426/491
(Continued)

FOREIGN PATENT DOCUMENTS

AU    2010776 A *  6/1978 .......... A23C 9/1422
EP    0316938        5/1989
(Continued)

OTHER PUBLICATIONS

Glanbia Nutrutionals, OptiSol 1000, Product Data, believed to be publicly available at least as of Jan. 23, 2012, 1 page.
(Continued)

*Primary Examiner* — Lien T Tran
*Assistant Examiner* — Tynesha L McClain-Coleman
(74) *Attorney, Agent, or Firm* — Fitch, Even, Tabin & Flannery LLP

(57) ABSTRACT

Disclosed are dairy products fortified with dairy minerals and methods of making the dairy products. The fortified dairy products exhibit enhanced fresh dairy flavor notes. In one aspect, the fortified dairy product is a concentrated dairy liquid. In another aspect, the fortified dairy product is a cheese product, such as cream cheese, processed cheese, or cultured cheese.

16 Claims, 30 Drawing Sheets

(51) Int. Cl.
  *A23C 9/15* (2006.01)
  *A23C 13/14* (2006.01)
  *A23C 19/082* (2006.01)
  *A23C 9/152* (2006.01)

(52) U.S. Cl.
  CPC ............ *A23C 13/14* (2013.01); *A23C 19/082* (2013.01); *A23C 19/084* (2013.01)

(58) Field of Classification Search
  USPC .......................................... 426/74, 580, 586
  See application file for complete search history.

(56) References Cited

U.S. PATENT DOCUMENTS

| | | | |
|---|---|---|---|
| 2,310,383 | A | 2/1943 | Andrews |
| 3,119,702 | A | 1/1964 | Leviton |
| 4,454,162 | A | 6/1984 | Schanze |
| 4,818,554 | A | 4/1989 | Giddey |
| 4,959,227 | A | 9/1990 | Amer |
| 5,009,912 | A | 4/1991 | Nixon |
| 5,202,145 | A | 4/1993 | Wisler |
| 5,260,085 | A | 11/1993 | Wisler |
| 5,503,865 | A | 4/1996 | Behringer |
| 6,007,852 | A | 12/1999 | Reinbold |
| 6,039,986 | A * | 3/2000 | Mallangi .............. A23C 9/1522 426/522 |
| 6,093,425 | A | 7/2000 | Kamarei |
| 6,399,140 | B1 | 6/2002 | Allen |
| 6,406,736 | B1 | 6/2002 | Han |
| 6,589,576 | B2 | 7/2003 | Borschel |
| 6,652,896 | B2 | 11/2003 | Young |
| 7,026,004 | B2 | 4/2006 | Loh |
| 7,033,635 | B2 | 4/2006 | Schwegle |
| 7,611,743 | B2 | 11/2009 | Laye |
| 7,640,843 | B2 | 1/2010 | Halliday |
| 7,655,267 | B2 | 2/2010 | Cha |
| 7,687,095 | B2 | 3/2010 | Ma |
| 7,887,864 | B2 | 2/2011 | Cale |
| 8,545,912 | B2 | 10/2013 | Crouse |
| 2003/0054068 | A1 | 3/2003 | Dybing |
| 2003/0054079 | A1 | 3/2003 | Reaves |
| 2003/0165574 | A1 | 9/2003 | Ward |
| 2004/0185161 | A1 | 9/2004 | Ashourian |
| 2005/0069618 | A1 | 3/2005 | Cale |
| 2005/0196508 | A1 | 9/2005 | Wang |
| 2006/0280779 | A1* | 12/2006 | Burling et al. ................ 424/439 |
| 2007/0172548 | A1 | 7/2007 | Cale |
| 2008/0081087 | A1 | 4/2008 | Berry |
| 2008/0160134 | A1 | 7/2008 | Hestekin |
| 2008/0171125 | A1 | 7/2008 | Akashe |
| 2008/0286421 | A1 | 11/2008 | DeLease |
| 2009/0297660 | A1 | 12/2009 | Silver |
| 2010/0055286 | A1 | 3/2010 | Tikanmaki |
| 2010/0055290 | A1* | 3/2010 | Schmidt et al. .............. 426/587 |
| 2010/0068293 | A1* | 3/2010 | Dalemans et al. ............ 424/535 |
| 2010/0104711 | A1 | 4/2010 | Kimmel |
| 2010/0112128 | A1 | 5/2010 | Kimmel |
| 2013/0196030 | A1 | 8/2013 | Criezis |

FOREIGN PATENT DOCUMENTS

| | | | |
|---|---|---|---|
| EP | 0788744 | 8/1997 | |
| EP | 1138207 | 10/2001 | |
| EP | 1884165 | 2/2008 | |
| EP | 2263471 A1 * | 12/2010 | ........... A23C 9/1422 |
| JP | H05339160 | 12/1993 | |
| JP | 2000139343 | 5/2000 | |
| JP | 2010057488 | 3/2010 | |
| JP | 2010075083 | 4/2010 | |
| RU | 2109456 | 4/1998 | |
| SU | 1472028 | 4/1989 | |
| WO | 1998021953 | 5/1998 | |
| WO | 2006012506 | 2/2006 | |
| WO | WO 2008009636 A1 * | 1/2008 | |
| WO | 2013116621 | 8/2013 | |

OTHER PUBLICATIONS

Glanbia Nutrutionals, OptiSol 1200, Product Data, believed to be publicly available at least as of Jan. 23, 2012, 1 page.

Glanbia Nutrutionals, TruCal D-7, Product Data, believed to be publicly available at least as of Jan. 23, 2012, 1 page.

Hinrichs, J., et al., "Ultrahocherhitzen Von Milchkonzentraten." Deutsche Milchwirtschaft, Hildesheim, Germany, vol. 48, No. 6, 1997, pp. 185-188.

IdaPro Milk Permeate Powder, Product Specification, believed to be publicly available at least as of Jan. 23, 2012, 2 pages.

International Preliminary Report on Patentability and Written Opinion of the International Searching Authority in corresponding International application No. PCT/US2013/024392, dated Aug. 5, 2014, 5 pages.

International Search Report, International Patent Application No. PCT/ US2013/024392, dated Apr. 23, 2013, 5 pages.

Lactalis American Group Inc., Whey Permeate Powder Food Grade, Finished Product Specification, believed to be publicly available at least as of Jan. 23, 2012, 2 pages.

Lactalis Ingredients, Calciane 30 M Micronised Milk Calcium, Product Specification, believed to be publicly available at least as of Jan. 23, 2012, 1 page.

Lactalis Ingredients, Calciane 30 Milk Calcium, Product Specification, believed to be publicly available at least as of Jan. 23, 2012, 1 page.

Souce, et al., "Food Composition and Nutrition Tables." 2000, medpharm / CRC Press, XP002695641, 3 pages.

Volostnikova, "Mineral composition of 'Osobyi' processed cheese." Problemy kachestva i biologicheskoi tsennosti pishchevykh producktov, 1979, pp. 190-193. Retrieved from the Internet: URL:http://eolit.internal.epo.org/edo/day17/XP008161502.PDF [retrieved on Apr. 18, 2013].

Souce, et al., "Food Composition and Nutrition Tables." Medpharm, CRC Press, 2000, pp. 12-14 and 131-140.

Supervised by Aya Kagawa, "Fourthly-Revised Tables of Food Composition." Women's Nutrition University Publishing Division, 1994, pp. 196-201.

Kuznetsov, V.V. et al., "Use of Dry Dairy Components in the Food Industry." Saint-Petersburg, Giord publishing, 2006, ISBN 5-98879-003-8, pp. 22 and 23.

\* cited by examiner

FIG. 21

| Summary Factor: Product Tukey test at 10% | | | | | | | | | | | | |
|---|---|---|---|---|---|---|---|---|---|---|---|---|
| Analysis | F63 | | F64 | | F65 | | F66 | | F67 | | F68 | |
| foam_height_APP | 3.15 | C | 3.55 | BC | 3.44 | BC | 3.16 | C | 4.45 | | 4.08 | AB |
| bubble_size_APP | 4.99 | A | 5.06 | A | 4.52 | AB | 4.47 | AB | 4.06 | A | 3.46 | AB |
| uniformity_APP | 5.54 | C | 6.08 | BC | 5.47 | C | 5.78 | BC | 8.22 | AB | 7.56 | AB |
| density_APP | 3.5 | C | 3.45 | C | 3.61 | BC | 3.83 | BC | 5.07 | A | 4.51 | AB |
| aerated_APP | 5.72 | A | 5.9 | A | 4.9 | AB | 5.09 | AB | 5.39 | AB | 4.63 | ABC |
| viscosity_FMF | 3.56 | BC | 4.35 | ABC | 3.85 | BC | 3.35 | C | 4.74 | AB | 3.91 | AB |
| smooth_FMF | 5.95 | BC | 6.49 | AB | 5.8 | | 5.62 | B | 7.48 | A | 6.74 | |
| aerated_FMF | 5.48 | AB | 4.31 | | 4.99 | | 5.47 | | 4.81 | | 5.65 | |
| powdery_FMF | 4.83 | | 5.33 | | 5.73 | | 5.28 | | 4.42 | | 4.17 | |
| dry_FMF | 5.35 | | 5.84 | | 5.7 | | 5.15 | | 4.68 | | 4.91 | |

| | F69 | | Comp. F | Proba. | i.Judge |
|---|---|---|---|---|---|
| foam_height_APP | 4.73 | | 7.79 | <0.0001 | *** |
| bubble_size_APP | 3.05 | A | 3.17 | 0.0079 | ** |
| uniformity_APP | 8.65 | B | 7.22 | <0.0001 | *** |
| density_APP | 5.99 | A | 6.25 | <0.0001 | *** |
| aerated_APP | 4.05 | A | 3.77 | 0.0024 | * |
| viscosity_FMF | 5.18 | B | 4.16 | 0.0011 | ** |
| smooth_FMF | 7.33 | A | 2.63 | 0.0226 | * |
| aerated_FMF | 4.91 | AB | 0.96 | 0.4586 | |
| powdery_FMF | 4.14 | | 1.39 | 0.2313 | |
| dry_FMF | 5.07 | | 0.88 | 0.5161 | |

FIG. 22

| Analysis | F63 | F64 | F65 | F66 | F67 | F68 | F69 | Comp. F | Proba. | I.Judge |
|---|---|---|---|---|---|---|---|---|---|---|
| viscosity_MF | 4.06 | 4.13 | 4.12 | 3.93 | 4.72 | 4.21 | 4.23 | 1.97 | 0.0796 | * |
|  | AB | AB | AB | B | A | AB | AB |  |  |  |
| smooth_MF | 6.25 | 6.29 | 6.17 | 5.97 | 7.39 | 6.58 | 6.8 | 3.62 | 0.0032 |  |
|  | B | B | B | B | A | AB | AB |  | ** |  |
| powdery_MF | 6.68 | 6.22 | 6.37 | 7.23 | 5.82 | 5.97 | 4.47 | 5.06 | 0.0002 | * |
|  | A | A | A | A | AB | A | B |  | *** |  |
| milky_FL | 6.59 | 6.53 | 6.81 | 6.27 | 7.42 | 7.25 | 7.38 | 3.77 | 0.0024 |  |
|  | AB | AB | AB | B | A | A | A |  | ** |  |
| processed_FL | 9.73 | 9.35 | 9.62 | 9.98 | 9.69 | 9.33 | 9.14 | 1.01 | 0.4255 |  |
|  | ! | ! | ! | ! | ! | ! | ! |  |  |  |
| sweet_FL | 0.89 | 0.87 | 0.98 | 0.89 | 1.47 | 1.43 | 1.35 | 1.57 | 0.1674 |  |
|  | ! | ! | ! | ! | ! | ! | ! |  |  |  |
| roasted_FL | 7.15 | 7.23 | 7.38 | 7.55 | 7.15 | 7.22 | 7.07 | 0.51 | 0.7953 |  |
|  | ! | ! | ! | ! | ! | ! | ! |  |  |  |
| creamy_FL | 4.6 | 4.47 | 4.03 | 4.38 | 5.96 | 5.84 | 4.85 | 7.3 | <0.0001 | * |
|  | C | C | C | C | A | AB | BC |  | *** |  |
| bitter_FL | 7.96 | 7.98 | 8.02 | 8.25 | 7.61 | 7.54 | 7.78 | 1.68 | 0.1366 | ** |
|  | ! | ! | ! | ! | ! | ! | ! |  |  |  |
| musty_FL | 2.45 | 1.9 | 1.83 | 2.11 | 2.7 | 2.21 | 2.09 | 0.46 | 0.8366 |  |
|  | ! | ! | ! | ! | ! | ! | ! |  |  |  |
| soapy_FL | 4.82 | 3.8 | 4.12 | 4.39 | 4.49 | 4.63 | 4.21 | 1.25 | 0.2902 |  |
|  | ! | ! | ! | ! | ! | ! | ! |  |  |  |
| smoky_FL | 6.11 | 5.59 | 5.54 | 5.46 | 6.03 | 5.91 | 5.82 | 0.73 | 0.6278 |  |
|  | ! | ! | ! | ! | ! | ! | ! |  |  |  |
| earthy_FL | 5.06 | 5.29 | 5.14 | 5.15 | 4.45 | 4.98 | 4.77 | 0.5 | 0.8102 |  |
|  | ! | ! | ! | ! | ! | ! | ! |  |  |  |
| rubbery_FL | 2.48 | 2.95 | 2.66 | 2.58 | 2.03 | 2.28 | 2.84 | 0.8 | 0.5739 | * |
|  | ! | ! | ! | ! | ! | ! | ! |  |  |  |
| milky_AT | 5.6 | 5.3 | 5.11 | 4.64 | 6.29 | 5.87 | 5.92 | 2.25 | 0.0471 |  |
|  | AB | AB | AB | B | A | AB | AB |  | * |  |
| sweet_AT | 0.63 | 0.75 | 0.54 | 0.87 | 0.92 | 1.07 | 0.76 | 1.3 | 0.2663 |  |
|  | ! | ! | ! | ! | ! | ! | ! |  |  |  |
| roasted_AT | 6.32 | 6.01 | 6.4 | 6.36 | 6.29 | 6.24 | 6.35 | 0.47 | 0.8268 |  |
|  | ! | ! | ! | ! | ! | ! | ! |  |  |  |
| bitter_AT | 7.32 | 6.59 | 6.91 | 6.99 | 6.46 | 6.4 | 6.95 | 2.16 | 0.0564 |  |
|  | A | AB | AB | AB | AB | B | AB |  |  |  |
| metallic_AT | 4 | 4.15 | 4.88 | 4.38 | 4.43 | 3.77 | 4.45 | 1.77 | 0.1157 |  |
|  | ! | ! | ! | ! | ! | ! | ! |  |  | * |
| dry_AF | 8.84 | 8.8 | 8.53 | 8.58 | 8.09 | 8.37 | 8.77 | 0.65 | 0.6906 |  |
|  | ! | ! | ! | ! | ! | ! | ! |  |  |  |
| *significant at 5% | | | | | | | | | | |
| **significant at 1% | | | | | | | | | | |
| ***significant at 0.1% | | | | | | | | | | |
| ! test not computed | | | | | | | | | | |

FIG. 23

| Analysis | US GEVALIA | C134 | C125 | C137 | C141 | C152 | C147 | C167 | C169 | Comp. F | Proba. | I. Judge |
|---|---|---|---|---|---|---|---|---|---|---|---|---|
| foam height APP | 6.4 | 2.93 | 5.45 | 4.68 | 5.66 | 4.2 | 3.04 | 4.79 | 4.13 | 23.04 | <0.0001 | *** |
| | A | D | AB | BC | AB | C | D | BC | C | | | |
| bubble size APP | 5.41 | 5.78 | 5.2 | 5.53 | 5.58 | 4.74 | 3.35 | 4.42 | 4.6 | 5.75 | <0.0001 | *** |
| | AB | A | AB | AB | AB | AB | C | BC | ABC | | | |
| Uniformity APP | 6.9 | 4.7 | 6.08 | 6.48 | 6.62 | 6.01 | 6.29 | 5.9 | 5.75 | 2.61 | 0.0127 | * |
| | A | B | AB | A | A | AB | AB | AB | AB | | | |
| density APP | 4.15 | 2.99 | 4.75 | 3.92 | 4.29 | 4.11 | 3.21 | 4.54 | 3.39 | 3.37 | 0.002 | ** |
| | ABC | C | A | ABC | ABC | ABC | BC | AB | ABC | | | |
| aerated APP | 7.32 | 5.67 | 6.14 | 6.33 | 6.22 | 4.81 | 4.4 | 4.55 | 5.72 | 7.13 | <0.0001 | *** |
| | A | BCD | ABC | AB | AB | BCD | D | CD | ABCD | | | |
| viscosity FMF | 4.06 | 3.03 | 4.58 | 4.68 | 3.7 | 3.97 | 3.31 | 4.41 | 3.29 | 4.56 | 0.0001 | *** |
| | ABC | C | A | A | B | ABC | AB | AB | BC | | | |
| smooth FMF | 6.79 | 6.33 | 6.8 | 7.76 | 5.54 | 6.67 | 5.99 | 6.85 | 6.21 | 2.84 | 0.0073 | ** |
| | AB | AB | AB | A | B | AB | B | AB | B | | | |
| aerated FMF | 6.57 | 5.4 | 5.83 | 4.57 | 6.83 | 3.97 | 3.77 | 4.32 | 5.21 | 6.73 | <0.0001 | *** |
| | A | ABC | AB | BC | A | C | C | BC | ABC | | | |
| powdery FMF | 4.54 | 3.75 | 3.1 | 3.34 | 4.34 | 3.98 | 5 | 4.34 | 4.19 | 1.61 | 0.1323 | |
| | | | | | | | | | | | | |
| dry FMF | 5.06 | 5.24 | 4.73 | 4.66 | 5.54 | 4.87 | 5.66 | 5.71 | 4.5 | 2.28 | 0.0286 | * |
| | A | A | A | A | A | A | A | A | A | | | |

FIG. 24

| Analysis | US GEVALIA | C134 | C125 | C137 | C141 | C152 | C147 | C167 | C169 | Comp. F | Proba. | I.Judge |
|---|---|---|---|---|---|---|---|---|---|---|---|---|
| viscosity_MF | 4.19 | 3.96 | 3.91 | 4.58 | 4.28 | 4.4 | 4.07 | 4.18 | 4.09 | 1.5 | 0.1699 | * |
|  | ! | ! | ! | ! | ! | ! | ! | ! | ! |  |  |  |
| smooth_MF | 8.09 | 6.48 | 6.31 | 7.74 | 6.81 | 6.74 | 6.29 | 6.56 | 6.76 | 5.99 | <0.0001 | ** |
|  | A | C | C | AB | BC | BC | C | C | BC |  | *** |  |
| powdery_MF | 5.11 | 5.13 | 4.88 | 4.33 | 5.52 | 4.99 | 5.19 | 5.01 | 6.09 | 1.2 | 0.3052 | *** |
|  | ! | ! | ! | ! | ! | ! | ! | ! | ! |  |  |  |
| dry_MF | 5.58 | 5.69 | 5.71 | 5 | 5.81 | 5.4 | 5.73 | 6.03 | 5.9 | 2.14 | 0.0395 | ** |
|  | AB | AB | AB | B | AB | AB | AB | A | AB |  | * |  |
| milky_FL | 7.15 | 6.66 | 6.55 | 7 | 6.65 | 6.67 | 7.21 | 6.92 | 6.85 | 0.94 | 0.4848 |  |
|  | ! | ! | ! | ! | ! | ! | ! | ! | ! |  |  |  |
| processed_FL | 8.28 | 8.38 | 8.35 | 8.03 | 8.54 | 8.12 | 7.68 | 7.79 | 8.03 | 0.74 | 0.6566 | *** |
|  | ! | ! | ! | ! | ! | ! | ! | ! | ! |  |  |  |
| sweet_FL | 2.62 | 1.77 | 1.95 | 2.13 | 2.19 | 2.39 | 2.27 | 2.12 | 2.06 | 0.81 | 0.5947 |  |
|  | ! | ! | ! | ! | ! | ! | ! | ! | ! |  |  |  |
| roasted_FL | 6.49 | 6.55 | 6.64 | 6.64 | 6.31 | 6.37 | 6.05 | 6.54 | 6.1 | 1.44 | 0.1912 | * |
|  | ! | ! | ! | ! | ! | ! | ! | ! | ! |  |  |  |
| sour | 3.48 | 2.93 | 3.33 | 2.84 | 3.38 | 3.72 | 3.77 | 3.29 | 4.31 | 1.86 | 0.076 | * |
|  | AB | B | AB | B | AB | AB | AB | AB | A |  |  |  |
| creamy_FL | 5.52 | 4.15 | 4 | 5.63 | 3.88 | 4.59 | 4.93 | 5.67 | 4.71 | 3.89 | 0.0006 |  |
|  | AB | BC | C | A | C | ABC | ABC | A | ABC |  | *** |  |
| bitter_FL | 6.59 | 7.24 | 7.12 | 6.98 | 7.15 | 6.41 | 6.57 | 7.09 | 6.48 | 1.94 | 0.0638 | *** |
|  | A | A | A | A | A | A | A | A | A |  |  |  |
| musty_FL | 3.8 | 2.39 | 2.69 | 2.1 | 2.54 | 3.66 | 3.23 | 2.83 | 3.01 | 2.9 | 0.0064 | ** |
|  | A | BC | ABC | C | ABC | AB | ABC | ABC | ABC |  | ** |  |
| soapy_FL | 3.65 | 1.83 | 2.47 | 2.45 | 3.38 | 2.52 | 2.21 | 2.73 | 3.44 | 2.23 | 0.032 |  |
|  | A | B | AB | AB | AB | AB | AB | AB | AB |  | * |  |
| smoky_FL | 3.79 | 4.68 | 5.07 | 4.88 | 4.6 | 4 | 3.43 | 4.01 | 3.92 | 2.36 | 0.0238 | ** |
|  | AB | AB | A | A | AB | AB | B | AB | AB |  | * |  |
| earthy_FL | 3.07 | 4.6 | 4.21 | 4.69 | 4.04 | 3.5 | 3.14 | 4.09 | 4.11 | 3.01 | 0.0049 | ** |
|  | B | A | AB | A | AB | AB | B | AB | AB |  | ** |  |
| rubbery_FL | 0.6 | 1.79 | 2.05 | 2.17 | 1.22 | 0.83 | 0.7 | 0.92 | 0.77 | 6.92 | <0.0001 | *** |
|  | D | ABC | AB | A | BCD | D | D | CD | D |  | *** |  |
| grainy_FL | 1.54 | 0.59 | 1.42 | 1.34 | 0.81 | 1.12 | 1.69 | 2.17 | 1.25 | 2.01 | 0.0539 | * |
|  | AB | B | AB | AB | AB | AB | AB | A | AB |  |  |  |
| rancid | 0.83 | 1.88 | 0.79 | 1.08 | 0.76 | 0.17 | 1.16 | 1 | 1.21 | 1.8 | 0.0881 |  |
|  | AB | A | AB | AB | AB | B | AB | AB | AB |  |  |  |
| milky_AT | 6.04 | 4.85 | 4.72 | 5.7 | 5.18 | 6.36 | 6.2 | 6.04 | 6.2 | 3.85 | 0.0006 |  |
|  | A | B | B | AB | AB | A | A | A | A |  | *** |  |
| sweet_AT | 1.6 | 1.64 | 1.64 | 1.38 | 1.55 | 1.23 | 1.32 | 1.76 | 1.27 | 0.43 | 0.903 |  |
|  | ! | ! | ! | ! | ! | ! | ! | ! | ! |  |  |  |
| roasted_AT | 4.99 | 5.7 | 5.41 | 5.6 | 5.07 | 5.65 | 5.42 | 5.94 | 5.3 | 1.57 | 0.1457 | ** |
|  | ! | ! | ! | ! | ! | ! | ! | ! | ! |  |  |  |
| bitter_AT | 5.93 | 6.53 | 6.14 | 6.05 | 5.77 | 6.2 | 5.95 | 5.78 | 6 | 0.72 | 0.6748 | * |
|  | ! | ! | ! | ! | ! | ! | ! | ! | ! |  |  |  |
| metallic_AT | 3.61 | 4.64 | 4.59 | 3.6 | 3.36 | 4.56 | 4.67 | 4.32 | 4.39 | 2.02 | 0.0529 |  |
|  | A | A | A | A | A | A | A | A | A |  |  |  |
| dry_AF | 8.56 | 8.67 | 8.27 | 7.63 | 7.93 | 8.12 | 7.84 | 8.34 | 7.84 | 1.73 | 0.1015 | ** |
|  | ! | ! | ! | ! | ! | ! | ! | ! | ! |  |  |  |

*significant at 5%  
**significant at 1%  
***significant at 0.1%  
! test not computed

FIG. 25

| Summary Factor: Product Tukey test at 10% | | | | | | |
|---|---|---|---|---|---|---|
| Analysis | P53 | C162 | C164 | Comp. F | Proba. | I. Judge |
| foam height_APP | 4.31 | 3.61 | 3.85 | 17.11 | <0.0001 | *** |
| | A | B | B | | *** | |
| bubble size_APP | 4.91 | 6.33 | 5.51 | 11.46 | 0.0002 | *** |
| | B | A | B | | *** | |
| uniformity | 6.44 | 6.94 | 5.3 | 55.02 | <0.0001 | *** |
| | B | A | C | | *** | |
| density_APP | 3.67 | 3.35 | 4.09 | 7.16 | 0.0026 | *** |
| | B | B | A | | ** | |
| aerated_APP | 5.6 | 6.46 | 5.07 | 19.99 | <0.0001 | *** |
| | B | A | C | | *** | |
| viscosity_FMF | 3.79 | 3.6 | 3.57 | 0.74 | 0.4831 | *** |
| | ! | ! | ! | | | |
| smooth_FMF | 6.86 | 7.02 | 6.61 | 1.06 | 0.3592 | *** |
| | ! | ! | ! | | | |
| aerated_FMF | 5.59 | 5.48 | 5.13 | 0.95 | 0.3976 | *** |
| | ! | ! | ! | | | |
| powdery_FMF | 3.63 | 4.31 | 3.52 | 1.92 | 0.1633 | *** |
| | ! | ! | ! | | | |
| dry_FMF | 4.53 | 4.15 | 4.07 | 1.26 | 0.2978 | *** |
| | ! | ! | ! | | | |

FIG. 26

| Analysis | P53 | C162 | C164 | Comp. F | Proba. | I.Judge |
|---|---|---|---|---|---|---|
| viscosity_MF | 4.92 | 4.64 | 4.3 | 6.89 | 0.0032 | *** |
| | A | AB | B | | ** | |
| smooth_MF | 7.43 | 7.94 | 7.06 | 5.73 | 0.0073 | *** |
| | AB | A | B | | ** | |
| powdery_MF | 3.5 | 3.65 | 3.92 | 1.16 | 0.3269 | *** |
| | ! | ! | ! | | | |
| dry_MF | 4.17 | 4.83 | 4.98 | 28.95 | <0.0001 | *** |
| | B | A | A | | *** | |
| milky_FL | 7.49 | 7.43 | 6.95 | 4.09 | 0.0259 | *** |
| | A | A | B | | * | |
| processed_FL | 8.4 | 7.69 | 7.22 | 2.47 | 0.1002 | |
| | ! | ! | ! | | | |
| sweet_FL | 4 | 4.02 | 3.45 | 2.61 | 0.0887 | *** |
| | A | A | A | | | |
| roasted_FL | 5.75 | 6.52 | 5.54 | 26.97 | <0.0001 | *** |
| | B | A | B | | *** | |
| sour | 3.26 | 4.45 | 3.3 | 74.28 | <0.0001 | *** |
| | B | A | B | | *** | |
| creamy_FL | 6.22 | 5.36 | 5 | 5.08 | 0.0119 | |
| | A | B | B | | * | |
| bitter_FL | 5.82 | 6.59 | 5.75 | 5.32 | 0.0099 | *** |
| | B | A | B | | ** | |
| musty_FL | 2.2 | 2.55 | 3.83 | 9.79 | 0.0005 | *** |
| | B | B | A | | *** | |
| soapy_FL | 3 | 1.34 | 1.49 | 20.53 | <0.0001 | *** |
| | A | B | B | | *** | |
| smoky_FL | 4.02 | 4.34 | 4.12 | 1.08 | 0.3517 | *** |
| | ! | ! | ! | | *** | |
| earthy_FL | 3.7 | 2.6 | 2.88 | 10.83 | 0.0002 | *** |
| | A | B | B | | *** | |
| rubbery_FL | 0.55 | 0.37 | 0.23 | 2.33 | 0.1129 | * |
| | ! | ! | ! | | | |
| grainy_FL | 1.35 | 2.03 | 2.48 | 3.39 | 0.0459 | ** |
| | B | AB | A | | * | |
| rancid | 0.14 | 1.24 | 1.92 | 9.17 | 0.0007 | * |
| | B | A | A | | *** | |
| milky_AT | 6.3 | 5.7 | 5.35 | 3.72 | 0.0351 | *** |
| | A | AB | B | | * | |
| sweet_AT | 3.52 | 3.14 | 3.03 | 0.89 | 0.422 | * |
| | ! | ! | ! | | | |
| roasted_AT | 4.85 | 4.65 | 4.49 | 2.26 | 0.1201 | *** |
| | ! | ! | ! | | | |
| bitter_AT | 5.09 | 5 | 4.93 | 0.42 | 0.6593 | *** |
| | ! | ! | ! | | | |
| metallic_AT | 4.19 | 4.1 | 4.15 | 0.11 | 0.8952 | *** |
| | ! | ! | ! | | | |
| dry_AF | 7.58 | 8.14 | 7.74 | 2 | 0.1516 | *** |
| | ! | ! | ! | | | |

*significant at 5%
**significant at 1%
***significant at 0.1%
! test not computed

DAIRY MINERAL-FORTIFIED LIQUID DAIRY PRODUCTS AND METHODS OF MAKING

CROSS REFERENCE TO RELATED APPLICATION

This application claims the benefit of the priority date of U.S. Provisional Application No. 61/593,639, filed Feb. 1, 2012, which is hereby incorporated herein by reference in its entirety.

FIELD

The field relates to liquid dairy products and, more specifically, to liquid dairy products fortified with dairy minerals, such as concentrated milk, and methods for producing the same.

BACKGROUND

During the production of various dairy products, liquid milk starting materials are subjected to a variety of treatments, including heating and concentrating steps in which certain components of the milk are removed. For example, in typical cream cheese processes, curd is separated from liquid whey by centrifugation or other techniques. Minerals and other components from the dairy starting material are lost in the liquid whey.

Liquid dairy products, such as milk, are generally thermally processed to increase their stability and to render them microbiologically safe. Unfortunately, thermally treating of milk can result in color changes, gelation, and development of off flavors. The off flavors include "cooked milk" type flavors which lead to loss of fresh milk impression. Heating milk to high temperatures can result in an unsightly brown color due to Maillard reactions between the lactose and proteins in the milk, which is often referred to as browning. Gelation, on the other hand, is not completely understood, but the literature suggests that gels may form, under certain conditions, as a three-dimensional protein matrix formed by the whey proteins. See, e.g., Datta et al., "Age Gelation of UHT Milk-A Review," Trans. IChemE, Vol. 79, Part C, 197-210 (2001). Both gelation and browning are generally undesirable in milk since they impart objectionable organoleptic properties.

The concentration of milk is often desired because it allows for smaller quantities to be stored and transported, thereby resulting in decreased storage and shipping costs, and may allow for the packaging and use of milk in more efficient ways. However, the production of an organoleptically-pleasing, highly concentrated milk can be difficult, because the concentration of milk generates even more pronounced problems with gelation, browning, and also the formation of compounds imparting undesired flavor and off-notes. For instance, milk that has been concentrated at least three fold (3×) has an even greater tendency to undergo protein gelation and browning during thermal processing. Additionally, due to such high levels of protein in the concentrated milk, it may also have a greater tendency to separate and form a gel over time as the product ages, thereby limiting the usable shelf life of the product.

A typical method of producing concentrated milk involves multiple heating steps in combination with concentrating the milk. For example, one general method used to produce concentrated milk involves first standardizing milk to a desired ratio of solids to fat and then forewarming the milk to reduce the risk of casein coagulation during a later sterilization step. Forewarming also decreases the risk of coagulation during storage prior to sterilization and may further decrease the initial microbial load. The forewarmed milk is then concentrated to the desired concentration. The milk may be homogenized, cooled, restandardized, and packaged. In addition, a stabilizer salt may be added to help to further reduce the risk of coagulation at high temperatures or during storage. The product is sterilized before or after packaging. Sterilization usually involves relatively low temperatures for relatively long periods of time (for example, about 90° C. to about 120° C. for about 5 to about 30 minutes) or relatively high temperatures for relatively short periods of time (for example, about 135° C. or higher for a few seconds).

U.S. Patent Application Publication No. 2007/0172548 A1 (Jul. 26, 2007) to Cale et al. discloses a process for producing a concentrated milk with high levels of dairy proteins and low levels of lactose. Cale et al. disclose thermal treatments combined with the ultrafiltration of a liquid dairy base to produce a concentrated dairy product having greater than about 9 percent protein (generally about 9 to about 15 percent protein), about 0.3 to about 17 percent fat (generally about 8 to about 8.5 percent fat), and less than about 1 percent lactose.

However, Cale et al. disclose that all the protein and fat in the final concentrated beverage are supplied directly from the starting liquid dairy base and, therefore, the amounts in the final beverage are also constrained by the composition of the starting dairy base and the particular concentration process employed. In other words, if higher amounts of protein or fat are desired in a final beverage obtained from Cale et al.'s process, then the other of the protein or fat is also increased by a corresponding amount, because each component is only supplied from the same starting dairy base and, therefore, subjected to the same concentration steps. Therefore, the process of Cale et al. will generally not permit a concentrated dairy beverage having increases in one of protein or fat and, at the same time, decreases in the other of protein or fat.

SUMMARY

A method of making a concentrated dairy liquid is provided. The method comprises: concentrating a pasteurized first dairy liquid to obtain a concentrated dairy liquid retentate; blending a high fat dairy liquid into the concentrated dairy liquid retentate to form a fat enriched dairy liquid; homogenizing the fat enriched dairy liquid to form a homogenized fat enriched dairy liquid; adding a blend of dairy minerals to the homogenized fat enriched dairy liquid; and heating the homogenized fat enriched dairy liquid including the blend of dairy minerals to obtain a concentrated dairy liquid having a $F_o$ value of at least 5, the concentrated dairy liquid having a protein to fat ratio of from about 0.4 to about 0.75 and lactose in an amount of up to about 1.25 percent.

In one approach, the protein to fat ratio is from about 0.61 to about 0.7.

The concentrated dairy liquid can include from about 7 to about 9 percent protein. The concentrated dairy liquid can include from about 9 to about 14 percent fat.

In one approach, the liquid dairy base is whole milk. In another approach, the high fat dairy liquid is cream.

In one approach, about 3 to about 34 percent cream is added to the concentrated dairy liquid retentate.

The blend of dairy minerals can include at least one of potassium, magnesium, calicium, and phosphorus. The lend of dairy minerals can comprise between 0.15 and 1.5% by weight of the homogenized fat enriched dairy liquid. The blend of dairy minerals can also comprises from about 0.5 to about 0.75% by weight of the homogenized fat enriched dairy liquid.

In one approach, a method of making a concentrated dairy liquid comprises: pasteurizing a dairy cream; concentrating the pasteurized cream to obtain a concentrated cream retentate; homogenizing the concentrated cream retentate to form a homogenized cream retentate; adding a blend of dairy minerals to the homogenized cream retentate; heating the homogenized cream retentate including the blend of dairy minerals to obtain a concentrated dairy liquid having a $F_o$ value of at least 5. The concentrated dairy liquid has a protein to fat ratio of from about 0.4 to about 0.7 and lactose in an amount of up to 1.5 percent.

The method can further comprise diluting the cream with water after the pasteurizing.

The ratio of the water to the cream can be from about 2:1 to about 4:1.

In one approach, the concentrated cream retentate can include about 2.0 to about 3.0 percent protein.

In another approach, the concentrated dairy liquid includes about 1.3 to about 2 percent protein.

In an approach, the concentrated dairy liquid can include about 20 to about 30 percent fat.

The concentrated dairy liquid can comprise at least one of potassium, magnesium, calcium, and phosphorus. The blend of dairy minerals can comprise between 0.15 and 1.5% by weight of the homogenized cream retentate. In one approach, the blend of dairy minerals can comprise between 0.5 and 0.75% by weight of the homogenized cream retentate.

The concentrated dairy liquid can include about 35 to about 65 percent total solids.

A concentrated dairy liquid is also provided. The liquid comprises: from about 7 to about 9 percent total protein; from about 9 to about 14 percent total fat; and lactose in an amount of less than about 1.5 percent, and a ratio of protein to fat of about 0.4 to about 0.75.

The concentrated dairy liquid can have a whole milk base.

The liquid can have a protein to fat ratio of from about 0.61 to about 0.7.

The liquid can comprise a blend of dairy minerals including at least one of potassium, magnesium, calcium, and phosphorus. The blend of dairy minerals can comprise between 0.15 and 1.5% by weight of the concentrated dairy liquid.

In one approach, the concentrated dairy liquid comprises a ratio of potassium to protein of from about 0.0040 to about 0.0043, a ratio of magnesium to protein of from about 0.0018 to about 0.0025, a ratio of calcium to protein of from about 0.0347 to about 0.047, and a ratio of phosphate to protein of from about 0.0897 to about 0.1045.

In an approach, the concentrated dairy liquid can comprise one of the following ratios: potassium to protein of from about 0.0040 to about 0.0043; magnesium to protein of from about 0.0018 to about 0.0025; calcium to protein of from about 0.0347 to about 0.047; and phosphate to protein of from about 0.0897 to about 0.1045.

In one approach, a concentrated dairy liquid comprises: about 1.3 to about 2.0 percent protein; about 20 to about 30 percent fat; lactose in an amount of less than about 1.5 percent; and about 35 to about 65 percent total solids, and the concentrated dairy liquid comprises a ratio of protein to fat of about 0.04 to about 0.1.

The concentrated dairy liquid can have a cream base.

The concentrated dairy liquid can include a blend of dairy minerals including at one of potassium, magnesium, calcium, and phosphorus. The blend of dairy minerals comprises between 0.15 and 1.5% by weight of the concentrated dairy liquid.

In one approach, the concentrated dairy liquid comprises a ratio of potassium to protein of from about 0.017 to about 0.026, a ratio of magnesium to protein of from about 0.008 to about 0.022, a ratio of calcium to protein of from about 0.122 to about 0.352, and a ratio of phosphate to protein of from about 0.199 to about 0.539.

In an approach, the concentrated dairy liquid comprises one of the following ratios: potassium to protein of from about 0.017 to about 0.026; magnesium to protein of from about 0.008 to about 0.022; calcium to protein of from about 0.122 to about 0.352; and phosphate to protein of from about 0.199 to about 0.539.

BRIEF DESCRIPTION OF THE DRAWINGS

FIG. 21 is a table presenting sensory data for the experimental samples and comparative product;

FIG. 22 is a table presenting sensory data for the experimental samples and comparative product;

FIG. 23 is a table presenting sensory data for the experimental samples and comparative product;

FIG. 24 is a table presenting sensory data for the experimental samples and comparative product;

FIG. 25 is a table presenting sensory data for the experimental samples and comparative product;

FIG. 26 is a table presenting sensory data for the experimental samples and comparative product;

DETAILED DESCRIPTION

Figure 1:
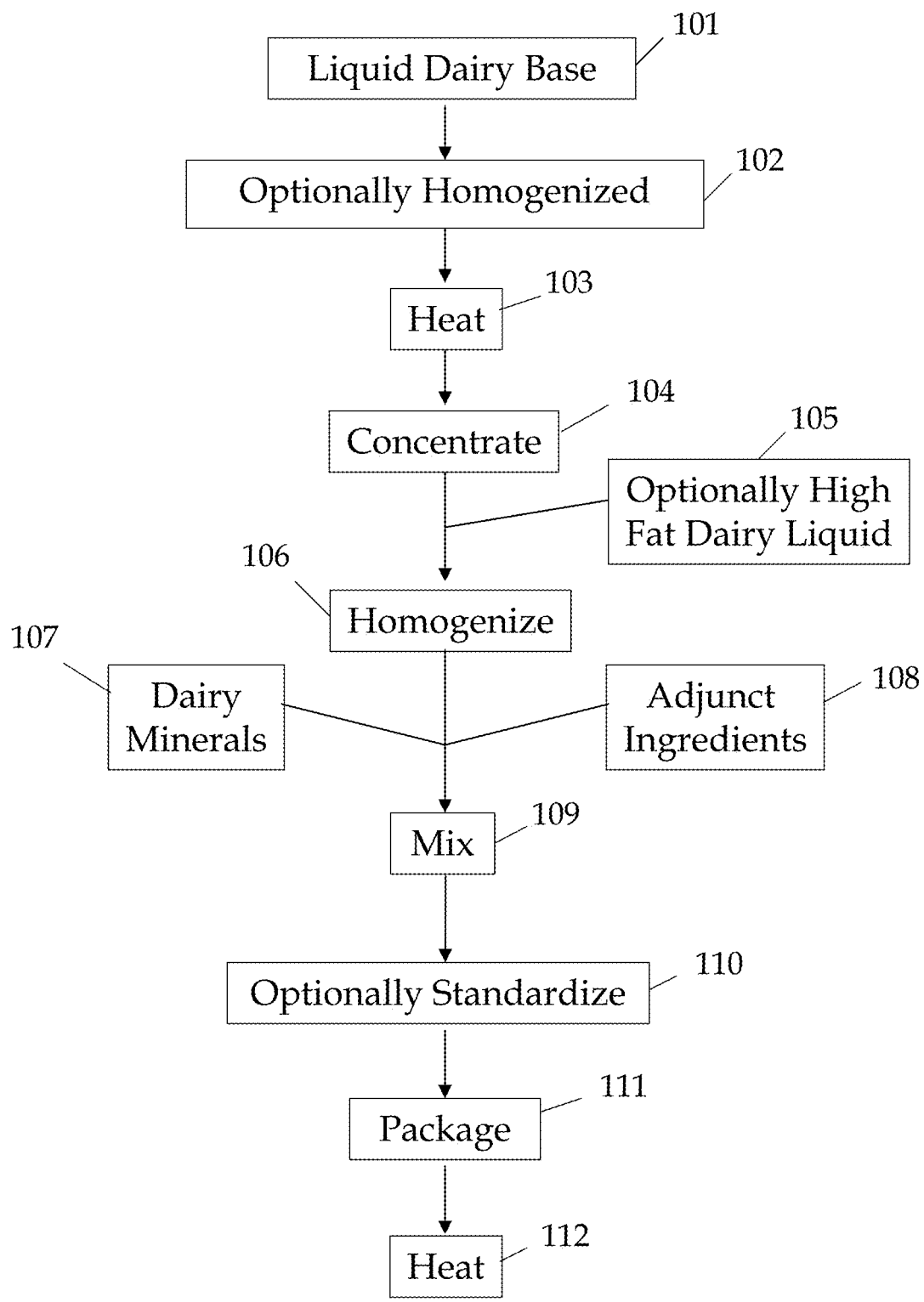
FIG. 1 is a flowchart of an exemplary method of forming a stable concentrated dairy liquid fortified with dairy minerals.

The methods and products disclosed herein relate to liquid dairy products fortified with dairy minerals. It was found that liquid dairy products prepared by ultrafiltration had different flavor than fresh milk products. While ultrafiltration advantageously removes water and lactose, it is believed that ultrafiltration also removes milk minerals that contribute to fresh dairy flavor notes of fresh milk products. It was surprisingly found that fortification with dairy minerals provided liquid dairy products with milk flavor notes characteristic of fresh dairy products. The addition of dairy minerals was found to be particularly suitable for concentrated dairy liquids. It was further discovered that fortification with a single dairy mineral is generally insufficient to provide the flavor benefits. In other words, it has been found that a mixture of at least two dairy minerals is needed to provide fresh dairy flavor notes to the liquid dairy product. By yet another approach, it has been discovered that addition of gum arabic with the dairy minerals is effective to increase the perception of fresh dairy flavor notes in the product.

As used herein, the term "dairy minerals" refers to minerals or mineral-containing ions naturally found in dairy liquids, such as cow's milk. Exemplary dairy minerals include, for example, sodium, potassium, magnesium, calcium, and phosphate ions. The dairy minerals are provided in the liquid dairy products in amounts in addition to those naturally present in the dairy products.

While the mineral content of raw milk varies due to a variety of factors, the most abundant minerals in typical raw cow milk are citrate (176 mg/100 g), potassium (140 mg/100 g), calcium (117.7 mg/100 g), chloride (104.5 mg/100 g), phosphorus (95.1 mg/100 g), sodium (58 mg/100 g), and magnesium (12.1 mg/100 g). It has been found that dairy mineral powders with an increased calcium content relative to other minerals in the blend, such as potassium, sodium and magnesium, are particularly advantageous for providing fresh dairy flavor notes to a dairy product.

By one approach, the dairy minerals are added to the dairy products in an amount of about 0.1% to about 1.5% percent by weight of the dairy product, in another aspect about 0.5 to about 0.75 percent by weight of the dairy product.

In another approach, the dairy minerals are added to the dairy products to provide a particular ratio of dairy minerals to total protein. By total protein is meant the total amount of protein included in the dairy product. Casein and whey are typically the predominant proteins found in cow milk and therefore any dairy products including dairy liquids or dairy proteins derived from cow milk.

In some aspects, dairy products to which the dairy minerals have been added are characterized by reduced astringency compared to otherwise identical dairy products that do not include added dairy minerals. Dairy products often have astringent flavor as a result of high protein content, low fat content, and/or low pH. In other aspects, dairy products to which the dairy minerals have been added are characterized by less sourness than an otherwise identical dairy product that does not include added dairy minerals. Dairy products often have sour flavor due to low pH. In yet other aspects, dairy products to which the dairy minerals have been added are characterized by increased creamy or buttery flavor that is desirable in many dairy products.

While not wishing to be bound by theory, it is presently believed that the flavor profile of the dairy products to which the dairy minerals is altered by interaction of the dairy minerals with other components of the dairy product, particularly casein. It is further believed that these interactions affect flavor release, thereby changing flavor perception when the liquid dairy product is consumed. It is presently believed that there is larger amount of flavors released in liquid dairy products. The altered flavor release impacts the flavor profile perceived by the consumer. For instance, delaying the release of buttery flavors is often perceived as a desirable lingering buttery dairy flavor rather than an upfront buttery flavor that fades quickly when the dairy product is consumed.

It was further discovered that fortification with a single dairy mineral is generally insufficient to provide the flavor benefits. A mixture of at least two dairy minerals, in another aspect at least three dairy minerals, is generally needed to provide fresh dairy flavor notes to the dairy product. In one aspect, the dairy minerals added to the dairy product include at least two of sodium, potassium, magnesium, calcium, and phosphate. In another aspect, the dairy minerals added to the dairy product include at least three of sodium, potassium, magnesium, calcium, and phosphate. In another aspect, the dairy minerals added to the dairy product include at least four of sodium, potassium, magnesium, calcium, and phosphate. In yet another aspect, the dairy minerals added to the dairy product include sodium, potassium, magnesium, calcium, and phosphate.

The dairy minerals included in the liquid dairy products can be in a variety of forms. For example, the dairy minerals may be in the form of a liquid, powder, gel, emulsion, or the like and can be obtained from a variety of milk products, milk derivatives, or dairy processes. For example, ultra-filtered or nano-filtered dairy permeates, such as whey permeates obtained in conventional cheese-making processes, can be used as a source of milk minerals. The filtered milk permeates can be concentrated to reduce water content and used in the form of a liquid or powder. If desired, the concentrated permeates can be further treated to increase the content of particular minerals and/or to reduce the quantity of lactose or lactic acid.

It has been discovered that dairy mineral ingredients having different mineral and lactose contents can provide different flavor profiles to the mineral fortified dairy product so dairy mineral ingredients having greater or lesser quantities of particular minerals may be desired in a particular application or product type. In one aspect, it was found that low lactose dairy mineral powders, such as TRUCAL® D7 and OPTISOL™ 1200 from Glanbia PLC, are particularly advantageous for concentrated dairy liquid applications. As used herein, "low lactose" means less than about 10 percent lactose by weight of the dairy mineral composition. Low lactose dairy mineral ingredients are presently preferred because lactose can contribute to generation of off flavors during heating. Higher amounts of lactose may be acceptable in certain applications, so long as the lactose does not provide an overly sweet taste or other off flavor to the liquid dairy product.

Incorporation of Dairy Minerals into Concentrated Dairy Liquids

By one approach, concentrated dairy liquids are provided having enhanced fresh dairy notes and substantially reduced cooked notes. In some aspects, the concentrated dairy liquids have increased fresh dairy flavor, increased creamy flavor, reduced astringency, reduced chalky flavor, and reduced processed flavor. The concentrated dairy liquids are shelf stable for at least about six months at ambient temperature.

The concentrated dairy liquids are generally provided by a method comprising heating a dairy liquid base, concentrating the dairy liquid base using ultrafiltration with or without diafiltration, optionally blending a high fat dairy liquid into the concentrated dairy liquid, homogenizing the concentrated dairy liquid, adding dairy minerals and adjunct ingredients before and/or after homogenizing the concentrated dairy liquid, and heating the homogenized concentrated dairy liquid at a temperature and for a time effective to produce a shelf stable concentrated dairy liquid having a sterilization value of $F_0$ of at least about 5. It was surprisingly found that fortifying shelf stable concentrated dairy liquids with dairy minerals provided enhanced perception of fresh dairy notes. In one aspect, the dairy liquid base is whole milk. In another aspect, the dairy liquid base is cream. When the dairy liquid base is whole milk, it is preferable to add a high fat dairy liquid, such as cream, after the concentration step. When the dairy liquid base is cream, the concentration by ultrafiltration is optional.

"Shelf-life" or "shelf-stable" means the period of time at which the concentrated dairy liquid can be stored at ambient temperatures (i.e., at about 70° F. to about 75° F.) without developing an objectionable aroma, appearance, taste, consistency, or mouthfeel. In addition, an organoleptically acceptable dairy product at a given shelf life will have no off-odor, off-flavor, or brown coloring. "Stable" or "shelf-stable" means that the dairy product at a given time does not have objectionable characteristics as defined above and is organoleptically acceptable.

At least in some approaches, the terms "stable" or "shelf-stable" also mean a Brew Recovery of at least about 90 percent. Brew Recovery is a measurement of the dairy solids that are recovered in a cup as compared to the starting dairy solids when reconstituted at ambient conditions. For purposes herein, Brew Recovery was measured using a Bosch T45 Tassimo Beverage Brewer and a standard Tassimo creamer T-Disc (Kraft Foods).

In another aspect, the concentrated dairy liquid is substantially resistant to gelation during ambient storage and maintains a viscosity ranging from about 20 cP to about 100 cP and, in another aspect, about 50 cP to about 300 cP at ambient temperatures when measured at about 20° C. with a Brookfield RV viscometer using Spindle #2 at 100 rpm.

In particular, the concentrated dairy liquids made by the disclosed processes exhibit such stability even when exposed to thermal processing sufficient to achieve a sterilization value ($F_o$) of at least about 5 as required for commercial sterility and, in another aspect, a sterilization value ($F_o$) of about 5 to about 8. Even after being exposed to such sterilization, the stable concentrated dairy liquids generally have minimal fat and protein degradation, which results in reduced aroma intensity levels due to sulfur and nitrogen containing volatiles.

Essentially any liquid dairy base can be used in the present methods. Preferably, the liquid dairy base originates from any lactating livestock animal whose milk is useful as a source of human food. Such livestock animals include, by way of non-limiting example, cows, buffalos, other ruminates, goats, sheep, and the like. Generally, however, cow's milk is one source of the starting material. The milk used may be whole milk, low-fat milk, or skim milk. As the process targets a concentrated stable dairy liquid having an increased fat content, whole milk and/or cream may be another source for the starting material; however, the starting dairy source may also be skim, low-fat, or reduced fat milk as needed for a particular application with more or less high fat dairy liquid addition as needed to obtain a target fat value in the resulting concentrated dairy liquid. As used herein, "reduced fat" milk generally means about 2 percent fat milk. "Low fat" milk generally means about 1 percent fat milk, whereas "fat free milk" or "skim milk" both generally mean less than about 0.2 percent fat milk. "Whole milk" generally means not less than about 3.25 percent fat milk and can be standardized or unstandardized. "Milk butter" generally means the residual product remaining after milk or cream has been made into butter and contains not less than about 3.25 percent fat. "Raw milk" generally means milk that has not yet been thermally processed. The milk or milk products used in the processes described herein can be standardized or non-standardized. The preferred milk is obtained from cows; however, other mammalian milk suitable for human consumption can be used if desired. "Cream" generally refers to a sweet cream, which is a cream or fat obtained from the separation of a whole milk. Generally, cream has a fat content from about 32 to about 42 percent, about 3 to about 5 percent lactose, and less than about 2 percent protein.

Cow's milk contains lactose, fat, protein, minerals, and water, as well as smaller amounts of acids, enzymes, gases, and vitamins. Although many factors may affect the composition of raw cow's milk, it generally contains about 11 to about 15 percent total solids, about 2 to about 6 percent milk fat, about 3 to about 4 percent protein, about 4 to about 5 percent lactose, about 0.5 to about 1 percent minerals, and about 85 to about 89 percent water. Although milk contains many types of proteins, they generally can be grouped into the two general categories: casein proteins and serum proteins. The minerals, also known as milk salts or ash, generally include, as the major components, calcium, sodium, potassium, and magnesium; these cations can combine with phosphates, chlorides, and citrates in milk. Milk fat is mostly comprised of triglycerides, and smaller amounts of various other lipids. Lactose or milk sugar (4-O-β-D-galactopyranosyl-D-glucose) is a reducible disaccharide present in raw milk.

For purposes herein, "serum protein" generally refers to the protein content of milk plasma other than casein (i.e., serum protein generally refers to the whey protein content). "Milk plasma" generally refers to the portion of raw milk remaining after removal of the fat content. "Casein" generally encompasses casein per se (i.e., acid casein) or water soluble salts thereof, such as caseinates (e.g., calcium, sodium, or potassium caseinates, and combinations thereof). Casein amounts and percentages described herein are reported based on the total amount present of casein and caseinate (excluding the metal cation amount thereof). Casein generally relates to any, or all, of the phosphoproteins in milk, and to mixtures of any of them. An important characteristic of casein is that it forms micelles in naturally occurring milk. Many casein components have been identified, including, but not limited to, α-casein (including $α_{s1}$-casein and ase-casein), β-casein, γ-casein, κ-casein, and their genetic variants.

If desired, the dairy base may be diluted prior to use in the methods described herein, such as to achieve a desired total solids content in the dairy base. For purposes herein, "total milk solids" or "total solids" generally refers to the total of the fat and solid-not-fat (SNF) contents. "SNF" generally refers to the total weight of the protein, lactose, minerals, acids, enzymes, and vitamins.

By one approach, a concentrated dairy liquid having enhanced fresh dairy notes and substantially reduced cooked notes is provided according to a method as generally shown in FIG. 1. In this exemplary process, a liquid dairy base 101 is provided, which may be optionally homogenized in step 102 and then heated in step 103 to a temperature and for a time effective to pasteurize the liquid dairy base. In one aspect, heating step 103 may be a pasteurization step. In another aspect, the heating step may be a forewarming step, such as that described in U.S. Patent Application Publication No. 2007/0172548, which is incorporated herein by reference. It is generally advantageous to minimize the length of the heat treatment so as to substantially reduce the development of off flavors.

The heated dairy liquid is then concentrated in step 104 to a desired level, generally about 23 to about 30 percent total solids. In one aspect, concentration step 104 includes ultrafiltration. In another aspect, concentration step 104 includes ultrafiltration in combination with diafiltration. If ultrafiltration is combined with diafiltration, the diafiltration is typically carried out during or after ultrafiltration. After concentration step 104, an optional amount of high fat dairy liquid 105 is combined with the concentrated dairy liquid to form a fat-enriched concentrated dairy liquid having about 9 to about 11 percent protein, greater than about 15 percent fat (in another aspect about 15 to about 18 percent fat), and less than about 1.5 percent lactose (in another aspect less than about 1.0 percent lactose).

Next, the fat-enriched concentrated dairy liquid is homogenized in step 106 to form a homogenized fat-enriched dairy liquid. After homogenization, dairy minerals 107 (e.g., about 0.1 to about 1.0 percent) and adjunct ingredients 108 are mixed into the homogenized fat-enriched dairy liquid in step 109 to form a stabilized, fat-enriched concentrated dairy liquid. It was found that the ultrafiltration step had a big impact on the flavor profile of the milk concentrate, even when temperature was controlled during ultrafiltration to avoid heat-induced flavor changes. Ultrafiltration (with or without diafiltration) results in the removal of lactose and dairy minerals in the permeate. It was surprisingly found that addition of dairy minerals is able to substantially restore the concentrated dairy liquid with fresh milk flavor notes that were characteristic of the liquid dairy base before ultrafiltration.

By one approach, the adjunct ingredients 108 include at least a stabilizer to form a stabilized fat-enriched concentrated dairy liquid. Optional other ingredients may be mixed into the homogenized fat-enriched concentrated dairy liquid. The stabilized fat-enriched concentrated dairy liquid may optionally be subjected to standardization step 110 prior to packaging step 111, if so desired. For example, in some approaches, standardization involves diluting the concentrated dairy liquid to desired solids, protein, and/or fat levels.

The packaged concentrated dairy liquid may then be subjected to heat treatment step 112 at temperature and for a time effective to achieve a $F_o$ value greater than about 5 and, in another aspect, a $F_o$ value of about 5 to about 8. In some approaches, the heat treatment is conducted by retorting the packaged product.

In some aspects, the stable concentrated dairy liquid provided by the method of FIG. 1 includes about 7 to about 9 percent total protein (in another aspect about 8 to about 9 percent protein), about 9 to about 14 percent total fat (in another aspect about 11 to about 12 percent total fat), and less than about 1.25 percent lactose (in another aspect less than about 1 percent lactose). In some approaches, the stable concentrated dairy liquid may have a protein to fat ratio of about 0.4 to about 0.7, in another aspect, a protein to fat ratio of about 0.61 to about 0.75. With such formulation, the dairy liquid may have up to about 2.5 times as much fat as protein. The fat and protein content of the stable concentrated dairy liquid is supplied from both the starting liquid dairy base and through the optional addition of the high fat dairy liquid. By one approach, the optional high fat dairy liquid is cream. Generally due to the low protein and high fat content, the disclosed concentrated dairy liquids exhibit enhanced fresh dairy flavor profiles with substantially no off-notes or flavors even after sterilization heat treatments.

In another aspect, the optional addition of the high fat dairy liquid occurs at specified points during the concentration and thermal treatment process in order to form concentrated dairy liquids that remain stable during thermal processing and throughout the extended shelf life. In one approach, the high fat dairy liquid addition occurs after concentrating the starting liquid dairy base but before homogenization and addition of the dairy minerals and optional adjunct ingredients. It was discovered that adding the high fat dairy liquid at steps other than those identified above can result in concentrates that gel or separate after sterilization or during an extended shelf life.

Figure 2:
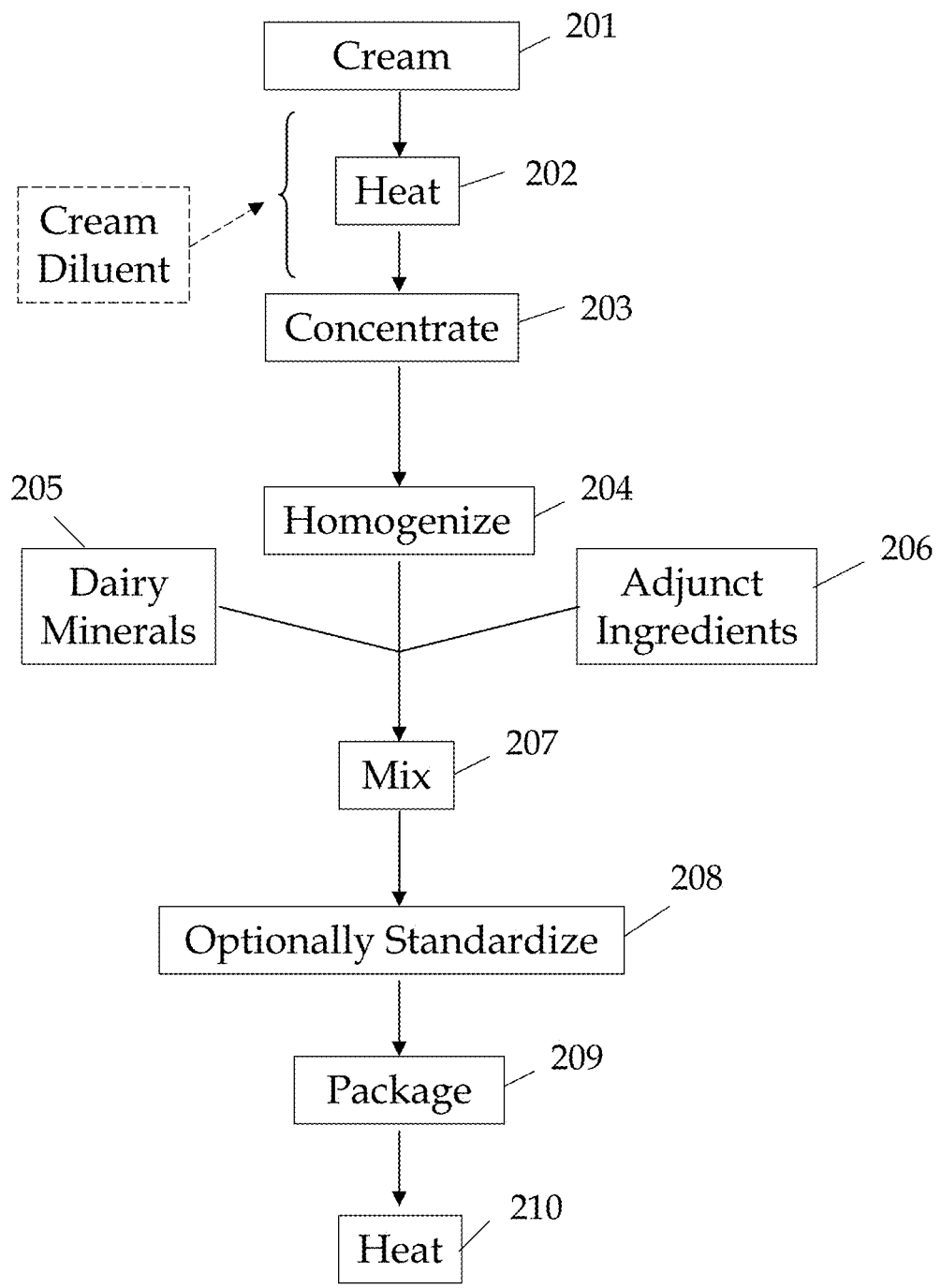
FIG. 2 is a flowchart of another exemplary method of forming a stable concentrated dairy liquid fortified with dairy minerals.

FIG. 2 illustrates a further approach for producing a stable concentrated dairy liquid having enhanced fresh dairy flavors. As shown in FIG. 2, the starting dairy base is cream 201, which is then heated in step 202, for example at a temperature and for a time effective to pasteurize the cream. By one approach, the cream may be diluted with water, either before pasteurization or after pasteurization, but in both cases before ultrafiltration. In some approaches, a blend of water and cream is provided at a ratio of about 2:1 to about 4:1 and in some approaches about 3:1. The heated cream is then concentrated in step 203, such as using ultrafiltration with or without diafiltration, to form a concentrated cream retentate having reduced levels of lactose and minerals. The concentration step is conducted so as to provide a cream retentate including about 2.0 to about 3.0 percent protein (in another aspect about 2.4 to about 2.8 percent protein), about 30 to about 45 percent fat (in another aspect about 38 to about 42 percent fat), less than about 1.5 percent lactose (in another aspect less than about 1.0 lactose), and about 35 to about 50 percent total solids (in another aspect about 38 to about 42 percent). The cream retentate is then homogenized in step 204 to form a homogenized concentrated cream. At least in some aspects, the cream is not pre-homogenized prior to being heated or concentrated as such variations can affect final product stability.

Dairy minerals 205 and adjunct ingredients 206 may be added to the concentrated cream, such as in mixing step 207, or before homogenization step 204 to form a stable concentrated dairy liquid. If desired, the dairy minerals may be mixed into the cream retentate at a step the same as or different from mixing in the adjunct ingredients. For example, the dairy minerals may be added prior to homogenization step 204 and the adjunct ingredients added after homogenization step 204 or vice versa. In another aspect, the dairy minerals and the adjunct ingredients may both be added before or after the cream retentate is homogenized. As discussed in more detail below, about 0.10 to about 1.0 percent dairy minerals are added to the cream retentate. In some aspects, the adjunct ingredients include about 0.2 to about 0.6 percent stabilizer, about 0.40 to about 1.6 percent of at least one mouthfeel enhancer (for example, sodium chloride), and optional additives (for example, about 0.04 to about 0.5 percent flavor and about 10 to about 30 percent sugar) can be mixed with the concentrated cream. In one aspect, the stabilizer includes about 25 to about 50 percent disodium phosphate and about 50 to about 75 percent monosodium phosphate. In other approaches, trisodium citrate can be used as the stabilizer.

The resulting product may then be subjected to optional standardizing step 208, packaging step 209, and heating step 210 (e.g., retorting step) to achieve a $F_o$ of at least 5, in another aspect about 5 to about 8, to provide the desired stable concentrated dairy liquid. By one approach, the stable concentrated dairy liquid has a composition of about 1.3 to about 2.0 percent protein (in another aspect about 1.5 to about 1.8 percent protein), about 20 to about 30 percent fat (in another aspect about 23 to about 27 percent fat), less than about 1.5 percent lactose (in another aspect less than about 1.0 lactose), and about 35 to about 65 percent total solids (in another aspect about 44 to about 65 percent total solids). In some approaches, the resulting product also has a protein to fat ratio of about 0.04 to about 0.1. The fat in the stable concentrated dairy liquid is preferably supplied from the fat in the cream starting material that is subjected to ultrafiltration.

Each of the process steps of FIGS. 1 and 2 are now described in more detail. In one aspect, the dairy liquid is pasteurized using any method or equipment known in the art (such as, for example, jacketed reactors, heat exchangers, and the like) to achieve the desired temperature for pasteurization. By one approach, the pasteurization step is at a temperature of about 72° C. to about 95° C. for about 1 to about 300 seconds to form a pasteurized dairy base. By other approaches, pasteurization is conducted at about 72° C. to about 80° C. for about 18 to about 30 seconds. Other pasteurization conditions may also be used so long as the desired degree of microbe reduction and the desired stability of the final product are obtained. However, it is generally desirable to use the minimum temperature and length of treatment possible to achieve the desired microbe reduction so as to reduce the likelihood of forming heat-induced off flavors and browning of the milk.

After the pasteurization step, the dairy liquid base is concentrated to the desired solids level to form a concentrated dairy liquid retentate. Concentration may be completed by ultrafiltration with or without diafiltration. For purposes of the methods herein, ultrafiltration is considered to include other membrane concentrations methods such a microfiltration and nanofiltration. Examples of suitable methods involving microfiltration, ultrafiltration, and diafiltration to concentrate a dairy liquid are found in U.S. Pat. No. 7,026,004, which is incorporated herein by reference.

In one aspect, the dairy liquid base is concentrated by at least about 2-fold and in another aspect at least about 4-fold with respect to the protein content. Using ultrafiltration, a significant amount of lactose and minerals are removed during the concentration step. In one aspect, at least about 50 percent of the lactose and minerals present in the dairy liquid base are removed. In another aspect, at least about 90 percent of the lactose and minerals are removed. Removal of at least a portion of the lactose during the concentration process is desirable because it was found that lactose contributes to development of undesirable cooked flavor notes and yellowing or browning upon heating. A portion of the dairy minerals are removed along with lactose in most ultrafiltration processes.

By one approach, the concentration step is carried out using ultrafiltration with a membrane pore size large enough to permit a portion of the lactose and minerals to pass through the pores with water as the permeate, while the retentate includes essentially all the protein and fat content. In one aspect, ultrafiltration is carried out with diafiltration. For example, whole milk can be subjected to a membrane separation treatment to separate a protein-enriched "retentate" from a lactose-enriched permeate. However, the type of milk processed according to the methods herein is not particularly limited, and may also include, for example, skim milk, reduced fat milk, whole milk, low fat milk, buttermilk, cream, and combinations thereof.

By one approach, the filtration step may utilize a molecular weight (MW) cut off of approximately about 10,000 to about 20,000 Daltons with a porous polysulfone-type membrane and the like, about 35 to about 65 psig applied pressure, and a processing temperature of about 123° F. to about 140° F. (about 50° C. to about 60° C.). In one aspect, lactose and minerals pass through the membrane in an about 50 percent separation rate, and the retentate comprises at least about 99 percent of the fat and protein, about 50 percent of the lactose, and about 50 percent of free minerals relative to the feed stream. If desired, diafiltration can be utilized to keep the lactose concentration in the retentate below a desired amount, such as less than about 1.5 percent and, in another aspect, less than about 1.0 percent.

In some approaches, a high fat dairy liquid is blended into the concentrated dairy liquid retentate in an amount effective to increase the fat content. In other approaches, other dairy or non-dairy fat sources can be added. In one aspect, the high fat dairy liquid includes about 35 to about 44 percent fat and, in another aspect, about 36 to about 39 percent fat. In one aspect, the high fat dairy liquid is cream and, upon addition to the retentate, forms a cream-enriched concentrated dairy liquid. By one approach, about 3 to about 57 percent cream is blended with the concentrated dairy liquid retentate to increase the fat content. In one aspect, the cream is a sweet cream having a total fat content of about 32 to about 42 percent but other types of cream may also be used depending on availability. By other approaches, when the starting liquid dairy base is whole milk, about 3 to about 34 percent cream. Optionally, if the starting liquid dairy base is skim milk, then about 34 to about 57 percent cream. If the starting liquid dairy base is 2 percent milk, then about 20 to about 46 percent cream. By another approach, when the starting liquid dairy base is cream, optionally up to about 30 percent cream may be added to the concentrated dairy liquid retentate, although generally no further addition of cream is needed. If desired, an appropriate amount of cream or other high fat dairy liquid can be added to the concentrated dairy liquid retentate if needed to provide a desired amount of fat, protein, total solids, or dairy minerals in the final concentrated dairy liquid.

As mentioned above, it has been discovered that the cream addition point can affect the stability of the resultant concentrated dairy liquid after sterilization. By one approach, it is preferred that cream is blended into the dairy liquid after concentration and before homogenization, as well as before the addition of adjunct ingredients. It has been found that addition of cream at different points in the process, such as prior to concentration or after homogenization, can result in concentrates that gel and separate after sterilization.

Further, if added prior to the concentration step, the high fat dairy liquid would be subjected to ultrafiltration along with the liquid dairy base. In this manner, the ultrafiltration would likely strip minerals and other natural sugars from the high fat dairy liquid, thereby reducing the amount of minerals and natural sugars in the concentrated dairy liquid and possibly affecting the flavor of the product. If needed, the adjunct ingredients could be adjusted accordingly based on the starting material.

In some approaches, the cream is not homogenized prior to blending with the concentrated dairy liquid retentate. It was discovered that this pre-homogenization of the cream generally resulted in concentrated beverages that either gelled or separated into two or more phases upon retorting. While not wishing to be limited by theory, it is believed that pre-homogenizing the cream produces a less stable emulsion because cream generally has insufficient protein to further emulsify or reduce the native cream fat droplet size distribution. For example, a typical cream product includes about 40 to about 46 percent total solids, about 35 to about 41 percent fat, and about 1.5 to about 2.5 percent protein. For example, it is believed there is an increased probability of producing flocs of fat droplets that may increase the rate of phase separation and/or retort gelation in the final product when the cream is pre-homogenized.

After the concentration step, the concentrated dairy liquid retentate optionally can be chilled before homogenizing to form a homogenized dairy liquid. By one approach, the homogenization may be performed in one or multiple stages. For instance, in one non-limiting approach, a first homogenization stage can be performed at about 1,500 to about 8,000 psi (in some approaches, about 2,000 to about 4,000 psi) and a second stage at about 100 to about 800 psi (and in some approaches about 200 to about 400 psi). The homogenate may be cooled if it will not be immediately transferred to a packaging operation. For example, the homogenate may be cooled as it flows through a regeneration and cooling section of a plate heat exchanger of a standard homogenizer. Other homogenization processes applicable to milk products also may be used; however, it was discovered that higher homogenization pressures generally result in gelled or separated final products. While not wishing to be limited by theory, it is believed that higher homogenization pressures results in homogenates having larger numbers of small particles with a higher collision frequency and likelihood of subsequent linking of droplets together, which ultimately results in a higher probability of gelation.

While also not wishing to be limited by theory, it is believed that the added fat supplied by the high fat dairy liquid requires homogenization to produce fat particles associated with proteins from the dairy liquid base to remain stable after the sterilization process as well as extended shelf life. Therefore, it is generally preferable to reduce fat droplet size of the high fat dairy liquid after its addition to the retentate where there is an abundance of protein present in the homogenized liquid to enhance the final product stability. For example, it is believed that homogenization not only reduces the fat droplet size distribution from the high fat dairy liquid to delay any post-retort separation, but it also likely coats each fat droplet with a protein interface that will allow all the fat droplets to behave more uniformly and/or consistently with the additives and subsequent retort conditions. Furthermore, homogenization of the high fat dairy liquid in the retentate where there is an abundance of emulsifying proteins will produce single fat droplets with minimal flocculation. Insufficient protein content results in an increased tendency to produce flocculated droplets. Flocculated droplets are more likely to accelerate phase separation and gel formation during or after retort.

Either before or after homogenization, dairy minerals and adjunct ingredients are added to the concentrate. In one aspect, about 0.1 to about 1.5 percent dairy minerals are added to the concentrate. Table 1A below is one example of ranges of various minerals added back to the concentrate either before or after homogenization. It is to be noted that the ratios of minerals to protein include the total amount of minerals and total amount of protein in the dairy product (i.e., including those coming from all ingredients of the dairy product as well as the added minerals).

TABLE 1A ranges of minerals and ratios of minerals relative to protein levels internal reference only trucal

| range % | Sample Descriptions | mg/mg Protein Tassimo Concentrate | | | |
|---|---|---|---|---|---|
| | | K | Mg | Ca | PO4 |
| Cream Liquid Concentrates | | | | | |
| 0% | Control - No Minerals | 0.016 | 0.006 | 0.086 | 0.145 |
| 0.25 | Minimal addition level | 0.017 | 0.008 | 0.122 | 0.199 |
| 0.50 | Preferably between min | 0.018 | 0.010 | 0.159 | 0.253 |
| 1.00 | preferably between max | 0.02 | 0.015 | 0.232 | 0.361 |
| 1.50 | Maximal addition level | 0.0264 | 0.0226 | 0.3516 | 0.5394 |
| Whole Milk and Whole Milk with Added Cream Liquid Concentrates | | | | | |
| 0.00 | Control - No Minerals | 0.0038 | 0.0016 | 0.0304 | 0.0834 |
| 0.15 | Minimal addition level | 0.0040 | 0.0018 | 0.0347 | 0.0897 |
| 0.25 | Preferred addition level | 0.0041 | 0.0020 | 0.0375 | 0.0940 |
| 0.50 | Maximal addition level | 0.0043 | 0.0025 | 0.0447 | 0.1045 |

In one approach, the dairy minerals are included in a concentrate an amount of from about 0.0040 to about 0.0043 mg potassium per mg protein, from about 0.0018 to about 0.0025 mg magnesium per mg protein, from about 0.0347 to about 0.047 mg calcium per mg protein, and from about 0.0897 to about 0.1045 mg phosphate per mg protein.

It is to be appreciated that while the concentrate can include a blend of all four minerals listed in Table 1A (potassium, magnesium, calcium, and phosphate), the concentrate may also include only one of these minerals in the following amounts: from about 0.0040 to about 0.0043 mg potassium per mg protein; from about 0.0018 to about 0.0025 mg magnesium per mg protein; from about 0.0347 to about 0.047 mg calcium per mg protein; and from about 0.0897 to about 0.1045 mg phosphate per mg protein.

In another approach, the dairy minerals are included in a concentrate an amount of from about 0.017 to about 0.026 mg potassium per mg protein, from about 0.008 to about 0.022 mg magnesium per mg protein, from about 0.122 to about 0.352 mg calcium per mg protein, and from about 0.199 to about 0.539 mg phosphate per mg protein.

It is to be appreciated that while the concentrate can include a blend of all four minerals listed in Table 1A (potassium, magnesium, calcium, and phosphate), the concentrate may also include only one of these minerals in the following amounts: from about 0.017 to about 0.026 mg potassium per mg protein; from about 0.008 to about 0.022 mg magnesium per mg protein; from about 0.122 to about 0.352 mg calcium per mg protein; and from about 0.199 to about 0.539 mg phosphate per mg protein.

From the results, it will be appreciated that proteins are polyelectrolytes and have a finite number of binding sites for various minerals thus defining the extent of mineral binding. Protein-protein interactions e.g., aggregation state, and surface charge are affected by the extent of mineral binding as well as the mineral type. Changing the protein aggregation state is known to modulate the release of any protein-bound aroma compounds as well as mouthfeel perception.

In another approach, the adjunct ingredients may include about 0.1 to about 0.6 percent gum arabic, in another aspect about 0.2 to about 0.5 percent gum arabic. It was surprisingly found that inclusion of gum arabic with the added dairy minerals further enhances the fresh dairy flavor of the concentrated dairy liquid.

In yet another approach, the adjunct ingredients may include a stabilizer, such as for example a chaotropic agent, a calcium-binding buffer, or other stabilizer which effectively binds calcium to prevent gelation or separation of the concentrated dairy liquid during storage. While not wishing to be limited by theory and as is detailed in U.S. Pat. No. 7,026,004, it is presently believed that the calcium-binding stabilizer prevents gelation or separation of the dairy liquid during storage prior to the subsequent sterilization. In general, any buffer or chaotropic agent or stabilizer which binds calcium may be used. Examples of suitable calcium-binding buffers, stabilizers, and chaotropic agents include citrate and phosphate buffers, such as monosodium phosphate, disodium phosphate, dipotassium phosphate, disodium citrate, trisodium citrate, EDTA, and the like, as well as mixtures thereof.

In one approach, the stabilizer includes a blend of monosodium phosphate and disodium phosphate. An effective amount of this stabilizer blend generally depends on the specific dairy liquid used as the starting material, the concentration desired, the amounts of cream added after concentration, and the calcium binding capacity of the specific stabilizers used. However, in general, for the fat-enriched concentrated dairy liquid, about 0.2 to about 1.0 percent stabilizer, which includes about 25 to about 50 percent monosodium phosphate and about 75 to about 50 percent disodium phosphate, is effective to stabilize the concentrated dairy liquid. By one approach, a ratio of the monosodium phosphate to the disodium phosphate ranges from about 50:50 to about 75:25 to form a stable concentrate. With the ultrafiltered whole milk and cream additions, stabilizer ratios outside of this range generally form gelled or separated concentrates after sterilization. In some approaches, 100% trisodium citrate is the stabilizer.

Other optional ingredients may also be included in the adjunct ingredients. By one approach, mouthfeel enhancer, flavor, sugar, and other additives may also be added as desired for a particular application. For example, suitable mouthfeel enhancers include sodium chloride, potassium chloride, sodium sulfate, and mixtures thereof. Preferred mouthfeel enhancers include sodium chloride and potassium chloride as well as mixtures thereof. In one aspect, the mouthfeel enhancer is sodium chloride. Flavors and other additives such as sugar, sweeteners (natural and/or artificial), emulsifiers, fat mimetics, maltodextrin, fibers, starches, gums, and enzyme-treated, cultured, natural, and artificial flavors or flavor extracts can be added so long as they do not significantly and adversely effect either the stability or mouthfeel characteristics. In one aspect, the concentrate includes about 5 to about 30 percent sugar, such as sucrose.

After addition of the dairy minerals and any adjunct ingredients, the mixture is then sterilized to form the stable concentrated dairy liquid. Preferably, sterilization is carried out using retort conditions. Optionally, if the concentrated dairy liquid needs to be diluted to meet a target concentration, it is generally desirable that the dilution be accomplished prior to sterilization. Preferably, the dairy liquid is packaged, sealed, and then subjected to sterilization temperatures in any suitable equipment. Sterilization is generally carried out under time and temperature conditions effective to achieve a $F_o$ of at least 5 as required for commercial sterility and, in another aspect, a $F_o$ of at about 5 to about 8. The sterilization process typically includes a come-up or heating time, a holding time, and a cool-down time. During the come-up time, a temperature of about 118° C. to about 145° C. is achieved for about 1 second to about 30 minutes. The temperature is then maintained at about 118° C. to about 145° C. for about 1.5 seconds to about 15 minutes. The temperature is then cooled below about 25° C. within about 10 minutes or fewer. Preferably the sample is gently agitated (for instance, by rotating the container) during sterilization to minimize skin formation.

The overall thermal treatment (in this case, heating prior to concentration, concentration, and sterilization) is controlled to produce the stable concentrated dairy liquid while achieving a $F_o$ of at least about 5, in another aspect a $F_o$ of about 5 to about 8, and a shelf life of at least about 6 months under ambient conditions. The degree of sterilization or the sterilization value ($F_o$) is based on the time that the dairy product is subjected to specific temperatures and is a culmination of all thermal treatments that the product encounters during processing. Consequently, a desired sterilization value may be achieved through a variety of processing conditions. The heat treatments used herein are effective to sterilize the concentrated milk to a $F_o$ of at least about 5, in another aspect to a $F_o$ of about 5 to about 8. The sterilization value for a sterilization process can be measured using graphical integration of time-temperature data during the food's slowest heating point rate curve for the thermal process. This graphical integration obtains the total lethality provided to the product. To calculate the processing time required to achieve a desired $F_o$ using the graphical method, a heat penetration curve (i.e., a graphical plot of temperature versus time) at the slowest heating location of the food is required. The heating plots are then subdivided into small time increments and the arithmetic mean temperature for each time increment is calculated and used to determine lethality (L) for each mean temperature using the formula:

$$L=10^{(T-121)/z}$$

where:
T=arithmetic mean temperature for a small time increment in ° C.;
z=standardized value for the particular microorganism; and
L=lethality of a particular micro-organism at temperature T.

Next, the lethality value calculated above for each small time increment is multiplied by the time increment and then summed to obtain the sterilization value ($F_o$) using the formula:

$$F_o=(t_{T1})(L_1)+(t_{T2})(L_2)+(t_{T3})(L_3)+ \ldots$$

Where:
$t_{T1}$, $t_{T2}$, . . . =Time increment at temperature T1, T2, . . . ;
$L_1$, $L_2$, . . . =Lethality value for time increment 1, time increment 2, . . . ; and
$F_o$=Sterilization value at 121° C. of a microorganism.

Once a penetration curve is generated, the sterilization value $F_o$ for the process can be computed by converting the length of process time at any temperature to an equivalent process time at a reference temperature of 121° C. (250° F.). The calculation of the sterilization value is generally described in Jay, "High Temperature Food Preservation and Characteristics of Thermophilic Microorganisms," in Modern Food Microbiology (D. R. Heldman, ed.), ch. 16, New York, Aspen Publishers (1998), which is incorporated by reference herein in its entirety.

As mentioned above, typical sterilizing processes degrade proteins and form trace amounts of sulfur and/or nitrogen containing volatile compounds that can negatively affect flavors and/or aromas. The formulation and processes herein, on the other hand, form reduced amounts of such compounds and, as a result, have enhanced fresh dairy flavors. For example, the resultant stable concentrated dairy liquids herein with less than about 9 percent total protein generally exhibit reduced sulfur and/or nitrogen aroma intensities due to reduced production of sulfur and/or nitrogen containing volatiles.

The packaging technique used is not particularly limited as long as it preserves the integrity of the dairy product sufficient for the applicable shelf life. For example, milk concentrates can be sterilized or retorted in glass bottles or gable-top cartons, and so forth, which are filled, sealed, and then thermally processed. The dairy products also can be packaged in larger quantities such as in conventional bag-in-box containers or totes. In one embodiment, pre-sterilized bottles or foil-lined gable-top carton materials may be used. Food packaging systems designated as extended shelf life (ESL) or aseptic packaging systems may also be used, but the methods herein are not limited thereto. The useful food packaging systems include conventional systems applied or applicable to flowable food products, especially milk products and fruit juices. The samples may be gently agitated (e.g., rotating the container) during sterilization to minimize "skin" formation on the surface of the milk, which typically forms due to the heat-induced coagulation of the proteins casein and beta-lactoglobulin. The dairy product also may be loaded into and transported in bulk form via tanker trucks or rail car tankers.

Although not required to achieve the extended shelf lives of the concentrated dairy liquids, pasteurization and/or ultra-high temperature (UHT) procedures also may be carried out in the event of process interruption and/or for further shelf life enhancement. By one approach, UHT products are ultrapasteurized and then packaged in sterilized containers. For example, if the ultrafiltered/diafiltered product is to be held for an extended period of time (e.g., greater than about a day) before continuing the process, pasteurization of the ultrafiltered product may be undertaken. If desired, intermediate products in the process may be pasteurized so long as the pasteurization does not adversely affect stability or mouthfeel of the final product.

In one approach, the stable concentrated dairy liquid may be sealed in cartridges or pods to be used in any number of beverage preparation machines. Examples of uses and beverage preparation machines can be found in U.S. Pat. No. 7,640,843, which is incorporated herein by reference in its entirety. The concentration factor of the dairy liquid is beneficial because it allows for the dairy liquid to be packaged and stored in small quantities while also being suitable for dilution and dispensing from the beverage preparation machines to prepare a milk-flavored beverage.

For instance, a cartridge of the concentrated dairy liquid may be used to produce an authentic-looking frothy, milk-based foam desired by consumers in a cappuccino-style beverage. The fat to protein ratios and specified cream addition points according to the methods discussed hereinabove form a concentrated dairy liquid having enhanced fresh dairy notes suitable for forming whitened coffee products such as, cappuccinos, lattes, and the like. For instance, the cartridge of the stable concentrated milk may also be suitable for foaming using a low pressure preparation machine and cartridge as described in U.S. Pat. No. 7,640,843 using pressures below about 2 bar.

By another approach, a dairy beverage may also be formed using the stable, mineral-fortified concentrated dairy liquid provided herein. For example, a beverage may be formed by mixing the stable concentrated dairy liquid with an aqueous medium, such as water. The formed dairy beverage may also be dispensed from a cartridge, such as described in U.S. Pat. No. 7,640,843, containing the stable concentrated dairy liquid by passing an aqueous medium through the cartridge to form a beverage by dilution. In one such example, the stable, mineral-fortified concentrated dairy liquid may be mixed or diluted with the aqueous medium at a ratio of between about 1:1 to about 9:1 to form a dairy beverage.

Advantages and embodiments of the concentrated dairy liquids described herein are further illustrated by the following examples; however, the particular conditions, processing schemes, materials, and amounts thereof recited in these examples, as well as other conditions and details, should not be construed to unduly limit this method. All percentages are by weight unless otherwise indicated.

EXAMPLES

Example 1

Experiments were conducted to evaluate the effect of addition of dairy minerals on dairy perception in milk concentrates. Samples were prepared following the process described in FIG. 2 utilizing cream as a starting base. Cream was pasteurized (pre-warmed) at 171° F. for 18 seconds and then diluted 1:1 with water to 22 percent total solids content. The diluted cream was then ultrafiltered with diafiltration by 10 kDa spiral wound membranes at 125° F. to a concentration of about 2.0× to produce a retentate with 45.03 percent total solids, 42.8 percent fat, 2.35 percent protein, and less than 1 percent lactose. The retentate was then homogenized at 4000/400 psi, cooled to below 45° F., and later mixed with water to standardize the total solids. Adjunct ingredients were blended with the retentate at a temperature of 120° F. before filling into T-discs and sealing. See Table 1 for Dairy Mineral addition ranges. The T-discs were then retorted at 254° F. for 8 minutes, which is effective to reach a $F_o$ of 8. Dairy minerals were then added and the products characterized. The results are presented below in Table 1. The dairy mineral ingredients having low lactose content (less than 10 percent) provided the best fresh dairy flavor profiles.

TABLE 1B

Summary of Post-Retort Stability and Mineral Blend Ingredients

| Ingredients Evaluated | Amount of Dairy Minerals Added | Post-Retort Stability | Tasting Notes | Dairy Mineral Powders |
|---|---|---|---|---|
| Mineral blend - Low lactose (<10% lactose) | 0.3-1.0% | Fluid | Fresh dairy flavor- preferred in coffee/dairy system and dairy only applications | TRUCAL ® D7, OPTISOL ™ 1200 from Glanbia PLC |
| Mineral blend - High lactose (>80% lactose) | 0.3-1.0% | Fluid | Cooked-Flavor does not resemble fresh dairy | TRUCAL ® D7, OPTISOL ™ 1200 from Glanbia PLC |
| Calcium chloride | 0.5% | Fluid | Off flavor, bitter, metallic | |
| Calcium phosphate | 0.5% | Fluid | Off flavor, bitter, metallic | |
| Sodium citrate | 0.5% | Fluid | Off flavor, bitter, metallic | |

Example 2

Cream dairy bases were prepared by diluting 250 lbs of cream in 250 lbs of water. The cream, prior to dilution, included 41.9 percent total solids, 36.14 percent fat, 1.93 percent protein, 2.2 percent lactose, 5.74 percent solids non fat (SNF), and a protein to fat ratio of about 0.05. The diluted cream was then ultrafiltered with dialfiltration by 10 kd spiral wound membranes at 125° F. to a concentration of ~2.0× to provide a cream retentate having a total solids content of 43.4 percent, 40.61 percent fat, 2.61 percent protein, about 0.5 percent lactose, 0.51 percent SNF, and a protein to fat ratio of 0.06. The dairy mineral ingredients were added to the cream retentate and evaluated for impact on flavor. The homogenization pressure, salt, mineral, and gum arabic content were varied as listed in Tables 3 and 4.

A variety of commercially available ingredients containing dairy minerals to be added to the cream dairy bases were evaluated for content (by percent unless specified otherwise) as shown in Table 2 below.

Samples 144-152 were prepared to analyze the effect of adding dairy minerals and gum arabic to a cream base. Samples 145-147 included TRUCAL® D7 (Glanbia) as a dairy mineral source, with sample 145 including 0.25 percent of the dairy mineral source, sample 146 including 0.5 percent of the dairy mineral source, and sample 147 including 1.0% of the dairy mineral source. Samples 151 and 152 included CAPOLAC® (ARLA) as a dairy mineral source, with sample 151 including 0.25 percent of the dairy mineral source and sample 152 including 0.5% of the dairy mineral source. In evaluation of samples 144-154, it was observed that the addition of dairy minerals increased the fresh dairy flavor relative to the control and that increasing the amounts of added dairy minerals did not have a significant effect on the body and mouthfeel relative to the control. Further, it was observed that the addition of gum arabic did not affect the dairy flavor, but did affect the body and mouthfeel relative to the control.

Samples 163-170 were prepared to analyze the impact of varying the content of dairy minerals, gum arabic, and sugar in the form of added sucrose. Samples 163-168 included 0.5% or 1% TRUCAL® D7 (Glanbia). Samples 169 and 170 included 0.5% CAPOLAC® (ARLA) in addition to 0.5% TRUCAL® D7 (Glanbia) as a source of dairy minerals. The organoleptic observations regarding samples 163-170 can be seen in Table 3.

Samples 171-176 were prepared to analyze the impact of salt, dairy minerals, gum arabic, and sugar. The organoleptic observations regarding samples 171-176 can be seen in Table 3.

Samples 235-237 were prepared to analyze the impact of different levels of diafiltration washing during ultrafiltration to remove lactose. In particular, sample 235 was subjected to just ultrafiltration, sample 236 was subjected to one diafiltration during ultrafiltration, and sample 237 was subjected to two diafiltrations during ultrafiltration. It was observed that sample 237 had the lowest level of starting minerals in concentrate before addition, sample 236 had a higher level of starting minerals in the concentrate before addition, and sample C235 had the highest level of starting minerals in the concentrate before addition. These results appear to indicate that the dairy minerals have an impact on the dairy flavor, the impact to be most powerful in sample 237, which had the lowest starting mineral content in the base concentrate relative to samples 235 and 236.

Samples 244B, 248, and 249 were prepared to analyze the impact of additional levels dairy minerals on flavor addition. Sample 244B, which was preferred over samples 248 and 249 (see organoleptic comments in Table 4), was found to be the closest flavor match to EU control, which was represented by commercially available JACOBS® Latte. Sample was described as not as fatty, less astringent, milk sweet, some salty and caramel, and same coffee character vs. control.

Samples TK MC-TK M5 were prepared to analyze the inclusion of various dairy mineral sources in a concentrated dairy liquid prepared as described above but having 26 percent added sugar. The organoleptic observations regarding these samples can be seen in Table 4. TK M5 appeared to have the most preferred organoleptic properties of all the samples in this set.

Samples MIN 1-MIN 25 were prepared to analyze the inclusion of various dairy mineral sources in a concentrated dairy liquid base having 12 percent added sugar. Samples with fixed sugar, salt, dairy solids, and gum Arabic were utilized as a base for the comparison of two different dairy mineral ingredient blends: Optisol 1200 (Glanbia), and Avicel. The organoleptic observations regarding these samples can be seen in Table 4.

TABLE 2

Content of Commercially Available Ingredients Containing Dairy Minerals

| Manufacturer | Ingredient Name | Base | Moisture | Protein | Lipid | Ash | Lactose | Ca | P | Na | Mg | K | Fe |
|---|---|---|---|---|---|---|---|---|---|---|---|---|---|
| Lactalis | Calciane | Whey | 4.62 | 1.23 | <0.1 | 79.84 | <6 | 29.3 | 16 | 0.3 | 1.5 | 0.25 | |
| Lactalis | Calciane micronized | Whey | 3.52 | 1.41 | <0.1 | 81.38 | | 29.68 | 16 | 0.3 | 1.5 | 0.25 | |
| Glanbia | TRUCAL ® D7 | Milk | <6 | <7 | <0.5 | ~78 | <10 | 24.8 | 14 | 0.62 | 1.4 | 0.7 | 0.0013 |
| Glanbia | OPTISOL ™ 1200 | Whey | 3.42 | 4.24 | <0.5 | ~78 | <10 | 24.8 | 14.4 | 0.62 | 1.4 | 0.7 | 0.0013 |
| Idaho milk | IdaPro MPP | Milk | 1.83 | 3.46 | <0.1 | 7.68 | 87.03 | 0.36 | 0.57 | 0.38 | 0.1 | 1.9 | 0.0003 |
| Lactalis | Whey permeate powder | Whey | 2.80 | 4.11 | 0.04 | 8.45 | 84.6 | 0.32 | 0.59 | 0.64 | | 2.37 | <0.1 |

TABLE 3

Summary of Experiments

| Sample No. | Solids (%) | Fat (%) | Protein (%) | Homog. (psi) | Salt (%) | Minerals* (%) | Gum Arabic (%) | Sugar (%) | Added Protein (%) | Viscosity | Organoleptic |
|---|---|---|---|---|---|---|---|---|---|---|---|
| 144 | 35 | 22.8 | 1.53 | 4000/400 | 0.1 | — | — | 10 | — | 30.8 | very thin, low dairy, low mouthfeel, high coffee, low astringency |
| 145 | 35 | 22.8 | 1.53 | 4000/400 | 0.1 | 0.25 | — | 10 | — | | |
| 146 | 35 | 22.8 | 1.53 | 4000/400 | 0.1 | 0.5 | — | 10 | — | | creamy, dairy, more mouthfeel than 144, clean, similar body to 144, some salty, low astringency, mild sweetness, more body than 153 |
| 147 | 35 | 22.8 | 1.53 | 4000/400 | 0.1 | 1 | — | 10 | — | 30.8 | more milky, increased dairy, low astringent, more body, more mouthcoating, |
| 148 | 35 | 22.8 | 1.53 | 4000/400 | 0.1 | — | 0.25 | 10 | — | 32 | slight salty, sweet, thin, low dairy, metallic aftertaste, some cooked flavor |
| 149 | 35 | 22.4 | 1.50 | 4000/400 | 0.4 | — | 0.25 | 10 | — | 206 | more creamy, caramel, more mouthfeel, sweet |
| 150 | 35 | 22.4 | 1.50 | 4000/400 | 0.4 | — | 0.4 | 10 | — | 294 | salty, sweet, thin, low dairy, oily, metallic, cooked |
| 151 | 35 | 22.8 | 1.53 | 4000/400 | 0.1 | 0.25 CAPOLAC ® | — | 10 | — | | |
| 152 | 35 | 22.8 | 1.53 | 4000/400 | 0.1 | 0.5 CAPOLAC ® | — | 10 | — | 30.8 | sweet dairy, milky, good creaminess |
| 163 | 35.7 | 20.3 | 1.36 | 4000/400 | 0.4 | 1 | 0.4 | 12 | — | | more dairy upfront, most intensity, most bitter, low mouthfeel, dairy |
| 164 | 45.65 | 20.3 | 1.36 | 4000/400 | 0.4 | 1 | 0.4 | 22 | — | | sweet, milky low coffee, slight dairy, med viscosity, |
| 165 | 35.6 | 20.3 | 1.36 | 4000/400 | 0.4 | 0.5 | 0.8 | 12 | — | | |
| 166 | 45.65 | 20.3 | 1.36 | 4000/400 | 0.4 | 0.5 | 0.8 | 22 | — | | |
| 167 | 41.4 | 26 | 1.74 | 4000/400 | 0.4 | 0.5 | 0.4 | 12 | — | | more oily, clean dairy, thinner viscosity, dairy, sweet, less astringent |
| 168 | 45.7 | 30 | 2.01 | 4000/400 | 0.4 | 0.5 | 0.4 | 12 | — | | more dairy than 170, medium viscosity, best mouth coating, low sweetness, |
| 169 | 35.8 | 20.3 | 1.36 | 4000/400 | 0.4 | 0.5 TRUCAL ® D7 + 0.5 CAPOLAC ® | 0.4 | 12 | — | | clean dairy, sweet, medium mouth coating, dairy coffe balance |
| 170 | 36.2 | 20.3 | 1.36 | 4000/400 | 0.4 | 0.5 TRUCAL ® D7 + 1 CAPOLAC ® | 0.4 | 12 | — | | low sweet, med-high viscosity, balanced, bland flavor, low dairy, low coffee, |
| 171 | 47.8 | 20.3 | 1.38 | 4000/400 | 0.8 | 1 | 0.4 | 22 | — | 114.8 | less sweet than control, medium dairy, |
| 172 | 47.8 | 20.3 | 1.38 | 4000/400 | 0.8 | 1 | 0.4 | 22 | — | 170.8 | less sweet than control, low-medium dairy |

TABLE 3-continued

Summary of Experiments

| Sample No. | Solids (%) | Fat (%) | Protein (%) | Homog. (psi) | Salt (%) | Minerals* (%) | Gum Arabic (%) | Sugar (%) | Added Protein (%) | Viscosity | Organoleptic |
|---|---|---|---|---|---|---|---|---|---|---|---|
| 173 | 47.8 | 20.3 | 1.38 | 4000/400 | 0.8 | — | — | 25 | — | 194.8 | sweet, low dairy, malty, milky, |
| 174 | 48 | 20.3 | 1.38 | 4000/400 | 1 | — | — | 25 | — | 159.2 | sweet, low dairy, cooked, less milky |
| 175 | 41.9 | 26 | 1.78 | 4000/400 | 0.8 | 0.5 | 0.4 | 12 | — | 354 | good flavor versus control without minerals, sweet, more dairy than control, milk forward |
| 176 | 41.6 | 26 | 1.78 | 4000/400 | 1.2 | — | 0.25 | 12 | — | 900 @ 30 RPM | low dairy, sour, coffee forward |

*The mineral source used was Glanbia TRUCAL ® D7 unless noted otherwise.

TABLE 4

Summary of Experiments

| Sample | Solids | Fat | Protein | Homog. | Sugar | Salt | BS* (MSP/DSP) | P/BS** | Dairy Minerals | Gum Arabic |
|---|---|---|---|---|---|---|---|---|---|---|
| 235 | 41.67 | 26 | 1.85 | 4000/400 | 12 | 0.8 | 0.078 | 20 | 0.5 | 0.4 |
| 236 | 41.37 | 26 | 1.86 | 4000/400 | 12 | 0.8 | 0.078 | 20 | 0.5 | 0.4 |
| 237 | 41.24 | 26 | 1.87 | 4000/400 | 12 | 0.8 | 0.078 | 20 | 0.5 | 0.4 |
| 244(B) | 42.3 | 26 | 1.76 | 4000/400 | 12 | 0.8 | 0.078 | 20 | 1 | 0.4 |
| 248 | 41.54 | 26 | 1.76 | 4000/400 | 12 | 0.8 | 0.078 | 20 | 0.25 | 0.4 |
| 249 | 48.19 | 23 | 1.61 | 4000/400 | 12 | 0.8 | 0.078 | 20 | 1.5 | 0.4 |
| TK MC | 51.91 | 23 | 1.45 | 4000/400 | 26 | 0.8 | 0.071 | 20 |  | 0.4 |
| TK M1 | 52.4 | 23 | 1.45 | 4000/400 | 26 | 0.8 | 0.071 | 20 | 0.5 (Lactolis) | 0.4 |
| TK M2 | 52.24 | 23 | 1.45 | 4000/400 | 26 | 0.8 | 0.071 | 20 | 0.33 (Glanbia 1600) | 0.4 |
| TK M3 | 52.57 | 23 | 1.45 | 4000/400 | 26 | 0.8 | 0.071 | 20 | 0.66 (Glanbia 1600) | 0.4 |
| TK M4 | 52.91 | 23 | 1.45 | 4000/400 | 26 | 0.8 | 0.071 | 20 | 1 (Glanbia 1600) | 0.4 |
| TK M5 | 52.91 | 23 | 1.45 | 4000/400 | 26 | 0.8 | 0.071 | 20 | 1 (Trucal D7) | 0.4 |
| MIN 1 | 42.62 | 26 | 1.74 | 4000/400 | 12 | 0.8 | 0.08 | 20 | 1 (Optisol 1200) | 0.4 |
| MIN 2 | 42.22 | 26 | 1.73 | 4000/400 | 12 | 0.8 | 0.08 | 20 | 1 (Optisol 1200) | 0.4 |
| MIN 3 | 41.62 | 26 | 1.73 | 4000/400 | 12 | 0.8 | 0.08 | 20 | 0 (Optisol 1200) | 0.4 |
| MIN 4 | 41.22 | 26 | 1.74 | 4000/400 | 12 | 0.8 | 0.08 | 20 | 0 (Optisol 1200) | 0.4 |
| MIN 5 | 41.55 | 26 | 1.73 | 4000/400 | 12 | 0.8 | 0.08 | 20 | 0.33 (Optisol 1200) | 0.4 |
| MIN 6 | 41.88 | 26 | 1.73 | 4000/400 | 12 | 0.8 | 0.08 | 20 | 0.66 (Optisol 1200) | 0.4 |
| MIN 7 | 42.22 | 26 | 1.74 | 4000/400 | 12 | 0.8 | 0.08 | 20 | 1 (Optisol 1200) | 0.4 |
| MIN 8 | 41.55 | 26 | 1.74 | 4000/400 | 12 | 0.8 | 0.08 | 20 | 0.33 (Trucal D7) | 0.4 |
| MIN 9 | 41.88 | 26 | 1.74 | 4000/400 | 12 | 0.8 | 0.08 | 20 | 0.66 (Trucal D7) | 0.4 |
| MIN 10 | 42.22 | 26 | 1.74 | 4000/400 | 12 | 0.8 | 0.08 | 20 | 1 (Trucal D7) | 0.4 |
| MIN 17 | 41.64 | 26 | 1.43 | 4000/400 | 12 | 0.8 | 0.08 | 20 | 1 (Trucal D7) | 0.4 |
| MIN 18 | 41.64 | 26 | 1.43 | 4000/400 | 12 | 0.8 | 0.08 | 20 | 1 (Lactalis) | 0.4 |

TABLE 4-continued

Summary of Experiments

| | | | | | | | | | | |
|---|---|---|---|---|---|---|---|---|---|---|
| MIN 19 | 41.64 | 26 | 1.43 | 4000/400 | 12 | 0.8 | 0.08 | 20 | 1 (Lactalis Microniz) | 0.4 |
| MIN 20 | 41.64 | 26 | 1.43 | 4000/400 | 12 | 0.8 | 0.08 | 20 | 0.5 (Trucal D7) | 0.4 |
| MIN 21 | 41.64 | 26 | 1.43 | 4000/400 | 12 | 0.8 | 0.08 | 20 | 0.5 (Trucal D7) | 0.4 |
| MIN 22 | 41.64 | 26 | 1.43 | 4000/400 | 12 | 0.8 | 0.08 | 20 | 0.5 (Trucal D7) | 0.4 |
| MIN 23 | 41.64 | 26 | 1.43 | 4000/400 | 12 | 0.8 | 0.08 | 20 | 0.5 (Trucal D7) | 0.4 |
| MIN 24 | 41.64 | 26 | 1.43 | 4000/400 | 12 | 0.8 | 0.08 | 20 | 0.5 (Trucal D7) | 0.4 |
| MIN 25 | 41.64 | 26 | 1.43 | 4000/400 | 12 | 0.8 | 0.08 | 20 | 0.5 (Trucal D7) | 0.4 |

| Sample | Added Flavor | pH (pre-retort) | Viscosity | Setting (rpm) | Special Conditions | |
|---|---|---|---|---|---|---|
| 235 | 0 | 6.89 | | | 1st UF | sour, salty, low milky, similar dairy to control |
| 236 | 0 | 6.96 | | | UF/DF | medium milky, fatty, low cooked, malty, sweet, slight bitter aftertaste |
| 237 | 0 | 7.01 | | | UF/2DF | medium milky, buttery, salty, more milky flavor profile overall, clean aftertaste |
| 244(B) | 0 | 6.81 | 65 | 100 | | preferred over 248 and 239, medium milky, sweet, some caramel, salty, |
| 248 | 0 | 6.99 | 82.7 | 100 | | coffee forward, sweet, low milky, some salty aftertaste |
| 249 | 0 | 6.87 | 63 | 100 | | dairy forward, medium milky, sweet, slight mineral flavor, slight salty, salty aftertaste |
| TK MC | 0.5 | | | | | sweet, caramel, medium dairy, cooked, strong bitter, particulates in finished beverage |
| TK M1 | 0.5 | | | | | sweet, caramel, medium dairy, milky, cooked, less bitter than control, woody, particulates in finished beverage |
| TK M2 | 0.5 | | | | | Soapy, less sweet, low dairy, some bitter/sour, particulates in finished beverage |

TABLE 4-continued

Summary of Experiments

| Sample | | pH | | | Additive | Notes |
|---|---|---|---|---|---|---|
| TK M3 | 0.5 | | | | | sweet caramel dairy, cooked, less particulates |
| TK M4 | 0.5 | | | | | medium dairy, mild caramel, but less than control, more milky, less processed |
| TK M5 | 0.5 | | | | | medium dairy, milk flavor like whole milk, slight woody, less caramelized or cooked |
| MIN 1 | | 6.51 | 1406 | 20 | 0.4 (Avicel) | watery, malty, slight oily, slight bitter, some buttery, |
| MIN 2 | | 6.59 | 152 | 100 | | more salty, chalky, astringent then MIN 1, some milky, burnt/cooked, slight bitter |
| MIN 3 | | 6.99 | 1676 | 20 | 0.4 (Avicel) | low dairy, particulates in the finished beverage, sour milk, watery |
| MIN 4 | | 7.13 | 108 | 100 | | milky, more dairy than MIN1-3, slight sweet, more body, particulates in finished beverage |
| MIN 5 | | 6.99 | 204 | 100 | | cooked milk, off note, rancid, buttery, fatty, |
| MIN 6 | | 6.9 | 87.6 | 100 RPM | | cooked milk, off note, rancid, buttery, slight sulfur, |
| MIN 7 | | 6.86 | 80 | 100 RPM | | high cooked milk, off note, rancid, buttery, slight sulfur, |
| MIN 8 | | | 108 | 100 RPM | | |
| MIN 9 | | | 100.8 | 100 RPM | | |
| MIN 10 | | | | 100 RPM | | |
| MIN 17 | | 6.9 | 112 | 100 RPM | | cooked, low dairy, slight bitter |
| MIN 18 | | 6.61 | 58.4 | 100 RPM | | cooked, low dairy in background, low sour, some particulates in finished beverage |
| MIN 19 | | 6.64 | 93.6 | 100 RPM | | good body, some dairy |
| MIN 20 | | 6.96 | 84.4 | 100 RPM | 0.5 (Methyl Cellulose A7C) | dairy forward, some cooked, medium milky, sligth bitter, preferred out of MIN20-MIN22 set |
| MIN 21 | | 6.95 | 123.6 | 100 RPM | 0.5 (Methyl Cellulose A4C) | more caramel, sweet, some cooked, low-medium dairy |

TABLE 4-continued

Summary of Experiments

| | | | | | | |
|---|---|---|---|---|---|---|
| MIN 22 | | 6.97 | 82.5 | 100 RPM | 0.5 (Methyl Cellulose A15) | some cooked, low milky, slight bitter/sour |
| MIN 23 | | 6.97 | 108.4 | 100 RPM | 0.5 (Hydroxyl propyl Methyl Cellulose F50) | blended dairy, medium milky, some cooked, preferred of MIN23-MIN25 set |
| MIN 24 | | 6.98 | 101.6 | 100 RPM | 0.5 (Hydroxyl propyl Methyl Cellulose E15) | off-notes, slight bitter |
| MIN 25 | | | 249.2 | 100 RPM | 0.5 (Hydroxyl propyl Methyl Cellulose F4M) | good mouthfeel, low dairy, slight bitter, particulates in finished beverage, unstable |

*"BS (MSP/DSP)" means "buffer salts (monosodium phosphate/disodium phosphate ratio).
**"P/BS" means "protein to buffer salt" ratio.
Indicates there was an error in the viscosity reading and does not necessarily indicate that the concentrate had gelled.

Example 3

Further experiments were conducted to look at how changes in both ingredients and processing steps impact the flavor of concentrated dairy liquids. The samples were prepared according to the following general process: fresh whole milk was heated at the initial heat treatment temperature and time provided in Table 5; the whole milk was then concentrated using ultrafiltration; cream was mixed into the retentate to the target protein to fat (P:F) ratio provided in Table 5, and then the mixture was homogenized at the listed pressure. Dairy minerals, water, and other adjunct ingredients were added after homogenization and the final product was retorted at 123° C. for the time listed in Table 6.

Samples F5, F6, and F7 were prepared to analyze the effect of incremental increases in dairy mineral content. It was found that dairy minerals can provide a more balanced milk flavor profile but some dairy mineral ingredients may have an impact on viscosity and development of metallic off flavors. In particular, the addition of dairy minerals at concentrations of 0.25%, 0.38%, and 0.5% provided a more balanced milk provide relative to the control.

In regard to sample F79, it was found that protein, mineral and salt content can mute astringency versus control. Homogenization and protein/salt/mineral levels can push more dairy flavor forward. Lower heat profile may also reduce astringency but more off flavors are present (e.g., ash, chalk, grains, malty).

Sample F73 gelled after retort and were not further analyzed.

TABLE 5

Summary of Experiments

| Sample | Solids | Fat | Protein | P:F ratio* | Retort hold | Initial Heat Treatment | Homog (psi) | Dairy Minerals | Salt | Sugar | P:B ratio** | Buffer salt type*** | Buffer Ratio | Pre-retort pH | Pre-retort viscosity | Organoleptic Evaluation |
|---|---|---|---|---|---|---|---|---|---|---|---|---|---|---|---|---|
| F1 | 30.28 | 12.73 | 9.02 | 0.72 | 8 | 196 F./5 min | 2000 | 0 | 0.41 | 6.2 | 40 | MSP/DSP | 50/50 | | 78.4 | low sweet dairy; low astringency, low-medium body |
| F5 | 30.28 | 12.73 | 9.02 | 0.72 | 8 | 196 F./5 min | 2000 | 0.25 | 0.41 | 6.2 | 40 | MSP/DSP | 50/50 | | | |
| F6 | 30.28 | 12.73 | 9.02 | 0.72 | 8 | 196 F./5 min | 2000 | 0.38 | 0.41 | 6.2 | 40 | MSP/DSP | 50/50 | 6.48 | 77.6 | |
| F7 | 30.28 | 12.73 | 9.02 | 0.72 | 8 | 196 F./5 min | 2000 | 0.5 | 0.41 | 6.2 | 40 | MSP/DSP | 50/50 | 6.46 | 76.4 | Thicker, not astringent, better milk balance, not chalky, increased metallic as cools |

TABLE 5-continued

Summary of Experiments

| Sample | Solids | Fat | Protein | P:F ratio* | Retort hold | Initial Heat Treatment | Homog (psi) | Dairy Minerals | Salt | Sugar | P:B ratio** | Buffer salt type*** | Buffer Ratio | Pre-retort pH | Pre-retort viscosity | Organoleptic Evaluation |
|---|---|---|---|---|---|---|---|---|---|---|---|---|---|---|---|---|
| F79 | 32.08 | 12 | 10.29 | 0.86 | 8 | 196 F./5 min | 2000 | 1 | 0.5 | 6.2 | 40 | MSP/DSP | 50/50 | 6.34 | 198.8 | sweet, salt, creamy, slight fat dairy, low coffee; dairy, astringent; metal aftertaste |
| F73 | 31.56 | 12.73 | 9.07 | 0.72 | 8 | 196 F./5 min | 2000 | 1 | 0.5 | 6.2 | 37 | MSP/DSP | 50/50 | | | Failed retort - gelled |

*"P:F" means "protein to fat ratio."
**"P:B" means "protein to buffer ratio."
***"MSP/DSP" means "monosodium phosphate/disodium phosphate" and "TSC" means "tricalcium citrate."

Example 4

Several of the concentrated dairy liquid samples prepared according to Examples 2 and 3 were analyzed by a trained sensory panel. The experimental samples were brewed in a Tassimo Bosch T45 brewer machine according to the instructions provided with the machine.

A "target" product was also prepared. The target product was a freshly brewed coffee drink with freshly steamed milk and has desirable flavor, mouthfeel, and texture sought to be replicated by the experimental samples. The target product was prepared using a mix of Tesco fresh whole milk plus Tesco fresh semi-skimmed milk to achieve 2% fat in the final drink. A Saecco fully automated machine was used to brew espresso (9 g of roast and ground coffee for 25 ml of brewed espresso) and a Nespresso steaming machine (automated steamer) was used to steam the milk to ensure consistency in the preparation method.

Lattes were also prepared from commercially available GEVALIA® Latte and JACOBS® Latte T-discs using a Tassimo machine (Kraft Foods) for comparison purposes. The samples tested are summarized below in Table 6 below. P53 is the same beverage as the EU Jacobs Latte. It is prepared in the same way that the prototypes are, which is using a Tassimo Bosch T45 single serve brewer. The EU latte is a 230 g beverage with a very sweet milky and indulgent coffee beverage. The US Gevalia latte in comparison is only slightly sweet and more generally coffee forward.

TABLE 6

Summary of Samples Tested

| Product | Description |
|---|---|
| F63 | Reduced initial heating; added minerals |
| F64 | Reduced initial heating; adjusted retort process with added minerals |
| F65 | Reduced initial heating; adjusted retort process; increased homogenization pressure with added minerals |
| F70 | Control process |
| F71 | Control process with adjusted retort process |
| F79 | Control process with increased protein/fat ratio, salt and added minerals |
| F80 | Control process with increased homogenization pressure and added minerals |
| GEVALIA ® Latte (U.S.) | Currently sold in U.S. |
| C134 | Neutral base |
| C125 | NDFM protein powder added |

TABLE 6-continued

Summary of Samples Tested

| Product | Description |
|---|---|
| C137 | Increased salt |
| C141 | MPC protein powder added |
| C152 | Arla dairy cream builder added |
| C147 | Minerals added |
| C167 | Combo of salt, minerals, gum arabic |
| C169 | Combo of salt, minerals, gum arabic and Arla creamy builder |
| GEVALIA ® Jacobs Latte (EU) | Currently sold in Europe |
| C162 | High sugar with increased salt |
| C164 | High sugar with combo of increased salt, minerals, and gum Arabic |

The experimental samples and commercially available GEVALIA® products were brewed to provide latte beverages. These beverages were compared with the target product and were analyzed for foam, flavor, and mouthfeel by the panel. The panel was asked to assess all aspects of the drink, including foam appearance, foam texture, liquid mouthfeel, liquid flavor, and liquid aftertaste. The samples were served immediately after preparation and each panelist followed the same evaluation protocol. First, a visual assessment of the foam was made. Then, the texture of the foam was evaluated. Then the beverage was stirred and when the drink reached 65° C., the liquid mouthfeel was evaluated. Finally, the liquid flavor and aftertaste was evaluated.

The attributes generated by the panel to describe the samples are summarized below and the criteria used for the analysis are presented in Tables 7-9 below:

Foam appearance: foam height, bubble size, uniformity, density, and aerated

Foam mouthfeel: viscosity, smooth, aerated, powdery, dry

Liquid mouthfeel: viscosity, smooth, powdery, dry

Liquid flavor: milk, processed, sweet, roasted, sour, creamy, bitter, musty, soapy, smoky, earthy, rubbery, grainy, rancid Liquid aftertaste: milky, sweet, roasted, bitter, metallic, dry The target product was high in milky, low in processed, soapy notes and very different in terms of foam appearance and mouthfeel. The control process samples were described as being milky, creamy, smooth and viscous. The addition of ingredients didn't seem to provide a significant shift toward the target sensory profile.

Figure 3:
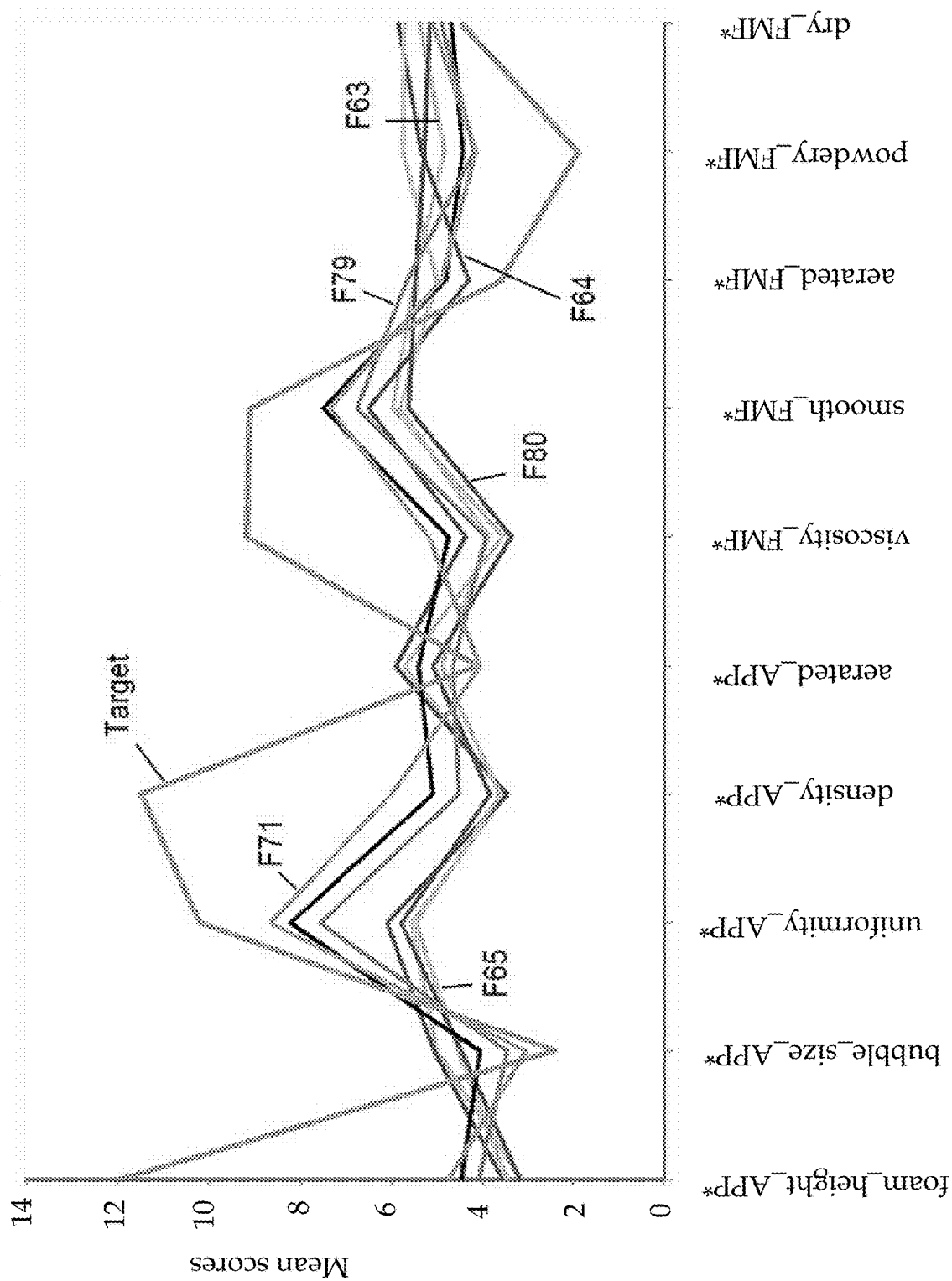
FIG. 3 is a sensory profile chart of the foam of the experimental samples and target product.

As shown in FIG. 3, the foam of the target product was significantly higher, more uniform, more dense and viscous, smoother in mouthfeel, and had smaller bubbles than the experimental samples.

Figure 4:
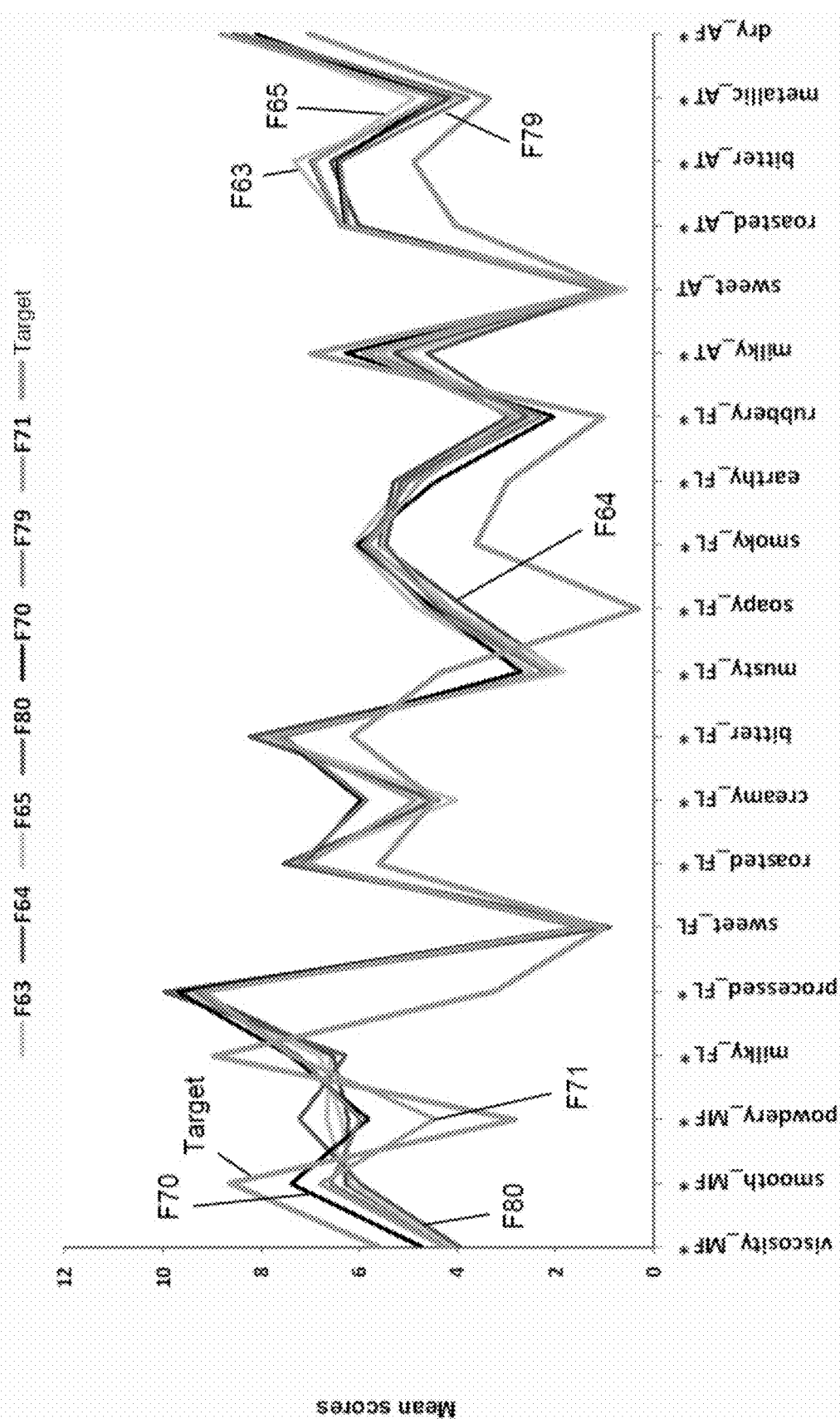
FIG. 4 is a sensory profile chart of the flavors in the experimental samples and target product.

As shown in FIG. 4, the main difference between the target product and the experimental samples is the coffee/milk perception. Coffee related attributes are significantly more intense in Tassimo latte. The taste of milk in all experimental samples was more processed and soapy. In terms of creamy flavor, the experimental samples were perceived as being closer to target product than control formulations.

Figure 5:
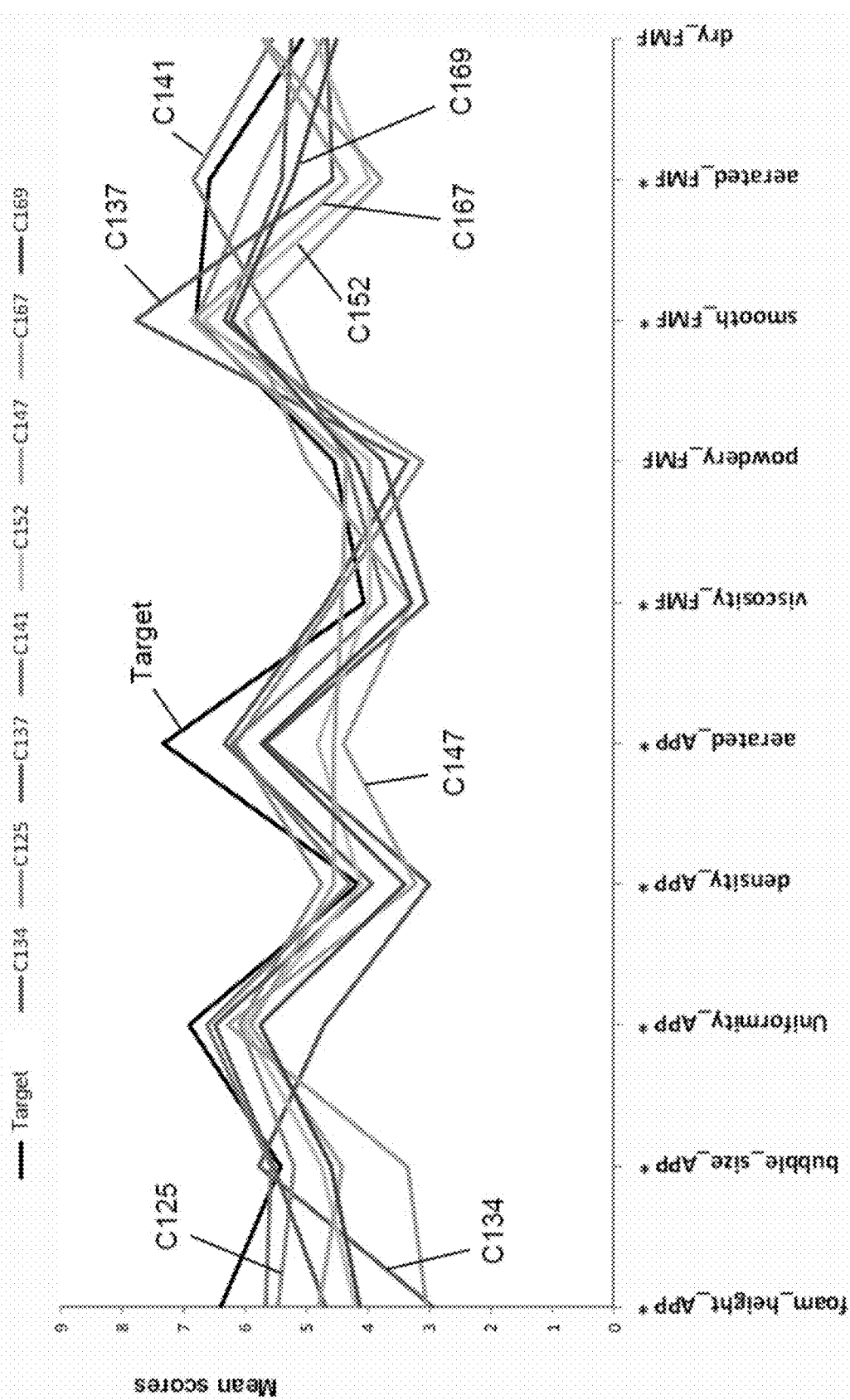
FIG. 5 is a sensory profile chart of the foam of the experimental samples and a comparative product.

As shown in FIG. 5, the addition of protein (for example, samples C125 and C141) was considered to provide better foam, which was characterized as being higher, more uniform, and dense.

Figure 6:
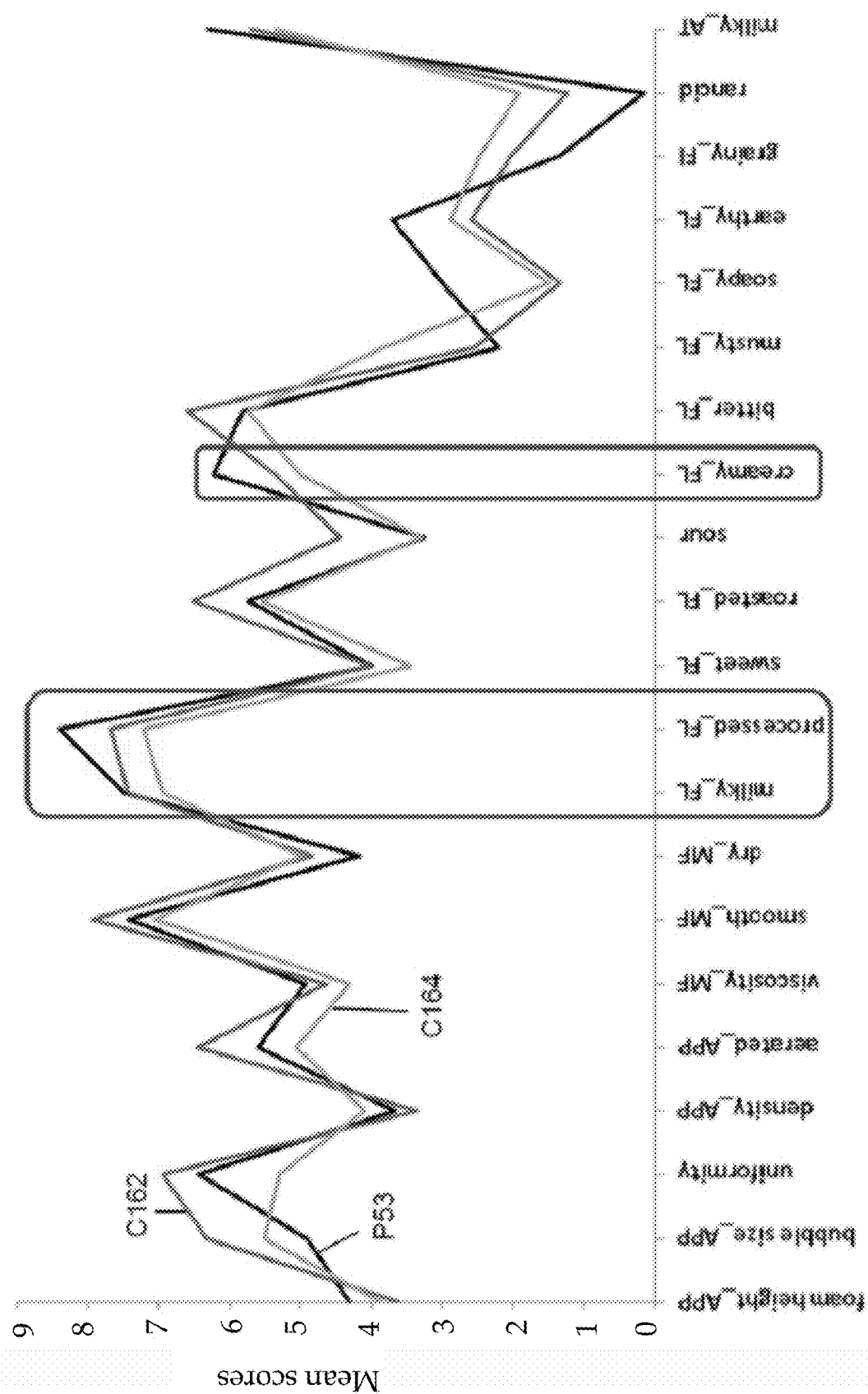
FIG. 6 is a sensory profile chart of the foam and flavors of experimental samples and a comparative product.
Figure 7:
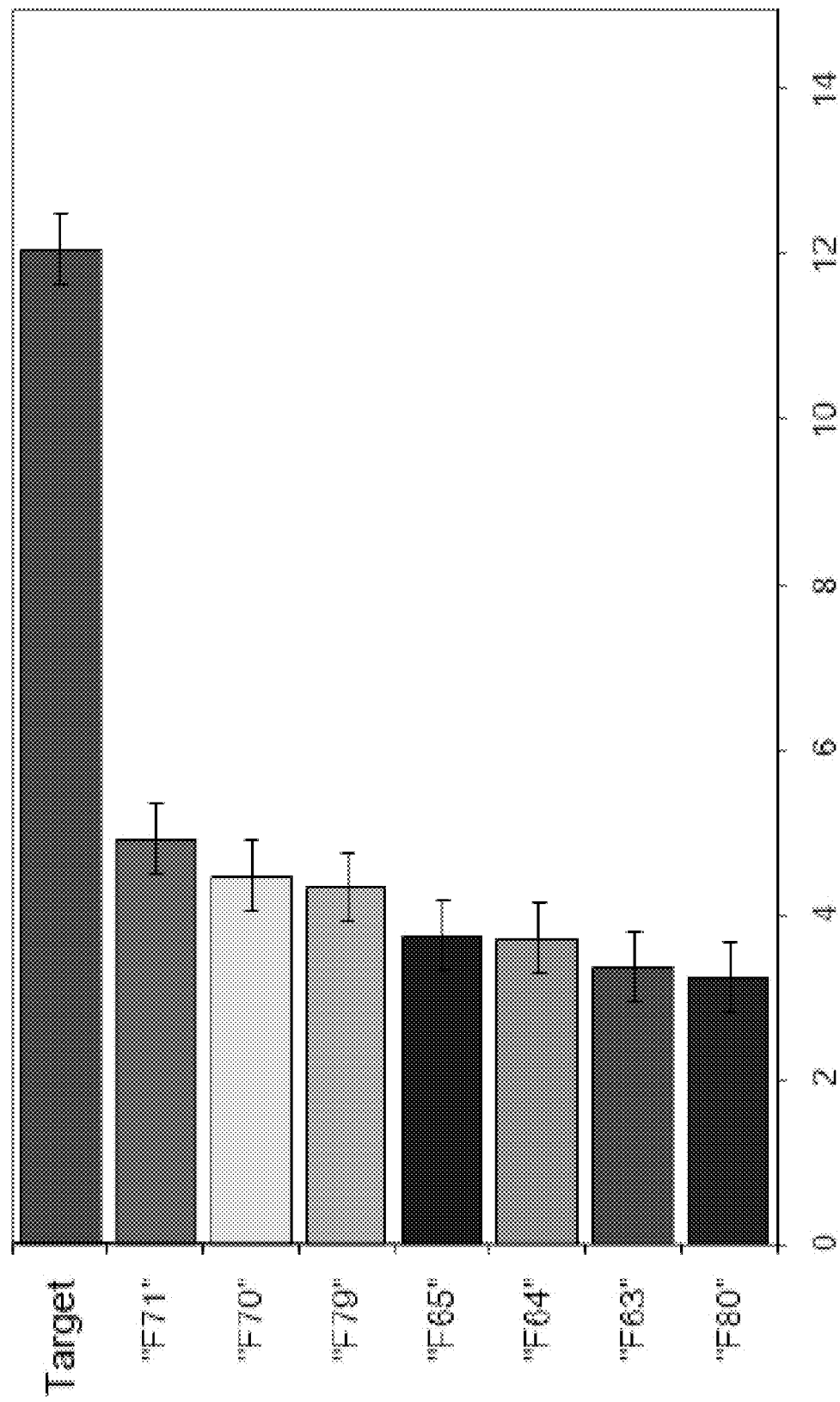
FIG. 7 is a bar graph showing the results of a sensory evaluation for foam height of experimental samples and target product.
Figure 8:
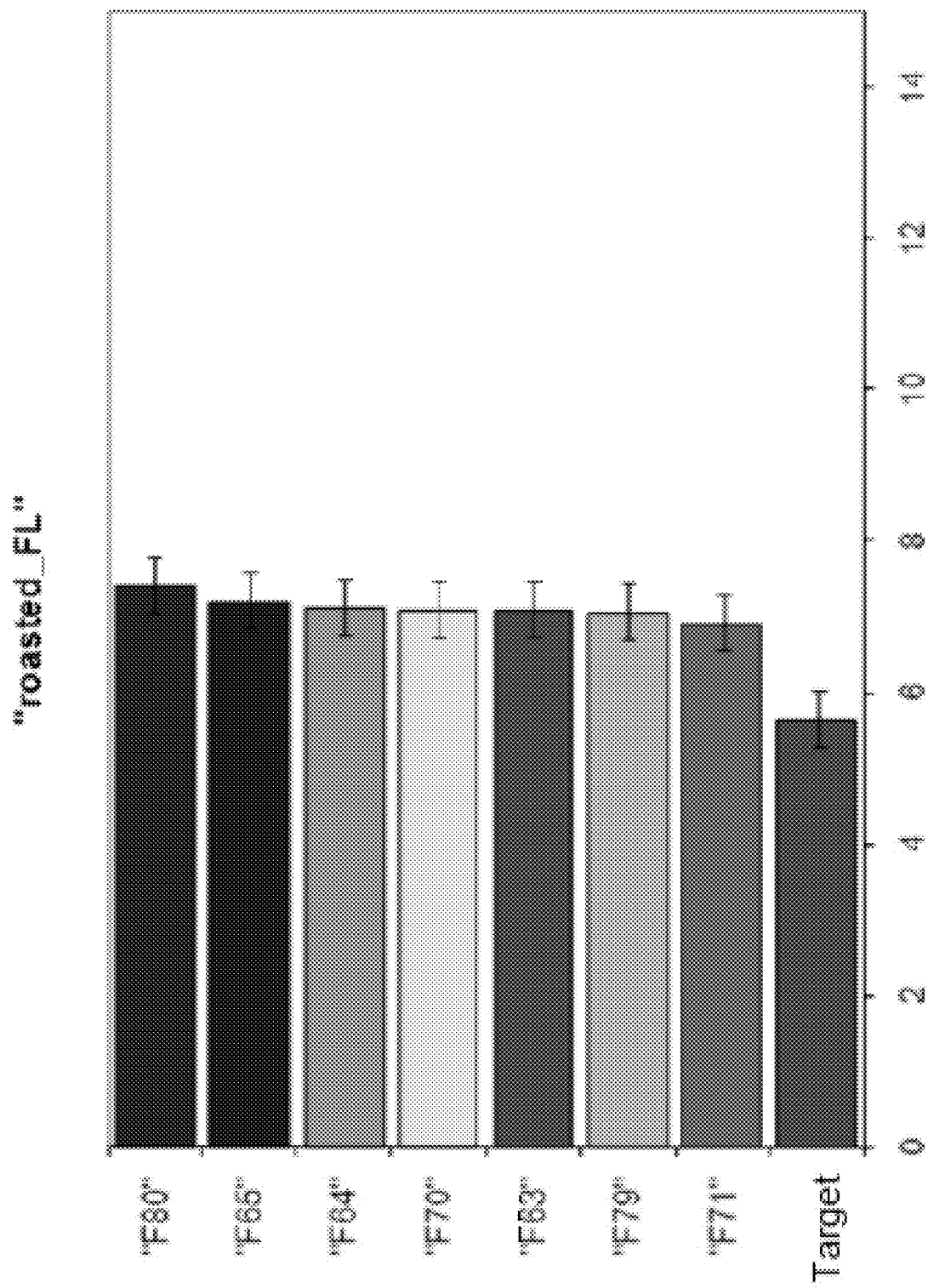
FIG. 8 is a bar graph showing the sensory evaluation for roasted flavor attributes of experimental samples and target product.
Figure 9:
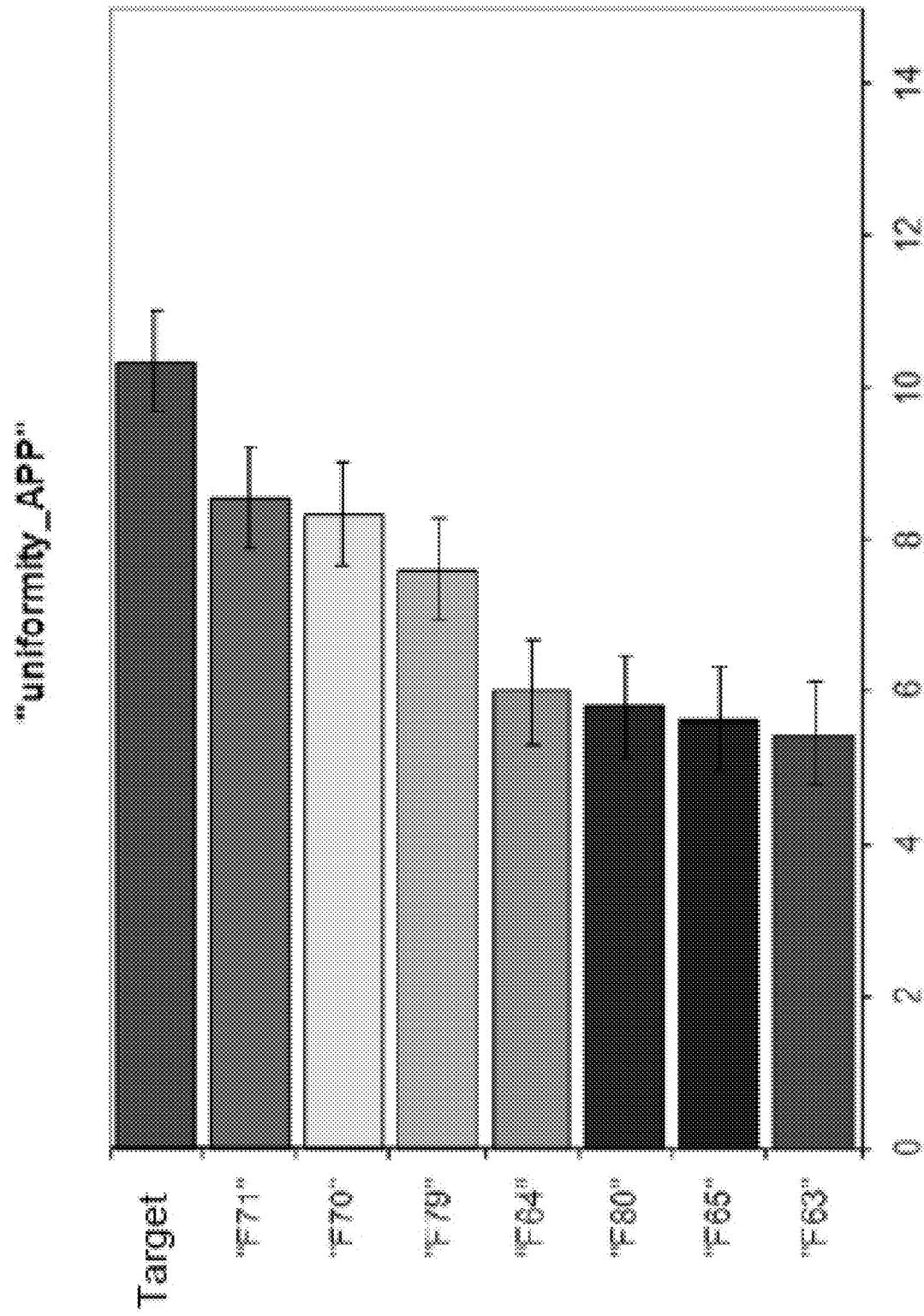
FIG. 9 is a bar graph showing the results of a sensory evaluation for foam uniformity of experimental samples and target product.
Figure 10:
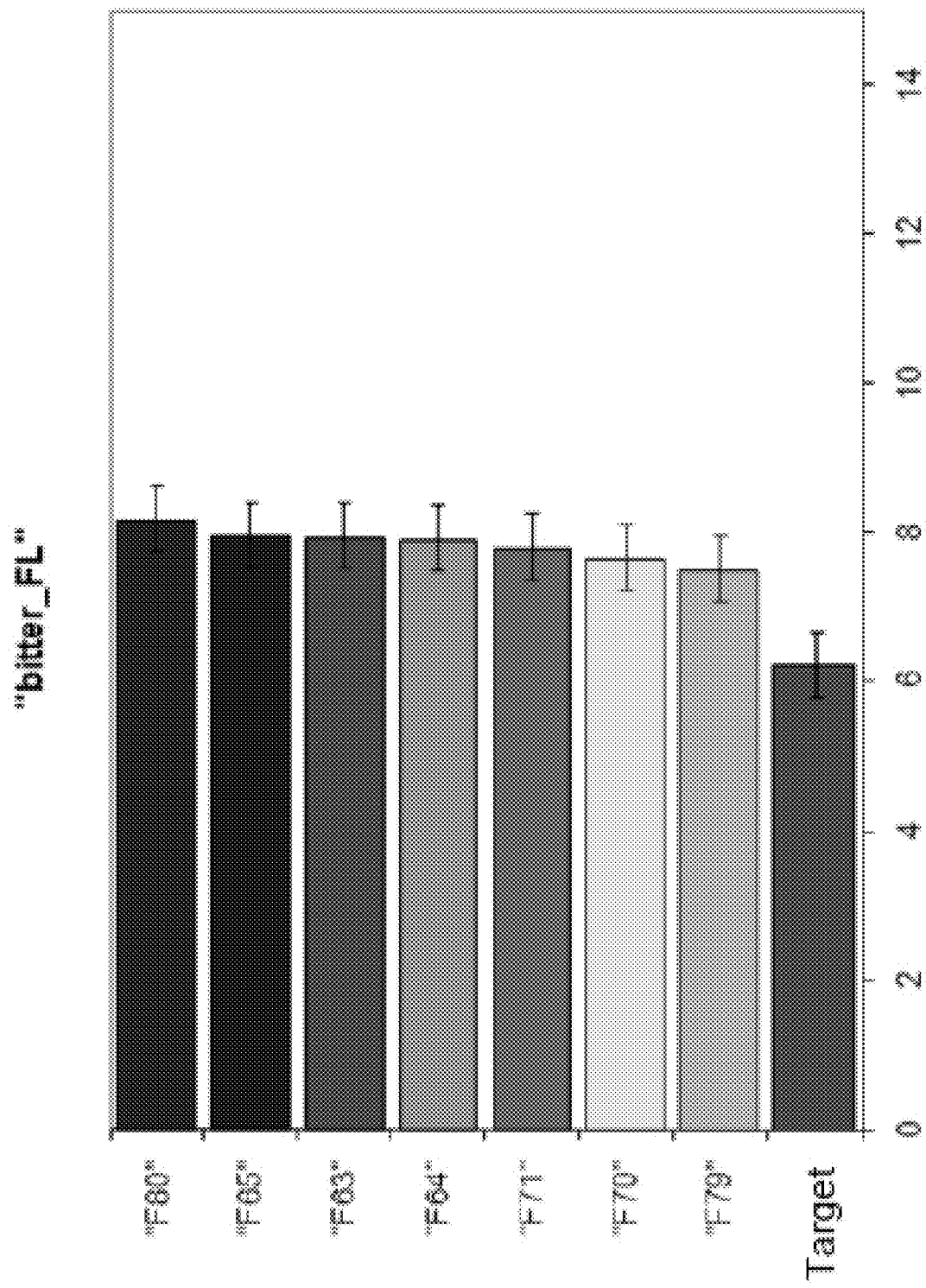
FIG. 10 is a bar graph showing the sensory evaluation for bitter flavor attributes of experimental samples and target product.
Figure 11:
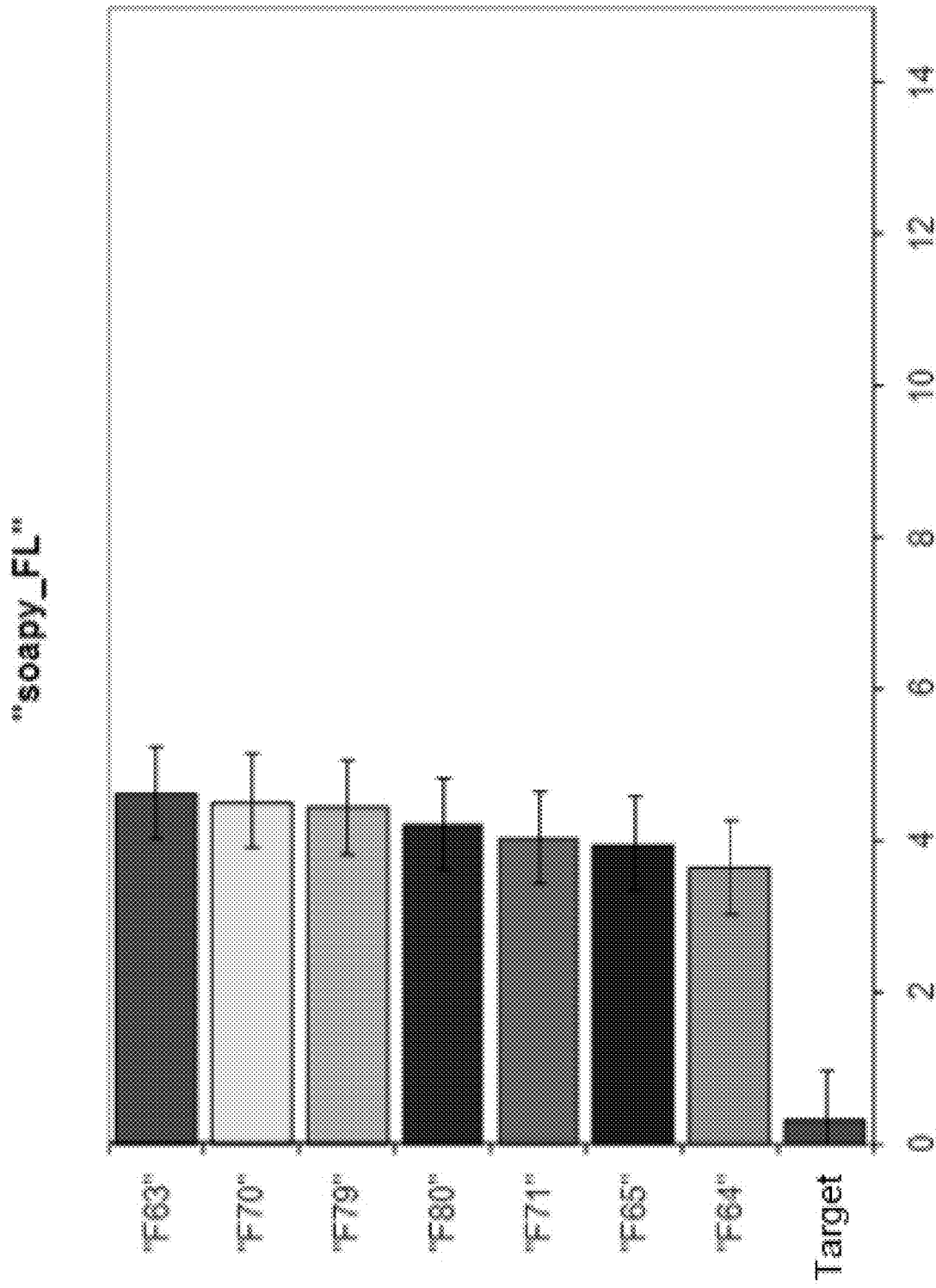
FIG. 11 is a bar graph showing the sensory evaluation for soapy flavor attributes of experimental samples and target product.
Figure 12:
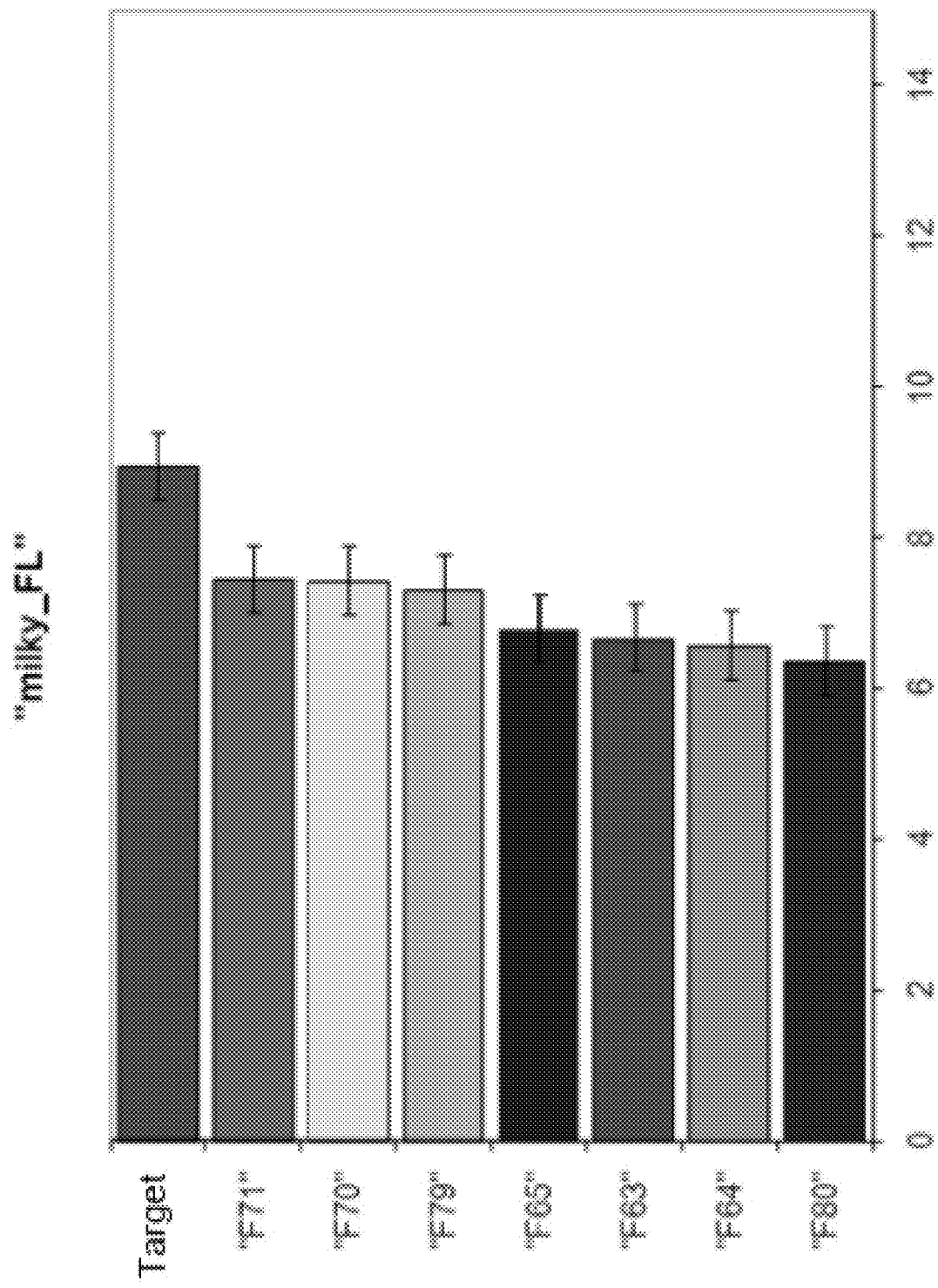
FIG. 12 is a bar graph showing the sensory evaluation for milky flavor attributes of experimental samples and target product.
Figure 13:
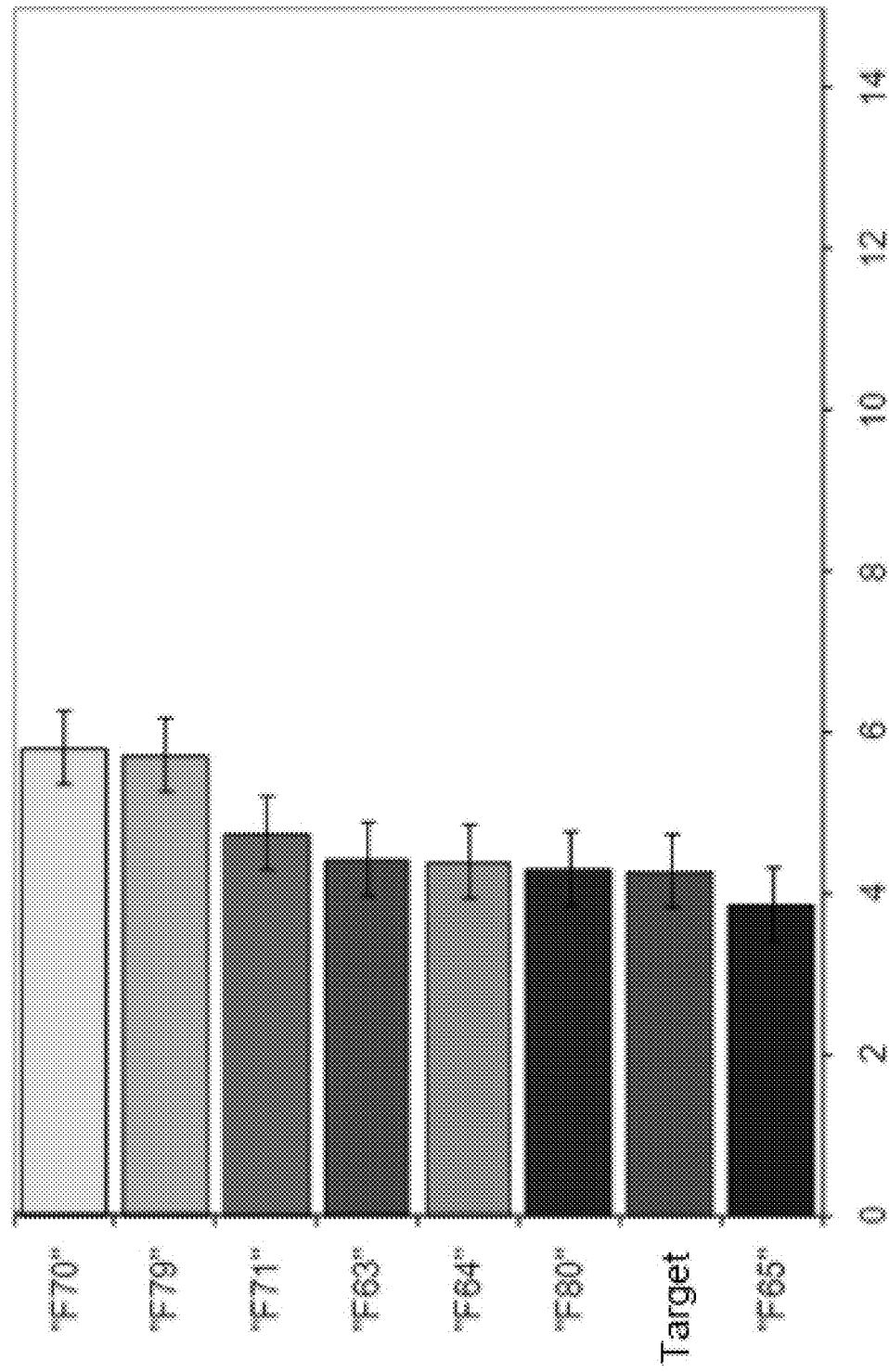
FIG. 13 is a is a bar graph showing the sensory evaluation for creamy flavor attributes of experimental samples and target product.
Figure 14:
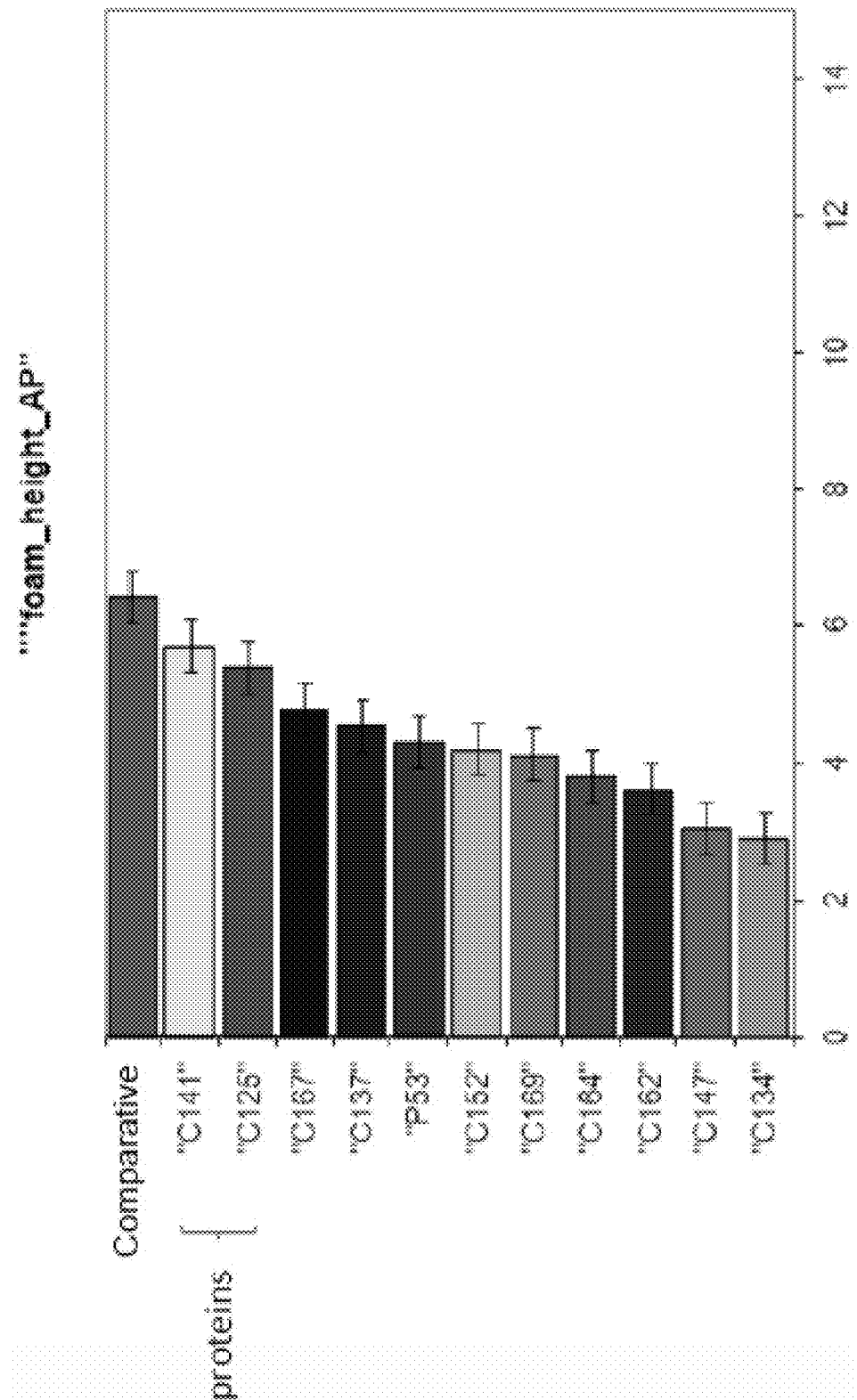
FIG. 14 is a bar graph showing the results of a sensory evaluation for foam height of experimental samples and a comparative product.
Figure 15:
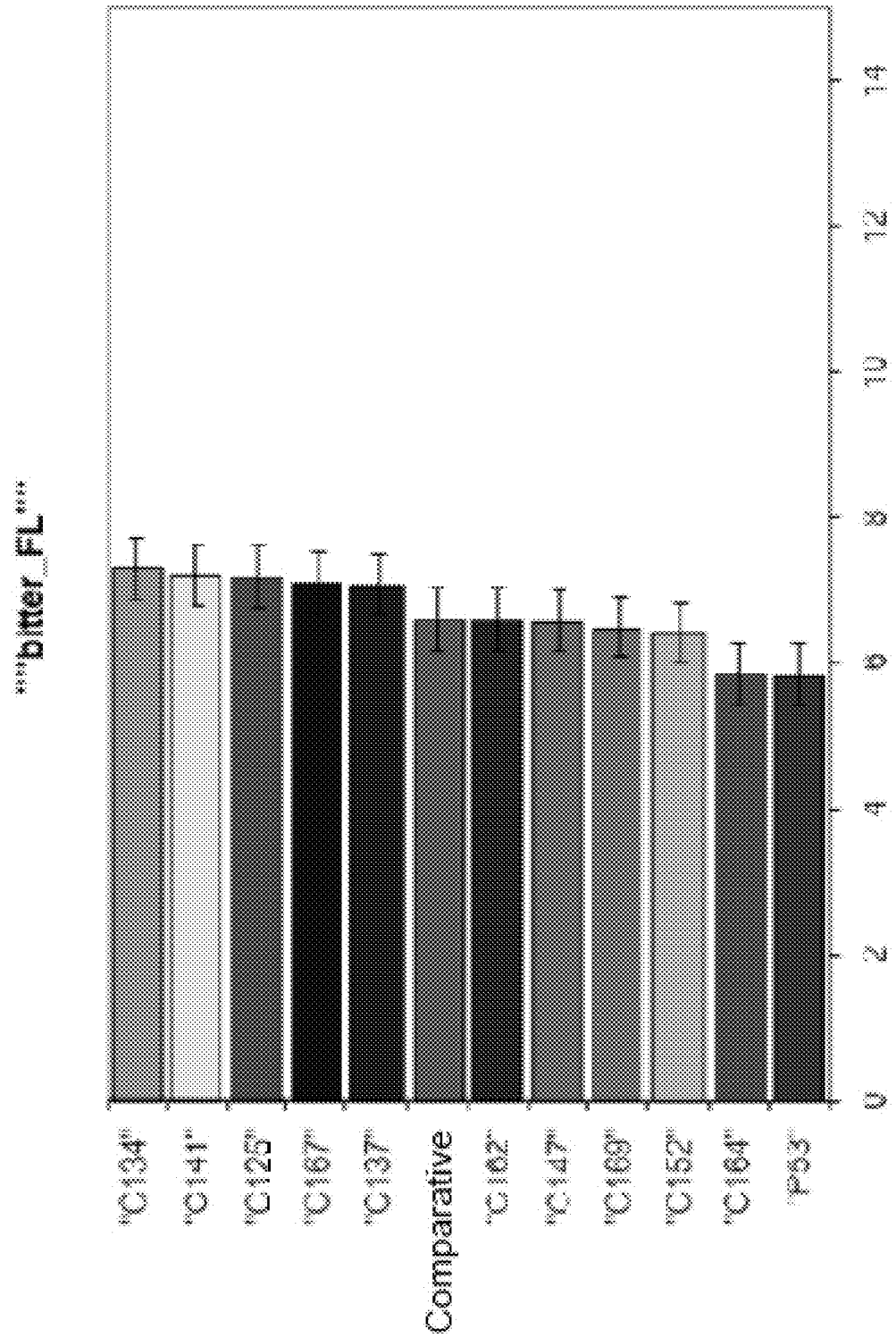
FIG. 15 is a bar graph showing the sensory evaluation for bitter flavor attributes of experimental samples and a comparative product.
Figure 16:
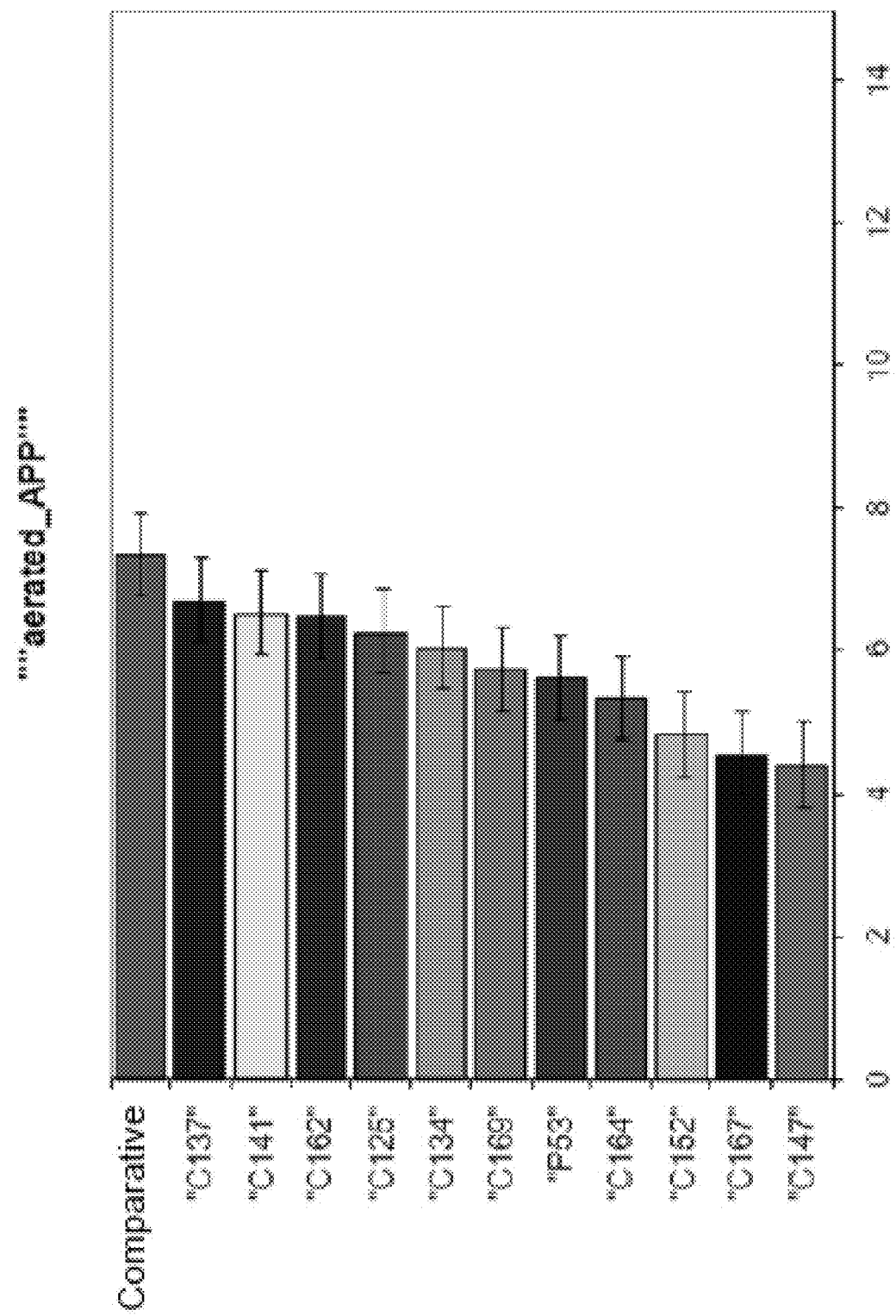
FIG. 16. is a bar graph showing the sensory evaluation for aerated foam appearance of experimental samples and a comparative product.
Figure 17:
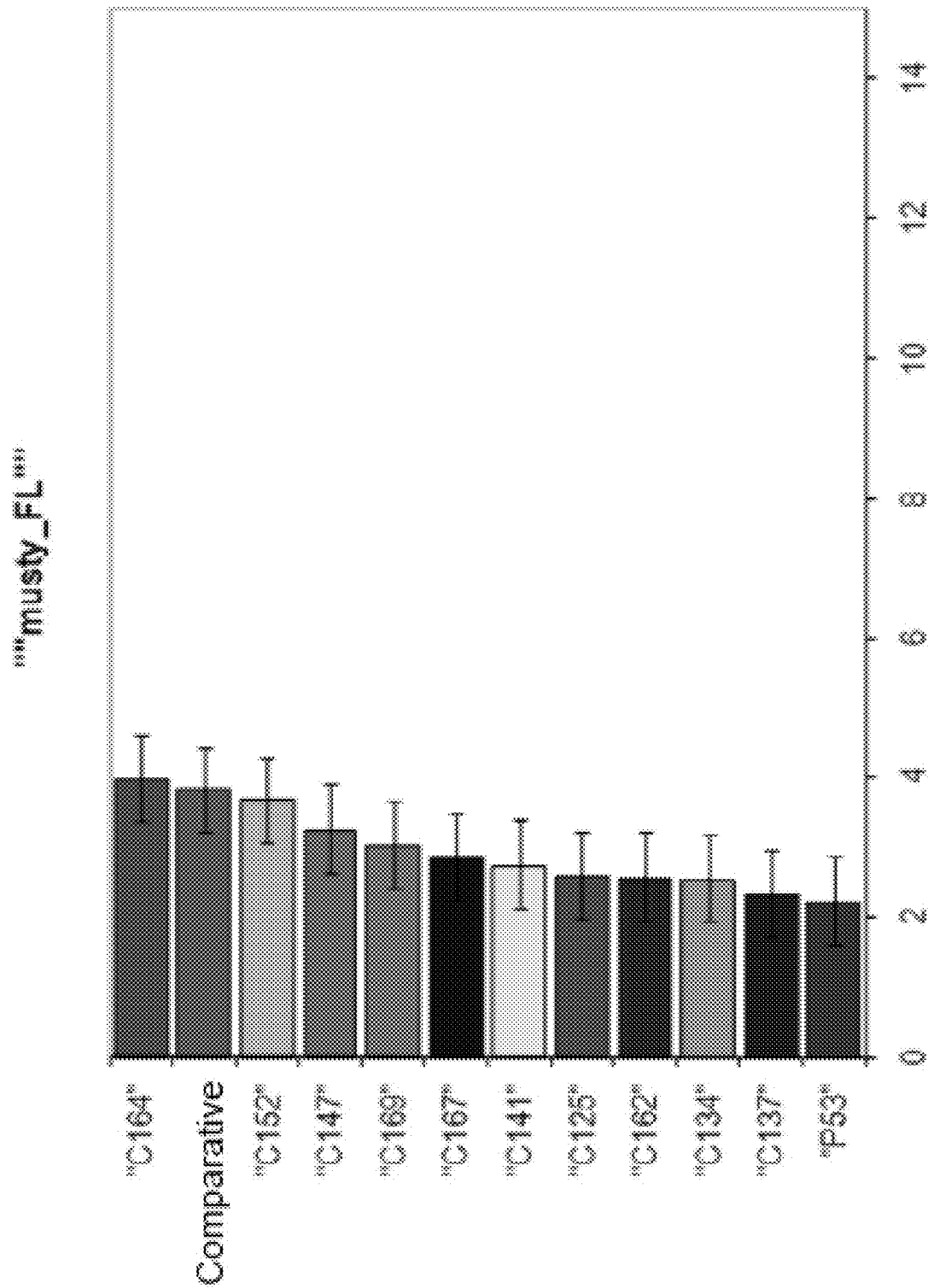
FIG. 17 is a bar graph showing the sensory evaluation for musty flavor attributes of experimental samples and a comparative product.
Figure 18:
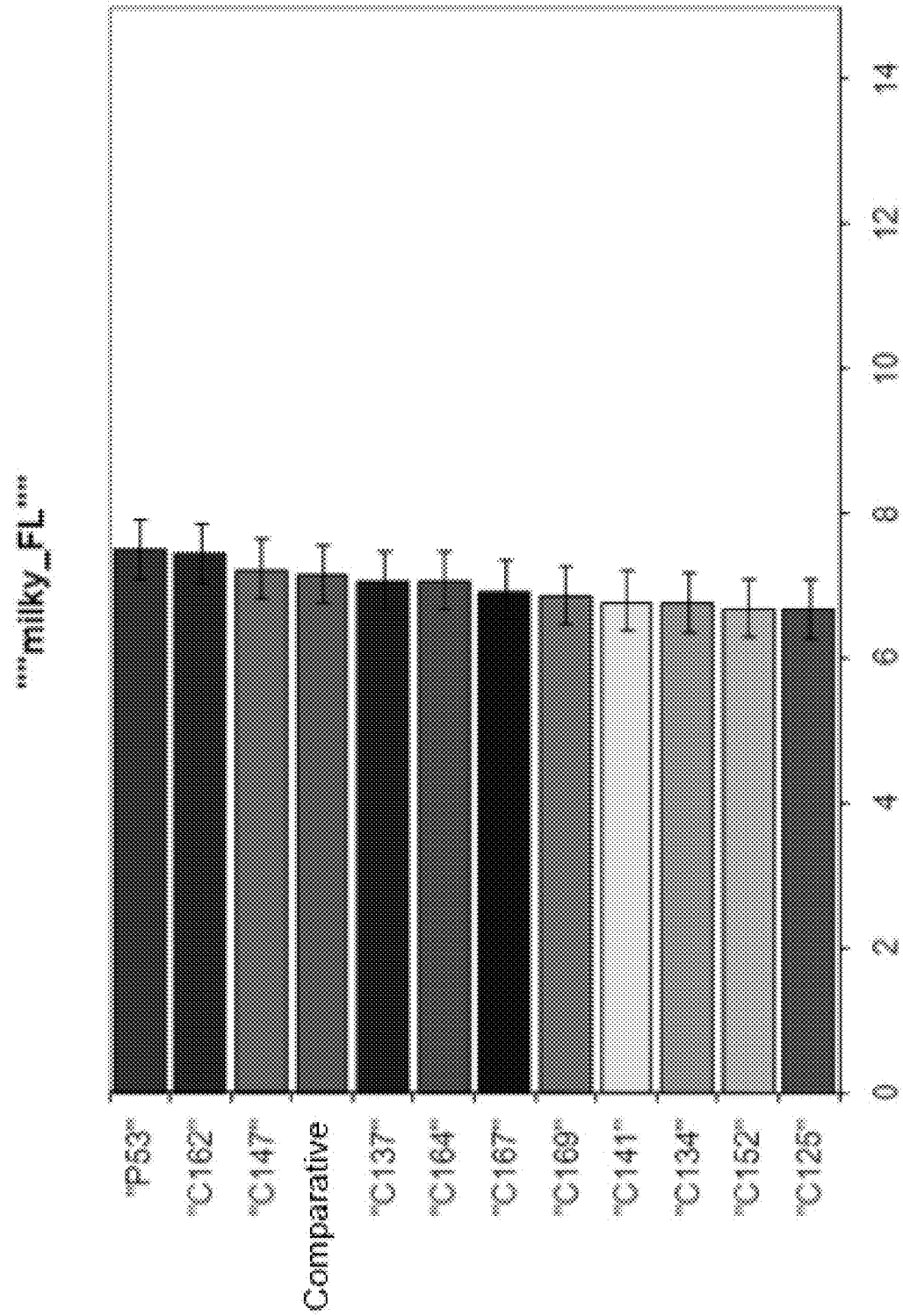
FIG. 18 is a bar graph showing the sensory evaluation for milky flavor attributes of experimental samples and a comparative product.
Figure 19:
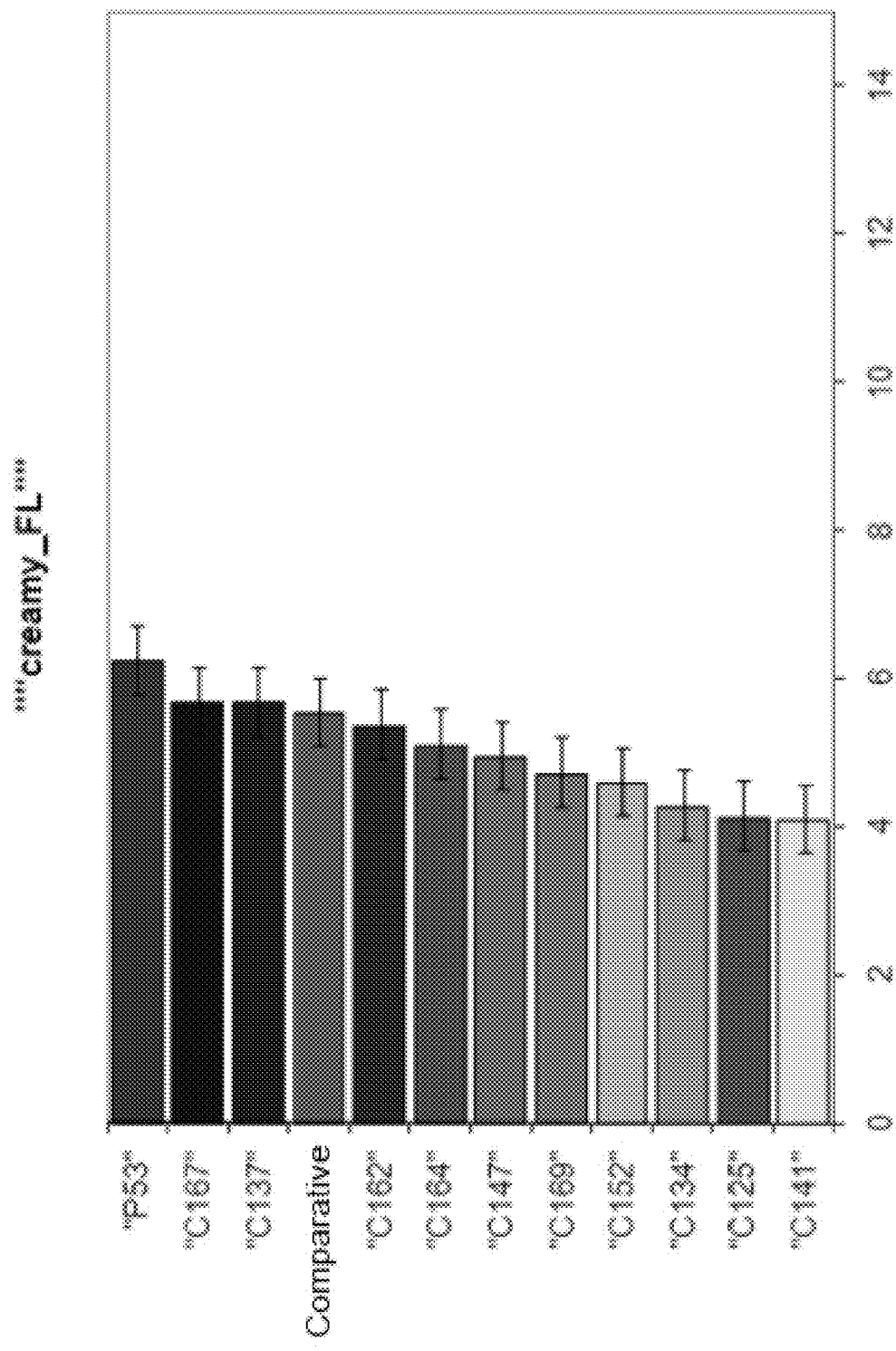
FIG. 19 is a bar graph showing the sensory evaluation for creamy flavor attributes of experimental samples and a comparative product.
Figure 20:
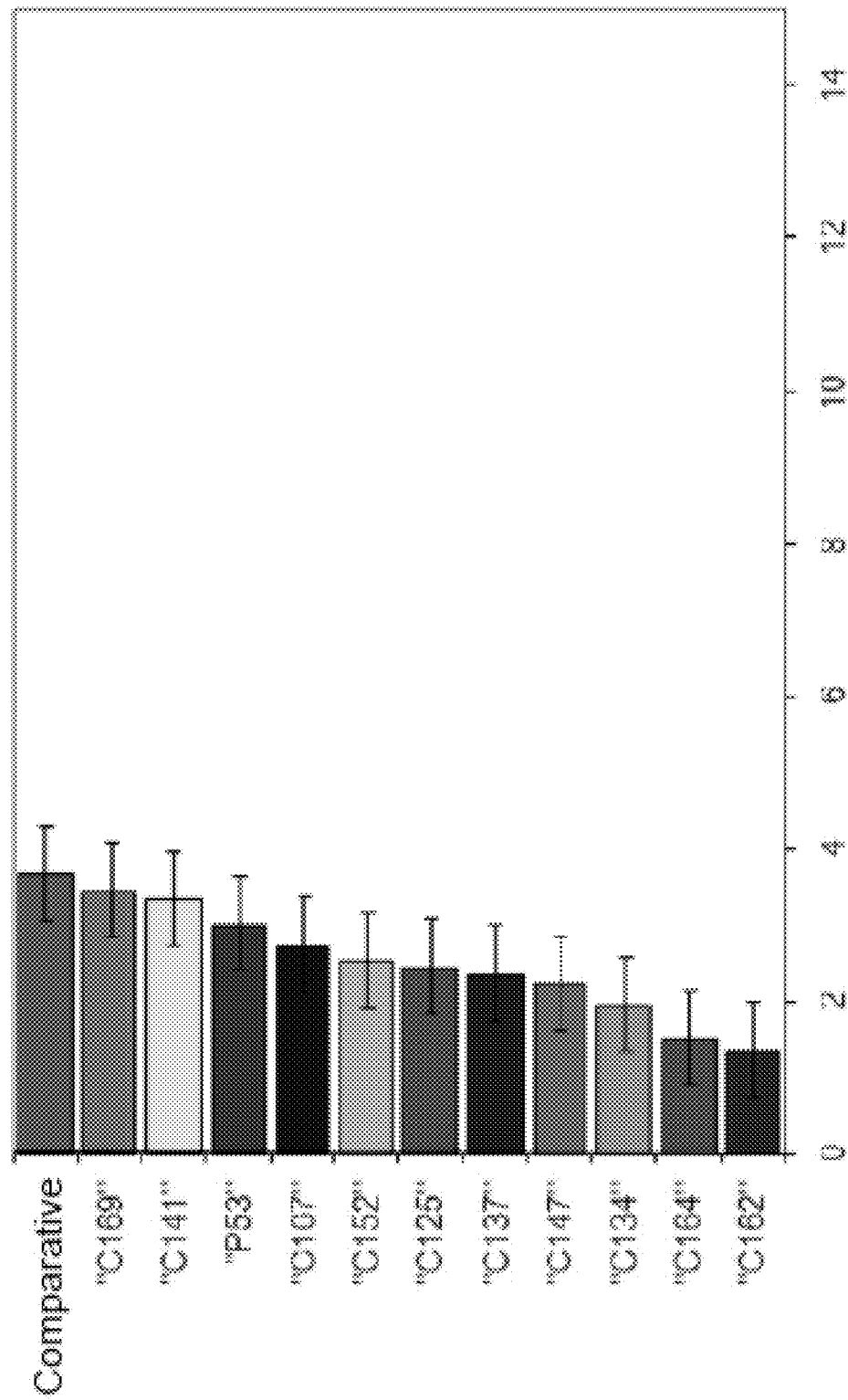
FIG. 20 is a bar graph showing the sensory evaluation for soapy flavor attributes of experimental samples and a comparative product.

FIG. 6 shows the sensory profile of the GEVALIA® Jacobs Latte and two experimental samples (C162 and C164). The main differences in taste between the GEVALIA® Jacobs Latte and the experimental samples were associated with the less processed, creamy, and grainy notes in the experimental samples.

FIGS. 7-13 provide additional bar graphs showing the mean scores on specific attributes for the samples produced from whole milk.

FIGS. 14-20 provide additional bar graphs showing the mean scores on specific attributes for the samples produced from cream. It was found that the addition of salt to the cream based samples seem to increase the mouthfeel of the product with less impact on flavor. The addition of proteins had little impact on flavor but more of an impact on foam characteristics of the product. The remaining cream-based samples were similar to each other.

The data from the experiments from which the charts in FIGS. 3-20 were generated are presented in FIGS. 21-26. Additionally, Tables 7-9 below explain the criteria used by the tasting judges in evaluating the samples and generating the scores indicated in FIGS. 3-26.

TABLE 7

| FOAM APPEARANCE | | LOW | HIGH |
|---|---|---|---|
| Bubble size | Perceived size of the majority of the foam bubbles. | Small bubbles | Big bubbles |
| Uniformity | Evenness of the bubbles spread throughout the foam. | Different size bubbles | Same size bubbles |
| Height foam | Visual assessment of the height of the foam from low to high. | Low/No foam | High foam |
| Density | Assessment of how much strength is needed while pushing the foam with the back of the spoon. | Thin | Thick |
| Aerated | Perceived amount of air contained in the foam (either big or smaller bubbles). | No air | High air content |

| Foam Mouthfeel | | Low | High |
|---|---|---|---|
| Aerated | Felt amount of air contained in the foam in mouth. | No air | High air content |
| Density | Density of the foam quantified by strength needed to press the foam between the tongue and the palate. | Liquid | Hard |
| Dry | Perception of dryness in mouth (usually more perceived after swallowing). | Not dry | Astringent |
| Powdery | Powder feeling perceived between tongue and palate. | Smooth/homogeneous | Granular |
| Smooth | Even, regular and rounded texture in mouth. | None | Very |

TABLE 8

Sensory terms for black coffee (R&G/Soluble/coffee part of cappuccinos and mixes)

| DESCRIPTOR | DESCRIPTION |
|---|---|
| FLAVOR | |
| Sour | This describes sharp, biting flavor (such as vinegar or acetic acid). It is sometimes associated with the aroma of fermented coffee. |
| Bitter | A primary taste characterized by the solution of caffeine, quinine. This taste is considered desirable up to a certain level and is affected by the degree of roast brewing procedures. |
| Rubbery | Rubbery perception associated with elastic bands, latex gloves, and balloon. |
| Earthy | Characteristic of fresh earth, wet soil or humus. Sometimes associated with moulds and reminiscent of raw potato/mushroom. |
| Musty | Default aromatic characteristic of closed air spaces (closets for dry, old books, mouldy bread, basement for wet. |
| Overall intensity | Overall strength of coffee which takes into account all coffee attributes (roasted/bitter/rubbery . . . ). |
| Roasted | Measurement of roasted character of the coffee. |
| Smoky | Characteristic of the smell one gets when cleaning out a wooden fireplace/bonfires/burnt wood/smoky food. |
| AFTERTASTE | |
| Bitter | Lingering bitter perception on the back of the palate after swallowing. |
| Roasted | Lingering roasted perception in mouth. |
| Sour | Persistent sour perception in mouth after swallowing. |

TABLE 9

Sensory terms for white coffees (cappuccinos/coffee mixes/coffee + milk)

| FLAVOR | DESCRIPTION |
|---|---|
| Chalky | Flavor associated with magnesia |
| Creamy | Creamy/fatty flavor like double cream (reference: Tesco double cream) |
| Milky | Intensity of milk flavor (ref. tesco semi skimmed fresh milk) |
| Processed (milk) | Taste like UHT/heat treated/evaporated milk/creamer (ref. Tesco evaporated milk) |
| Soapy | Flavor perception associated with washing up liquid/detergent |

Example 5

This experiment was designed to analyze the effect of the addition of dairy minerals to Tassimo milk products. Milk concentrates were prepared having the ingredients listed in Table 10 below. All samples were homogenized at 2000/200 psi.

TABLE 10

Contents of Samples Tested

| Sample No. | Solids | Fat | Protein | Sugar | Salt | BS (TSC) | P/BS | Potassium phosphate | Potassium citrate | Magnesium citrate | Trucal D7 | IdaPro MPP | Lactalis whey permeate | Gum Arabic |
|---|---|---|---|---|---|---|---|---|---|---|---|---|---|---|
| DM1 | 44.57 | 30 | 1.76 | 10 | 1.2 | 0.09 | 20 | 1.0 | | | | | | 0.4 |
| DM2 | 44.57 | 30 | 1.76 | 10 | 1.2 | 0.09 | 20 | | 1.0 | | | | | 0.4 |
| DM3 | 44.57 | 30 | 1.76 | 10 | 1.2 | 0.09 | 20 | | | 1.0 | | | | 0.4 |
| DM4 | 44.57 | 30 | 1.76 | 10 | 1.2 | 0.09 | 20 | 0.5 | 0.5 | | | | | 0.4 |
| DM5 | 44.57 | 30 | 1.76 | 10 | 1.2 | 0.09 | 20 | | 0.5 | 0.5 | | | | 0.4 |
| DM6 | 44.57 | 30 | 1.76 | 10 | 1.2 | 0.09 | 20 | 0.5 | | 0.5 | | | | 0.4 |
| DM7 | 44.57 | 30 | 1.76 | 10 | 1.2 | 0.09 | 20 | 0.3 | 0.3 | 0.3 | | | | 0.4 |
| DM8 | 44.57 | 30 | 1.76 | 10 | 1.2 | 0.09 | 20 | | | | | | | 0.4 |
| DM9 | 44.57 | 30 | 1.76 | 10 | 1.2 | 0.09 | 20 | | | | 0.5 | | | 0.4 |
| DM10 | 44.57 | 30 | 1.76 | 10 | 1.2 | 0.09 | 20 | | | | 1.0 | | | 0.4 |
| DM11 | 44.57 | 30 | 1.76 | 10 | 1.2 | 0.09 | 20 | | | | 1.5 | | | 0.4 |
| DM12 | 44.57 | 30 | 1.76 | 10 | 1.2 | 0.09 | 20 | | | | 2.0 | | | 0.4 |
| DM13 | 44.57 | 30 | 1.76 | 10 | 1.2 | 0.09 | 20 | | | | | 1.0 | | 0.4 |
| DM14 | 44.57 | 30 | 1.76 | 10 | 1.2 | 0.09 | 20 | | | | | | 1.0 | 0.4 |

The samples were evaluated by an expert panel at 65° C. The panelists tasted a selection of samples prior to data collection to allow the generation of relevant attributes. The panelists then tasted samples monadically in randomized order. The panelists first assessed flavor, aftertaste, mouthfeel, and afterfeel. The tasting results are shown in FIG. 22.

Sample DM1, the only sample with only potassium phosphate, was found to be more rancid, cloying, and sour than the other products. It was also one of the most viscous and had a characteristic flavor of processed milk.

Sample DM14, made with Lactalis whey permeate, was the least sour, least sweet, least caramel-flavored and the most smoky and powdery of all products. Sample DM13 (with added IdaPro MPP) had a similar profile.

Samples DM9, DM10, DM11, and DM12 were characterized by low scores on sourness, sweetness, roasted, biscuit, and caramel flavors, but high scores on powdery mouthfeel and musty and creamy flavors.

With respect to samples DM1-DM8, it was found that increasing the potassium phosphate content resulted in increased viscosity, sourness, processed milk flavor, and cloying afterfeel, and reduced roasted flavor and bitterness. Increased potassium citrate content resulted in reduced viscosity, sourness, rancid flavor, bitterness, and cloying afterfeel. Increased magnesium citrate content resulted in increased viscosity, roasted flavor, and bitterness, but reduced sourness, processed milk flavor, and rancid flavor.

Figure 27:
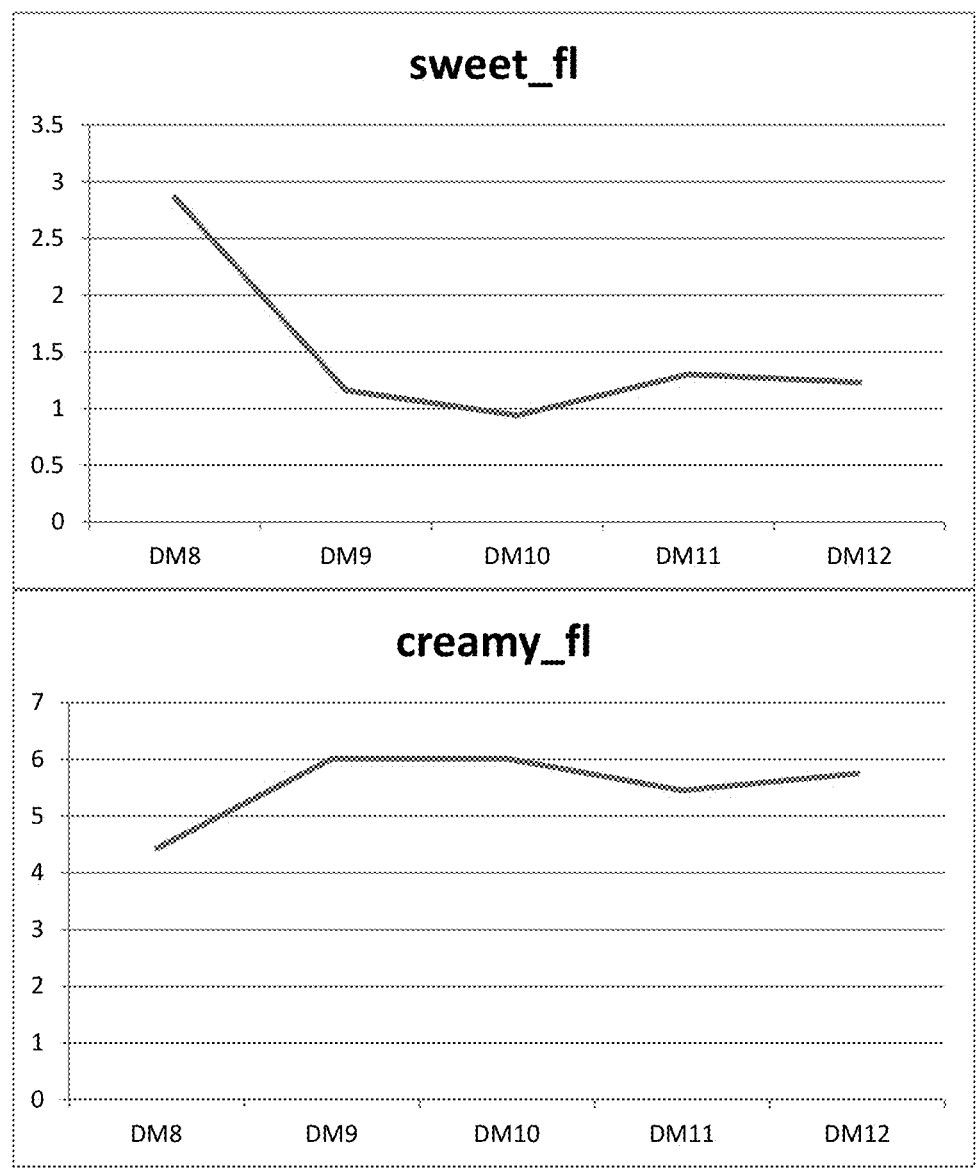
FIG. 27 includes charts presenting sensory data for the creaminess and sweetness analysis, respectively, of samples DM8-DM12 of Table 10.
Figure 28:
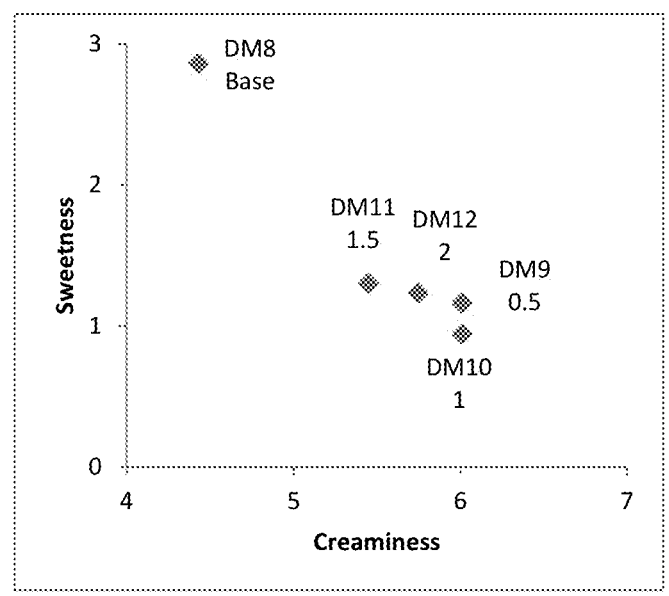
FIG. 28 is a chart of the creaminess and sweetness analysis of samples DM8-DM12 of Table 10.

With respect to samples DM8-DM12, it was found that adding Trucal D7 increased the creamy flavor and decreased the sweetness compared to control, but there were no significant differences between the various amounts of Trucal D7. The data for the creaminess and sweetness analysis of samples DM8-DM12 are presented in FIGS. 27 and 28.

Example 6

The experiment was designed to analyze the effect of dairy mineral addition on separation rate of cream-based dairy products. More specifically, this experiment was performed utilizing Dexter Dairy Mineral Samples (US Pilot Plant w/1.2% NaCl and 12% Sucrose (LumiSizer at 2000×g and 25 C)), which are listed in Table 11 below. It is to be noted that the large separation rates that are typical for Dexter systems are generally thought to be driven by fat droplet flocculation.

TABLE 11

Contents/Properties of Samples Tested:

| Sample ID | Solids | Fat | Protein | BS | P/BS | Dairy Minerals | Note | Slope in %/hr | Duration (sec) |
|---|---|---|---|---|---|---|---|---|---|
| Min 33 | 45.66% | 30.00% | 1.76% | 0.176 | 10 | ~0.62% (added before homogenization) | Cream With UF | 143.90 | 540 |
| Min 34 | 45.48% | 30.00% | 1.76% | 0 | — | ~0.62% (added before homogenization) | Cream With UF | 437.09 | 216 |
| Min 35 | 48.66% | 30.00% | 1.64% | 0.164 | 10 | ~0.62% (added before homogenization) | Cream NO UF | 176.75 | 504 |
| Min 36 | 48.49% | 30.00% | 1.64% | 0 | — | ~0.62% (added before homogenization) | Cream NO UF | 254.28 | 324 |

TABLE 11-continued

Contents/Properties of Samples Tested:

| Sample ID | Solids | Fat | Protein | BS | P/BS | Dairy Minerals | Note | Slope in %/hr | Duration (sec) |
|---|---|---|---|---|---|---|---|---|---|
| Min 37 | 45.66% | 30.00% | 1.76% | 0.176 | 10 | 0 (none) | Cream With UF | 510.25 | 180 |
| Min 38 | 46.30% | 30.00% | 1.76% | 0.176 | 10 | 0.62 (added after homogenization with other powders) | Cream With UF | 152.46 | 648 |

Figure 29:
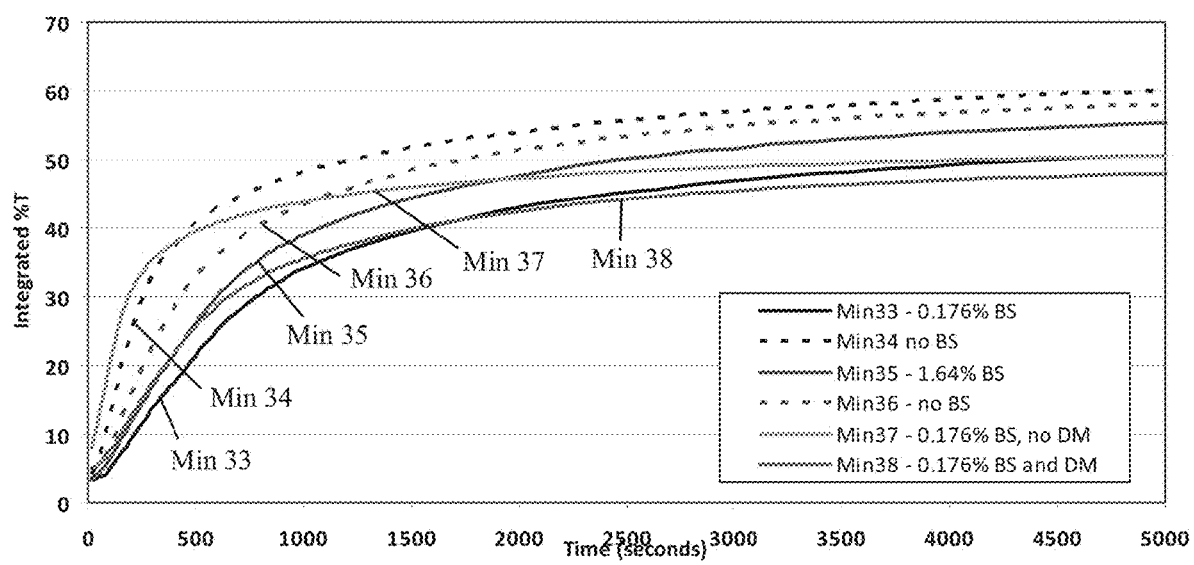
FIG. 29 is a graph showing the separation rates of the samples shown in Table 12.

FIG. 29 shows the separation rates of samples Min33-Min38. Overall, the separation rates appear to be sensitive to dairy mineral/buffer salt variation, which are likely to modulate the floc number/size. For samples Min33 through Min36, BS addition appears to decrease floc size. In view of the values exhibited by samples Min33 and Min38 in FIG. 29, the DM addition point appears to have no significant effect on separation rate.

As can be seen from FIG. 29, Min37 had the largest separation rate, suggesting that the absence of dairy minerals and/or addition with UF processing greatly increased floc size.

Example 7

The experiment was designed to analyze the effect of ultrafiltration on separation rate of cream-based dairy products. More specifically, this experiment was performed utilizing Lehigh Valley Dairy Mineral Samples (US and EP standards (LumiSizer at 2000×g and 25 C)), which are listed in Table 12 below.

TABLE 12

Contents/Properties of Samples Tested:

| Sample ID | Solids | Fat | Protein | Sugar | Salt | BS | P/BS | Dairy Minerals | Gum Arabic | Slope in %/hr | Duration sec. |
|---|---|---|---|---|---|---|---|---|---|---|---|
| US-UF* | 45.24 | 30 | 1.76 | 12 | 1.2 | 0.16 (TSC) | 10 | 0.5 | 0.4 | 99.87 | 900 |
| US-NO* | 49.2 | 30 | 1.72 | 12 | 1.2 | 0.17 (TSC) | 10 | 0.5 | 0.4 | 101.97 | 900 |
| EU-UF* | 60.53 | 27 | 1.7 | 30 | 1 | 0.16 (TSC) | 10 | 1 | 0.4 | 205.03 | 400 |
| EU-NO* | 60.47 | 24 | 1.7 | 30 | 1 | 0.136 (TSC) | 10 | 1 | 0.4 | 205.27 | 400 |

Figure 30:
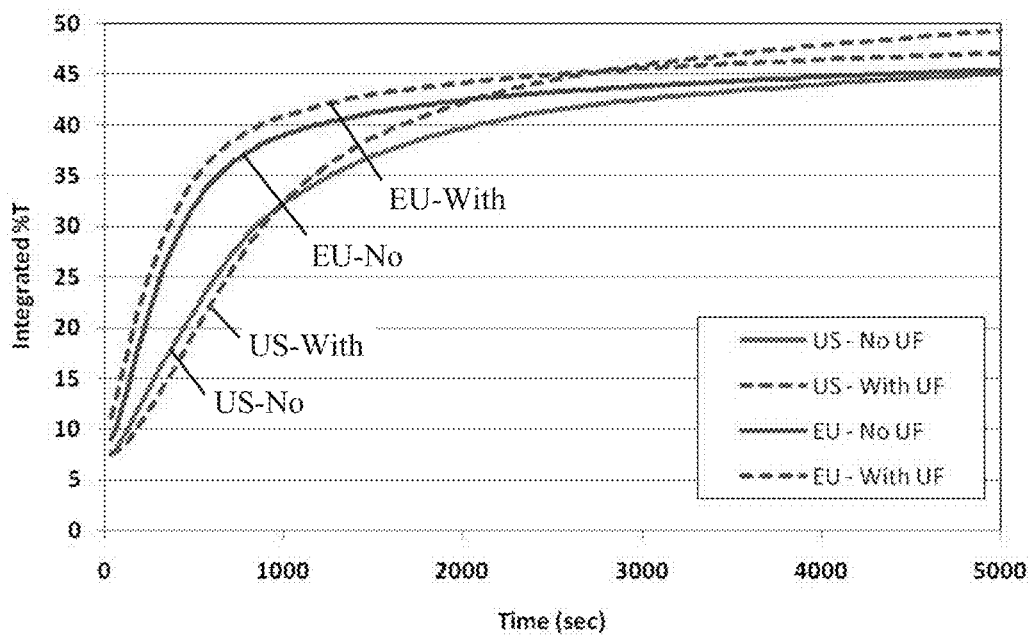
FIG. 30 is a graph showing the separation rates of the samples shown in Table 12.

*US-UF and EU-UF correspond to US formulation with ultrafiltration and EU formulation with ultrafiltration, respectively.
*US-NO and EU-NO correspond to US formulation without ultrafiltration and EU formulation without ultrafiltration, respectively FIG. 30 shows the separation rates of samples US-UF, US-NO, EU-UF, and EU-NO. As can be seen from FIG. 30, the EU formulations had separation rates approximately twice that of the US counterparts. The 30% sucrose level in the EU system is likely to be the destabilizing component that may promote aggregation by osmotic depletion.

FIG. 30 also shows that there was no noticeable effect of UF or NO UF processing on separation rates. As such, the largest separation rate of sample Min37 (Table 11), which is indicated in FIG. 29 appears to be independent of the UF processing and dependent on the absence of dairy minerals in the sample.

It will be understood that various changes in the details, materials, and arrangements of the process, formulations, and ingredients thereof, which have been herein described and illustrated in order to explain the nature of the method and resulting mineral-fortified dairy products, may be made by those skilled in the art within the principle and scope of the embodied method as expressed in the appended claims.

What is claimed is:

1. A method of making a concentrated dairy liquid, the method comprising:
   pasteurizing a dairy cream;
   concentrating the pasteurized cream to obtain a concentrated cream retentate;
   homogenizing the concentrated cream retentate to form a homogenized cream retentate;
   adding a blend of dairy minerals to the homogenized cream retentate;
   heating the homogenized cream retentate including the blend of dairy minerals to obtain a concentrated dairy liquid having a $F_o$ value of at least 5, the concentrated dairy liquid having a protein to fat ratio of from about 0.04 to about 0.1 and lactose in an amount of up to 1.5 percent,
   wherein the dairy minerals are included in an amount effective to provide at least two of the following mineral to protein ratios in the concentrated dairy liquid:
   about 0.017 mg to about 0.0264 mg potassium per mg protein;
   about 0.008 mg to about 0.0226 mg magnesium per mg protein;
   about 0.122 mg to about 0.3516 mg calcium mg per mg protein; and
   about 0.199 mg to about 0.5394 mg phosphate per mg protein.

2. The method of claim 1, further comprising diluting the cream with water after the pasteurizing.

3. The method of claim 2, wherein the ratio of the water to the cream is from about 2:1 to about 4:1.

4. The method of claim 1, wherein the concentrating includes providing the concentrated cream retentate including about 2.0 to about 3.0 percent protein.

5. The method of claim 1, wherein the concentrated dairy liquid includes about 1.3 to about 2 percent protein.

6. The method of claim 1, wherein the concentrated dairy liquid includes about 20 to about 30 percent fat.

7. The method of claim 1, wherein the blend of dairy minerals comprises between 0.15 and 1.5% by weight of the homogenized cream retentate.

8. The method of claim 7, wherein the blend of dairy minerals comprises between 0.5 and 0.75% by weight of the homogenized cream retentate.

9. The method of claim 1, wherein the concentrated dairy liquid includes about 35 to about 65 percent total solids.

10. The method of claim 1, wherein the dairy minerals are included in an amount effective to provide at least three of the following mineral to protein ratios in the concentrated dairy liquid:
    about 0.017 mg to about 0.0264 mg potassium per mg protein;
    about 0.008 mg to about 0.0226 mg magnesium per mg protein;
    about 0.122 mg to about 0.3516 mg calcium per mg protein; and
    about 0.199 mg to about 0.5394 mg phosphate per mg protein.

11. The method of claim 1, wherein the dairy minerals are included in an amount effective to provide the following mineral to protein ratios in the concentrated dairy liquid:
    about 0.017 mg to about 0.0264 mg potassium per mg protein;
    about 0.008 mg to about 0.0226 mg magnesium per mg protein;
    about 0.122 mg to about 0.3516 mg calcium per mg protein; and
    about 0.199 mg to about 0.5394 mg phosphate per mg protein.

12. The method of claim 1, wherein the concentrated dairy liquid has a viscosity ranging from about 20 cP to about 100 cP at ambient temperature when measured at about 20° C. with a Brookfield RV viscometer using Spindle #2 at 100 rpm.

13. The method of claim 1, wherein the concentrating step is carried out using ultrafiltration with a membrane having a molecular weight cut off of about 10,000 to about 20,000 Daltons.

14. The method of claim 1, further comprising including about 0.1 to about 0.6 percent gum arabic by weight of the concentrated dairy liquid.

15. The method of claim 1, wherein the fat in the concentrated dairy liquid consists essentially of fat from the dairy cream.

16. A method of making a concentrated dairy liquid, the method comprising:
    pasteurizing a dairy cream;
    concentrating the pasteurized cream by ultrafiltration to obtain a concentrated cream retentate;
    homogenizing the concentrated cream retentate to form a homogenized cream retentate;
    adding a blend of dairy minerals to the concentrated cream retentate or to the homogenized cream retentate; and
    heating the homogenized cream retentate including the blend of dairy minerals to obtain a concentrated dairy liquid having a $F_o$ value of at least 5, the concentrated dairy liquid having a protein to fat ratio of from about 0.04 to about 0.1, lactose in an amount of up to 1.5 percent, about 1.3 to about 2 percent protein, about 20 to about 30 percent fat, and about 35 to about 65 percent total solids,
    wherein the dairy minerals are included in an amount effective to provide at least two of the following mineral to protein ratios in the concentrated dairy liquid:
    about 0.017 mg to about 0.0264 mg potassium per mg protein;
    about 0.008 mg to about 0.0226 mg magnesium per mg protein;
    about 0.122 mg to about 0.3516 mg calcium mg per mg protein; and
    about 0.199 mg to about 0.5394 mg phosphate per mg protein.

* * * * *